US008558985B2

(12) United States Patent
Nystrom et al.

(10) Patent No.: US 8,558,985 B2
(45) Date of Patent: Oct. 15, 2013

(54) CONTACT STRUCTURE FOR A TUNABLE LIQUID CRYSTAL OPTICAL DEVICE

(75) Inventors: Michael J. Nystrom, San Jose, CA (US); Viktor Konovalov, Fremont, CA (US); Rubin Ma, Ottawa (CA); Amir Tork, Quebec (CA); Aram Bagramyan, Quebec (CA); Vladimir Presniakov, Quebec (CA)

(73) Assignee: LensVector Inc., Mountain View, CA (US)

( * ) Notice: Subject to any disclaimer, the term of this patent is extended or adjusted under 35 U.S.C. 154(b) by 252 days.

(21) Appl. No.: 12/995,866

(22) PCT Filed: Jun. 5, 2009

(86) PCT No.: PCT/CA2009/000742
§ 371 (c)(1),
(2), (4) Date: Mar. 7, 2011

(87) PCT Pub. No.: WO2009/146529
PCT Pub. Date: Dec. 10, 2009

(65) Prior Publication Data
US 2012/0019761 A1    Jan. 26, 2012

Related U.S. Application Data

(60) Provisional application No. 61/059,274, filed on Jun. 6, 2008.

(51) Int. Cl.
*G02F 1/13*    (2006.01)
(52) U.S. Cl.
USPC ........................................... 349/193; 349/200

(58) Field of Classification Search
USPC .................... 349/18, 196–198, 200–202, 193
See application file for complete search history.

(56) References Cited

U.S. PATENT DOCUMENTS

| 5,592,314 A | 1/1997 | Ogasawara et al. |
| 6,512,563 B1 * | 1/2003 | Tajima .......................... 349/123 |
| 6,859,333 B1 | 2/2005 | Ren et al. |

(Continued)

FOREIGN PATENT DOCUMENTS

| CN | 1936625 A | 3/2007 |
| WO | 2005098479 A1 | 10/2005 |

OTHER PUBLICATIONS

European Search Report for European Patent Application No. 09756991.7—European National Phase of PCT/CA2009/000742; Search Report Dated Dec. 30, 2011.

(Continued)

*Primary Examiner* — James Dudek
(74) *Attorney, Agent, or Firm* — J-Tek Law PLLC; Jeffrey D. Tekanic; Scott T. Wakeman

(57) ABSTRACT

A tunable liquid crystal optical device defining an optical aperture and having a layered structure. The device includes a film electrode formed on a surface of a first substrate and covered by a second substrate, and a contact structure filling a volume within the layered structure and contacting the film electrode. The contact structure is located outside of the optical aperture and provides an electrical connection surface much larger than a thickness of the film electrode, such that reliable electrical connections may be made to the electrode, particularly in the context of wafer scale manufacturing of such a device.

8 Claims, 55 Drawing Sheets

(56) References Cited

U.S. PATENT DOCUMENTS

| | | |
|---|---|---|
| 7,343,064 B2 | 3/2008 | Koyama et al. |
| 7,522,256 B2 * | 4/2009 | Horiuchi et al. ............. 349/200 |
| 2002/0033911 A1 | 3/2002 | Isida |

OTHER PUBLICATIONS

Office Action issued May 30, 2013 for counterpart Chinese application No. 2009801299249, including translation thereof and copy of examined claims 1-25 (both Chinese and English).

* cited by examiner

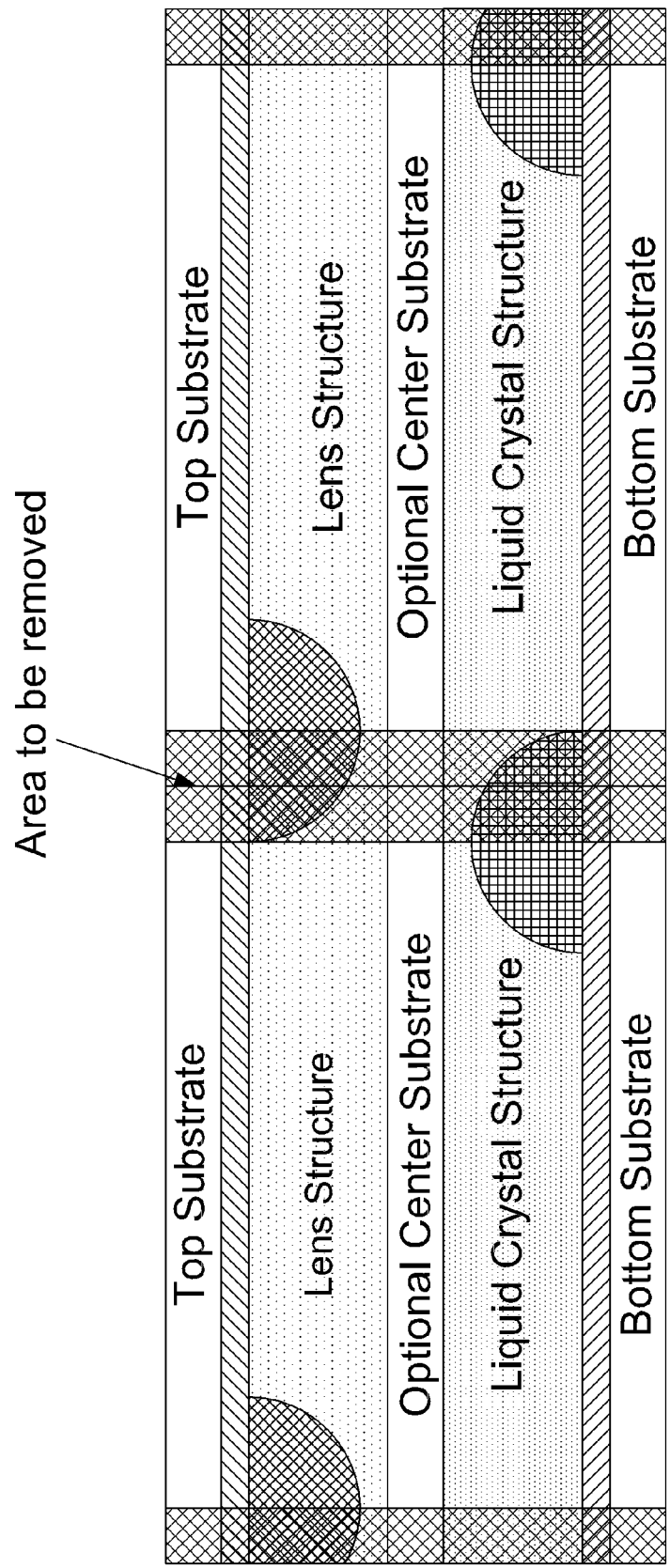

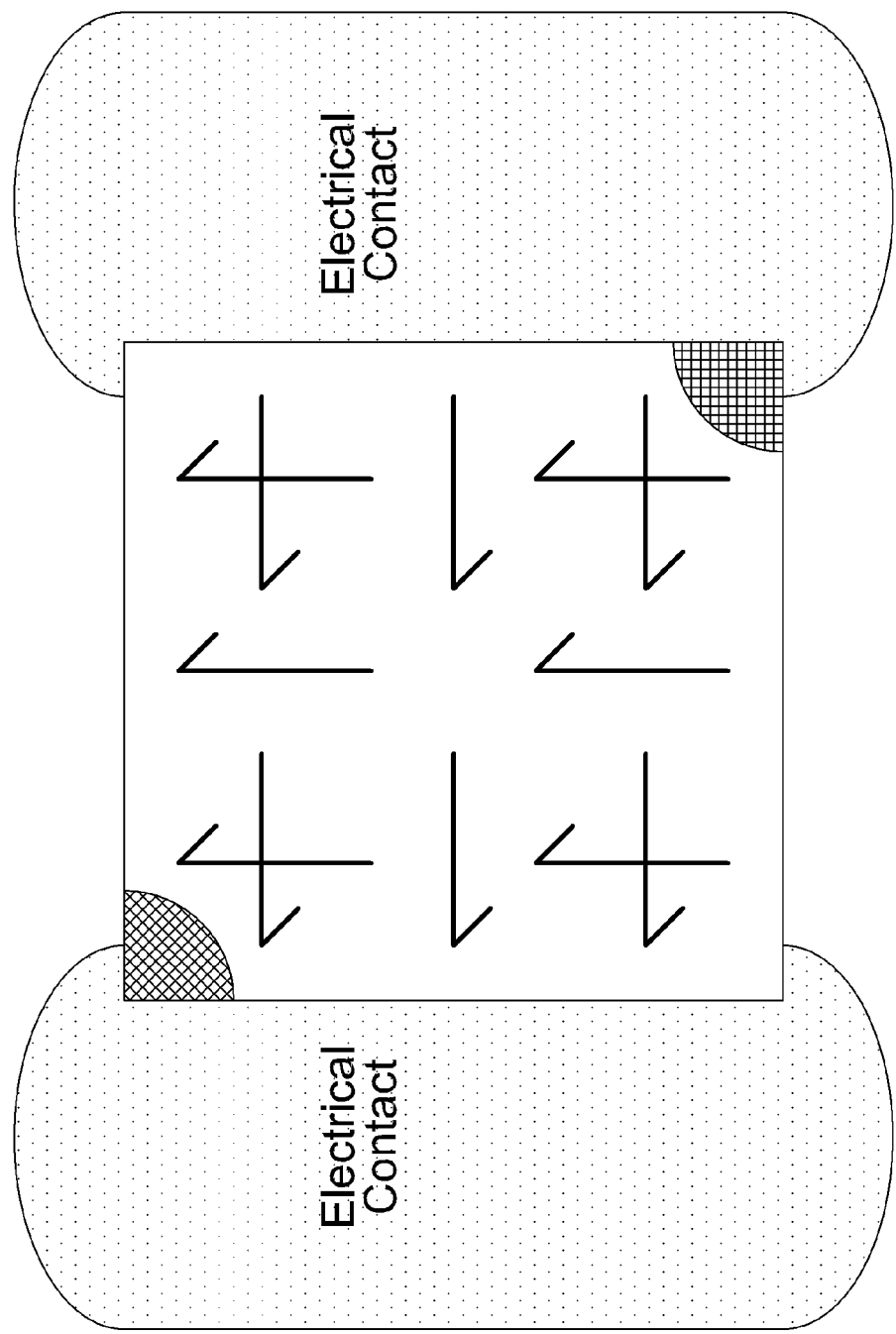

Figure 17A
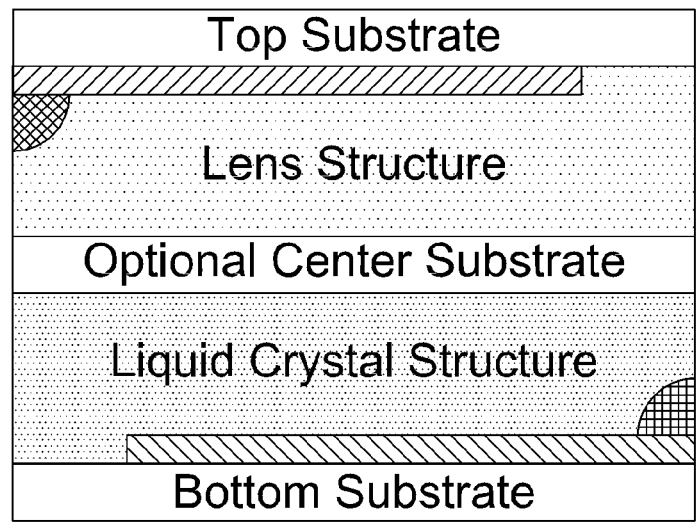
Figure 17A
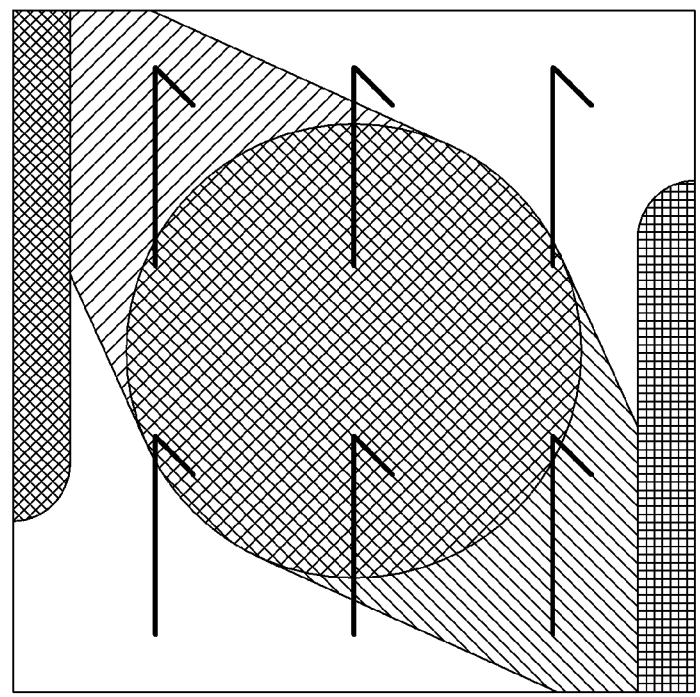
Figure 17B

Plating (or Fill) makes connection between layers

CONTACT STRUCTURE FOR A TUNABLE LIQUID CRYSTAL OPTICAL DEVICE

TECHNICAL FIELD

The present invention relates to the field of tunable liquid crystal optical devices and their manufacture. More particularly, the invention is directed to a contact structure for a tunable liquid crystal optical device and to a method for manufacturing tunable liquid crystal optical devices with such a contact structure.

BACKGROUND

As is well known in the art, the successful implementation of intelligent (self-adjustable) optical imaging systems requires devices capable of controllably changing their optical properties. One of the most important optical functions required to be adjustable is the focusing capacity and the focusing distance. Those properties are essential, for example, for the manufacturing of high quality cell phone cameras, storage/reading systems and adjustable glass of vision systems.

In modern high performance optical imaging systems, the optical zoom is obtained by the use of a mechanical movement. As a result, such imaging systems are of a relatively large size (in order to accommodate a motor, for example), heavy and generally have a slow zoom time (in the order of seconds). Several approaches to replacing the electro-mechanical zoom have been explored, including the use of liquid crystal (LC) technology. It is well known that LCs may provide huge electrically controlled refractive index changes. However, the focus tuning (which is required for optical zoom) requires the generation of spatially varying refractive index changes in the LCs, which in turn usually requires either a spatially non-uniform LC layer (e.g. a lens that is submerged in the LC cell) or a spatially varying electric field.

A simple method of obtaining a spatially varying electric field is the use of multiple (at least 3) transparent electrodes (such as Indium Tin Oxide (ITO)) distributed on the LC cell substrates. [S. T. Kowel, P. G. Kornreich, D. S. Cleverly, Adaptive liquid crystal lens, U.S. Pat. No. 4,572,616, 1986] [N. A. Riza, M. C. DeJulie, *Three-terminal adaptive sematic liquid-crystal lens device*, Opt. Lett. 19, pp. 1013-1015, 1994] However, the fabrication of such structures requires sub-micrometer precision, their electrical driving requires rather complex electronic micro-processing and their operation is degraded by light diffraction and scattering.

Another solution that has been proposed is the combination of planar and curved electrodes, allowing the use of standard (transparent) electrodes and LC cells having two planar internal surfaces. [*Liquid Crystal Lens with Spherical Electrode*, B. Wang, M. Ye, M. Honma, T. Nose, S. Sato, Jpn. J. Appl. Phys. Vol. 41 (2002), pp. L1232-L1233, Part 2, No. 11A, 1 November] The non-uniform (centrally symmetric) electric field is obtained thanks to the geometrical lens-like form of the "external" curved surface which is coated by the upper electrode. In fact, the planar LC layer is sandwiched between two glass substrates. The planar ITO electrode is coated on the bottom (plane) surface of one substrate, while the second electrode is fabricated on the top of the curved zone. Such structure is difficult to fabricate and has a 0-voltage lensing property (what we call "action-at-0-voltage"), which may cause problems if an unexpected voltage failure happens.

Various geometrical solutions have been proposed to avoid the use of multiple and complex electrodes. One of them is based on the use of a two-dimensional geometrical form of electrodes. For example, a hole-patterned electrode may be used, wherein a standard cell with LC sandwiched between two substrates, the bottom of which is coated by an ITO, has a hole in the upper electrode. The application of the voltage between the upper and lower electrodes generates a centrally symmetric electric field, which reorients the LC director in a spatially non-uniform (centrally symmetric) way. The main drawback of this structure is the necessity to use very thick LC layers to be able to obtain the desired spatial profile of the electric field in the LC layer and maintain good optical quality of the lens (particularly to avoid optical aberrations).

In a completely different approach, it is also known to use the gradient of the dielectric permittivity of materials at low frequency (e.g. 1 kHz) electric field to obtain the non-uniform electric field. More specifically, an intermediate layer is inserted between two control electrodes to generate the desired gradient of the driving electric field, where this intermediate layer is made of glass and has spatially non-uniform thickness. [B. Wang, M. Ye, S. Sato, *Lens of electrically controllable focal length made by a glass lens and liquid crystal layers*, Applied Optics, V. 43, No. 17, pp. 3420-3425, 2004] The remaining part of the intermediate space is filled by air. The application of the low frequency electric voltage through the electrodes generates a spatially non-uniform electric field inside the LC cell, because of the non-uniformity of the dielectric permittivity of the intermediate media. The electric field in the central part of the cell will thus be different (weaker) than the electric field near the border. Unfortunately, this approach also has problems, notably the inherent 0-voltage lensing effect, the necessity of having multiple antireflection coatings to avoid high optical losses due to Fresnel reflections on multiple glass-air surfaces and the fact that the achievable contrast of the electric field is severely limited.

International Publication No. WO 2007/098602 A1 [T. Galstian, V. Presniakov, K. Asatryan, *Method and apparatus for spatially modulated electric field generation and electro-optical tuning using liquid crystals*, Sep. 7, 2007] discloses an improvement to the previous approach, wherein the dependence of material dielectric permittivity upon the frequency of electric field is used to obtain a LC-based tunable device. More specifically, a hidden structure, which is optically uniform but strongly non-uniform for lower frequency electric field, is inserted in the lens between the electrodes to act as an electric field modulation layer. This hidden structure fills the remaining space between the LC cell and the intermediate glass layer with a specific material having a low-frequency dielectric permittivity and a high (optical) frequency refractive index (e.g. a water-based solution, polar liquids and gels). By using in the hidden structure a combination of such a water-based solution and an intermediate material having a very low optical refractive index and low-frequency dielectric permittivity (e.g. fluorinated polymer), it is actually possible to resolve all of the prior art drawbacks described above.

A tunable optical device based on liquid crystal technology thus has many advantages over existing alternatives, including among others a planar construction. The flat transparent plates containing the liquid crystal and making up the liquid crystal layer are simple to prepare to receive the liquid crystal, as is known in the art. Since the liquid crystal responds to the electric field, and the electric field is greater when the distance between the electrodes is smaller, the flat geometry is useful in keeping the construction compact. Such flat and compact optical devices, which have no moving parts and are tunable to change optical properties, such as focus, magnification, steering angle, etc., are thus highly desirable. However, tunable optical devices based on liquid crystal technology can be expensive to manufacture. It has been discovered that the costs associated with this manufacture would decrease importantly if multiple devices could be fabricated in parallel.

One area where fabrication in parallel has been practiced to great success is in the manufacturing of semiconductor devices. Semiconductor devices are fabricated in two dimensional, planar arrays called wafers, which are only singulated in one of the final processing steps. This process is generally referred to as wafer scale processing. The singulated devices are typically connected using contact pads on the top surface to permit contact to be made from one surface of each device.

Fabrication in parallel of multiple tunable liquid crystal devices can be implemented in a similar manner as done for semiconductor devices; however, the tunable liquid crystal device has separate contacts on different levels that must be contacted (e.g. electrical connection is required between the transparent electrodes in order to power the optical properties of the liquid crystal). Several problems have been found when following a wafer scale manufacturing approach in the case of tunable liquid crystal devices. First, the contact pads may interfere with the optical device, either due to the area taken up by the contact pads or by the thickness of the contact members that can interfere with the tunable optical device being inserted into the whole lens assembly. Second, since the conductive layers are too thin to connect to from the sides of a singulated device and it is costly to bring all of the contacts to either the top or bottom surface of the device, electrical vias must be provided through process layers (e.g. glass layers) in order to reach the transparent electrode layers.

Consequently, there exists a need in the industry to provide an improved contact structure for a tunable liquid crystal optical device in order to allow for a successful parallel fabrication of multiple devices with reduced manufacturing costs.

SUMMARY

The present invention is directed to a contact structure for a singulated tunable liquid crystal device that facilitates contact, and thus electrical connection, between the conductive layers of the liquid crystal device, in the context of wafer scale manufacturing of such devices.

In accordance with a broad aspect, the present invention provides a tunable liquid crystal optical device defining an optical aperture and having a layered structure. The device comprises a film electrode formed on a surface of a first substrate and covered by a second substrate, and a contact structure filling a volume within the layered structure of the device and contacting the film electrode. The contact structure is located outside of the optical aperture and provides an electrical connection surface much larger than a thickness of the film electrode.

In one embodiment of the present invention, the contact structure is an edge contact structure, such that the conductive layers of a singulated device can be edge connected. In a variant embodiment of the present invention, the contact structure is defined within the layered structure of the tunable liquid crystal device in a non-optical peripheral area. Although the latter case requires that a suitable vertical through hole be provided in the device, the presence of the contact structure within the device makes contact easier than in prior art through hole-based designs.

In accordance with another broad aspect, the present invention provides a method of manufacturing a tunable liquid crystal optical device that defines an optical aperture and has a layered structure including a liquid crystal layer and a lens structure layer. The method comprises forming a film electrode on a surface of a substrate and forming a contact structure connected to the film electrode, the contact structure providing an electrical contact surface much larger than a thickness of the film electrode. The method also includes using the substrate with the film electrode and the contact structure formed thereon in the construction of the layered structure of the device, whereby the contact structure fills a volume within the layered structure and is located outside of the optical aperture of the device.

BRIEF DESCRIPTION OF THE DRAWINGS

The invention will be better understood by way of the following non-limiting detailed description of examples of implementation of the invention, with reference to the appended drawings, in which:

FIGS. 9A and 9B are side and plan views, respectively, of a 2×2 region of a larger array of liquid crystal optical devices before cutting occurs, where the gray areas are regions that will be removed in the cutting process, in accordance with a non-limiting example of implementation of the present invention;

FIGS. 10A and 10B are side and plan views, respectively, of the complete TLCL of FIGS. 8C and 8D with external full side contacts bonded to the device and making electrical contact with the contact areas of the contact structure, in accordance with a non-limiting example of implementation of the present invention;

FIGS. 17A and 17B are side and top views, respectively, of one half of a TLCL with a contact structure formed along a side of the device, in accordance with a non-limiting example of implementation of the present invention;

DETAILED DESCRIPTION

The present invention is directed to a contact structure for a liquid crystal optical device that allows for reliable electrical connections to be made to the conductive layers of the device in an inexpensive manner, in the context of wafer scale manufacturing of such a device.

Figure 1A:
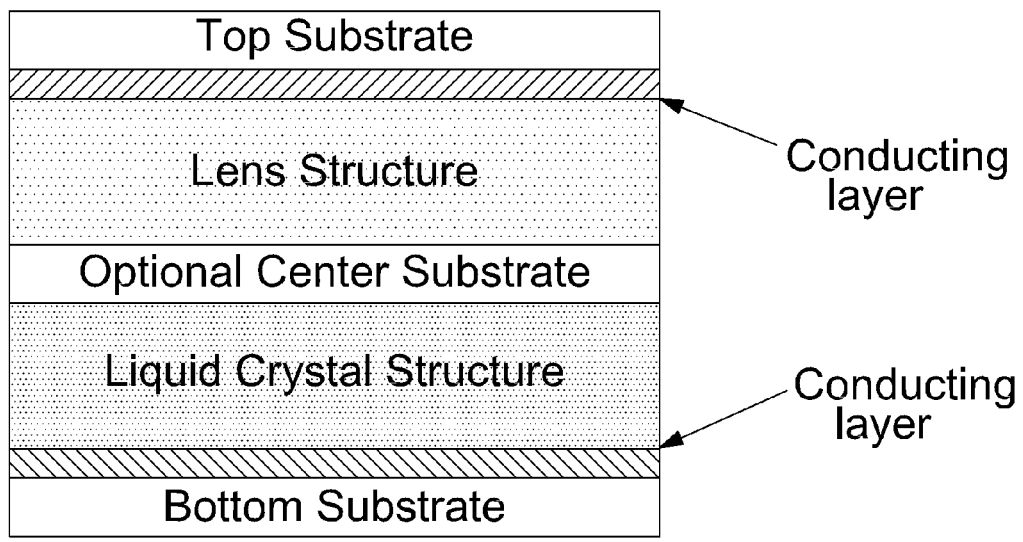
FIGS. 1A and 1B illustrate the basic structure of one half of an exemplary prior art tunable liquid crystal device (hereinafter "TLCL") in cross-section and plan view, respectively.
Figure 1B:
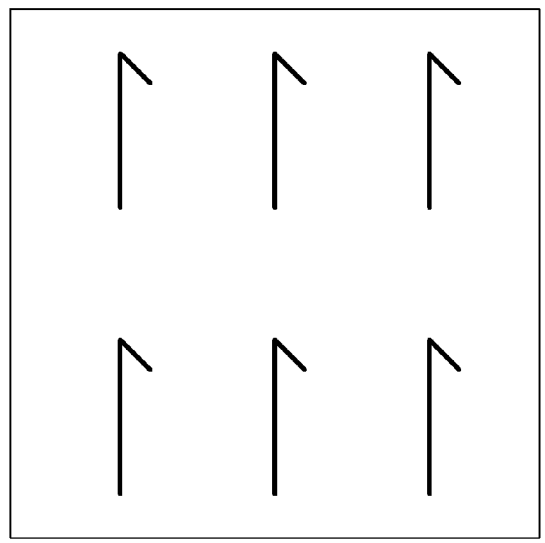

FIGS. 1A and 1B illustrate cross-section and plan views, respectively, of a prior art example of the basic structure of one half of a tunable liquid crystal device (TLCL). A complete or full TLCL is composed of two of these half TLCLs, as will be shown in the following example. Other variations of this basic TLCL structure exist and the invention disclosed herein may apply equally to those variations.

The half TLCL is composed of two main layers: the liquid crystal (LC) layer and the lens structure layer. These layers are bounded by two additional layers consisting of substrates with conductive electrodes. An optional central substrate may serve as a dividing layer between the LC layer and lens structure layer. The plan view of FIG. 1B shows one additional feature of the half TLCL, notably that the LC layer has a unique orientation along one direction. Because of this property of the LC, a half TLCL only effects one polarization (half of the light) passing through the device. In order for all of the light passing through the device to be affected by the LC, a second half TLCL, with its polarization rotated by 90 degrees, must also be used.

Figure 2A:
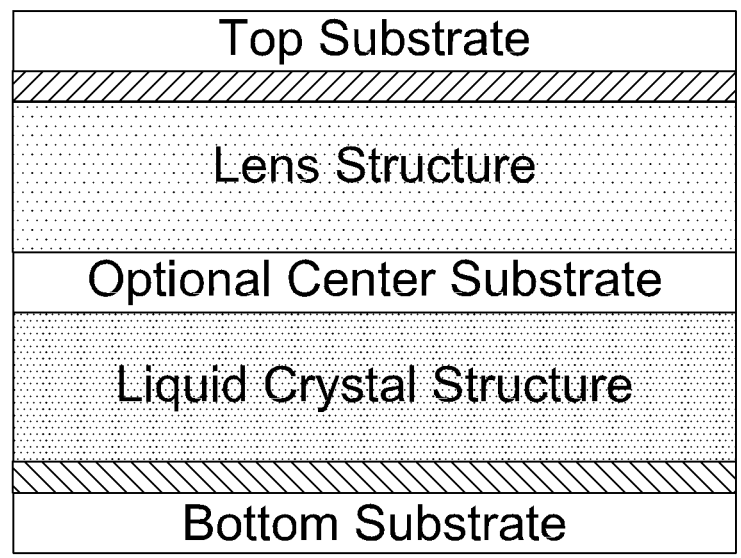
FIGS. 2A, 2B, 2C and 2D illustrate one half of an exemplary prior art TLCL juxtaposed with the second half of the TLCL, where the second half (shown in FIGS. 2C and 2D) has been rotated in the plane of the device by 90 degrees.
Figure 2B:
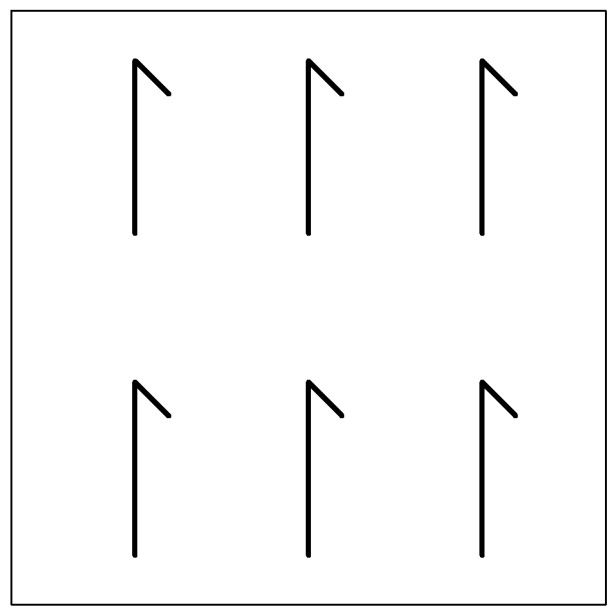
Figure 2C:
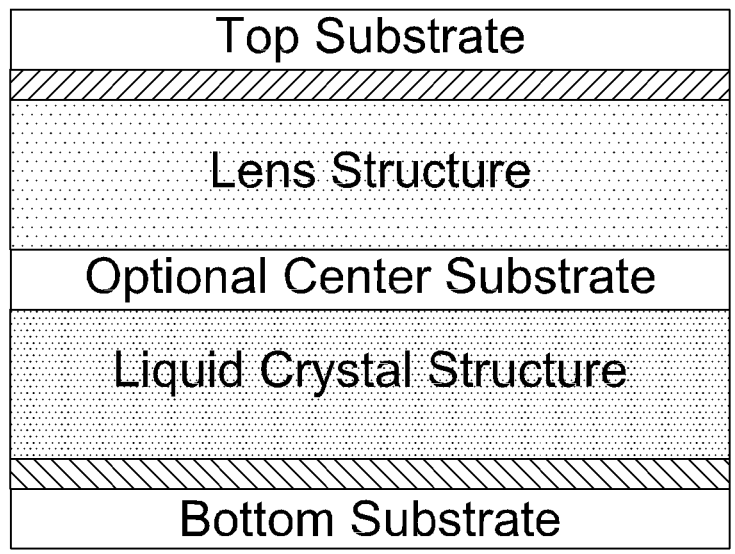
Figure 2D:
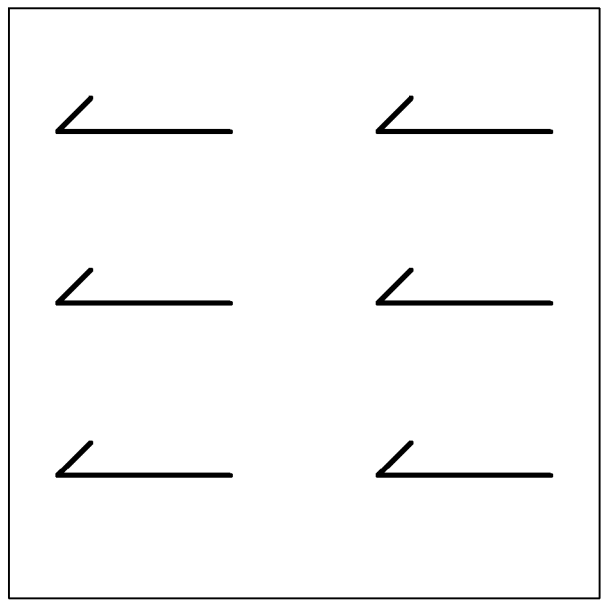

FIGS. 2A and 2C show two half TLCLs in cross-section view, the second half TLCL of FIG. 2C being rotated in the plane of the device by 90 degrees, according to a prior art example. This rotation is more clearly shown in the plan views of FIGS. 2B and 2D, which correspond to FIGS. 2A and 2C, respectively.

Figure 3A:
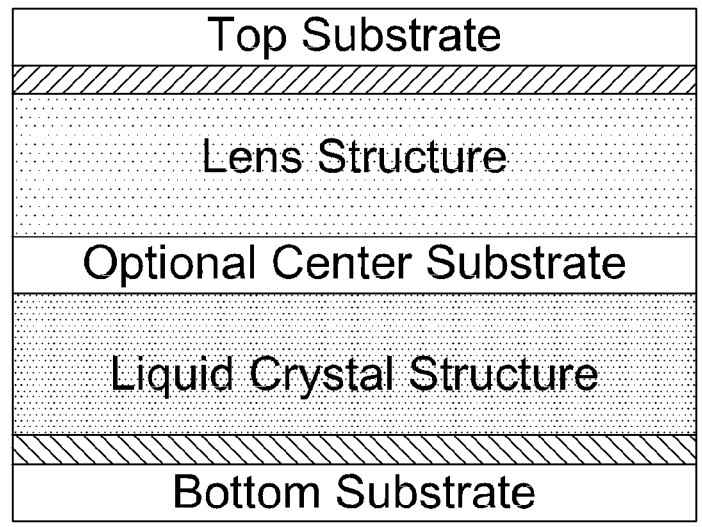
FIGS. 3A, 3B, 3C and 3D illustrate one half of an exemplary prior art TLCL juxtaposed with the second half of the TLCL, where the second half (shown in FIGS. 3C and 3D) has been rotated in the plan of the device by 90 degrees and flipped over such that the top and bottom of the second half of the TLCL are reversed relative to the first half of the TLCL.
Figure 3B:
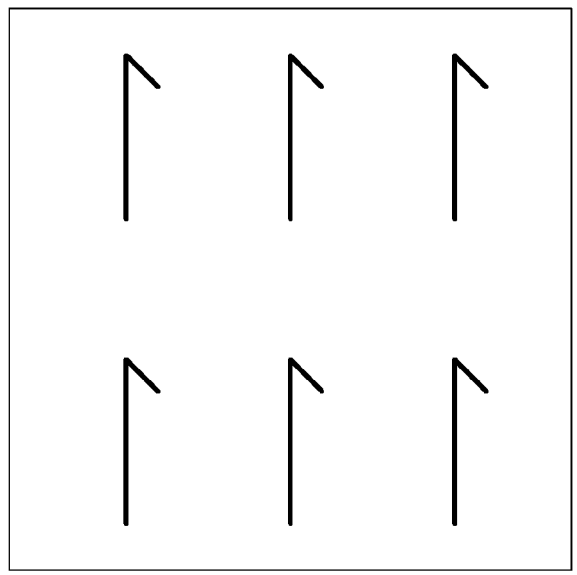
Figure 3C:
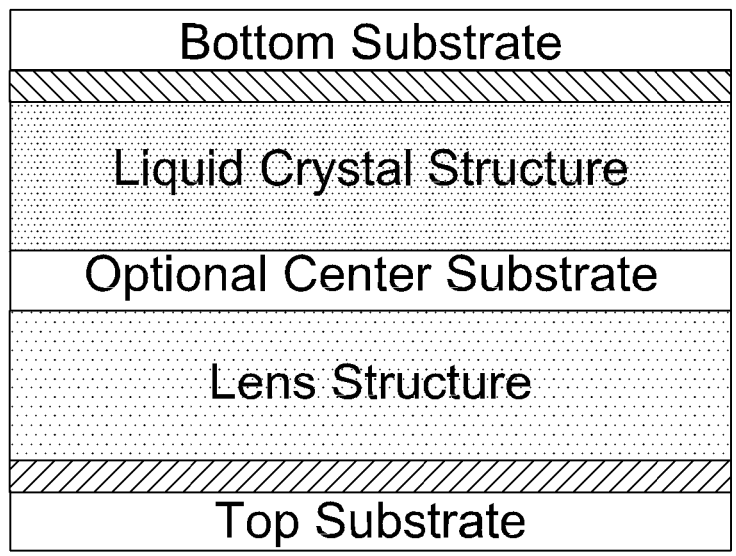
Figure 3D:
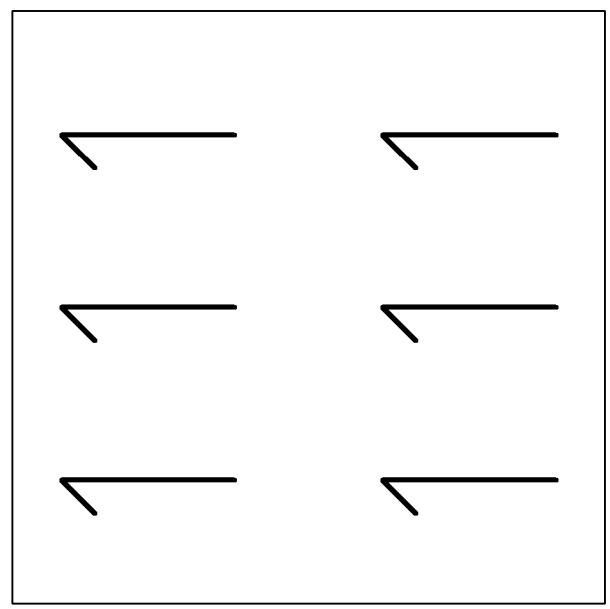

FIGS. 3A and 3C show two half TLCLs in cross-section view, the second half TLCL of FIG. 3C being rotated in the plane of the device by 90 degrees and flipped over such that the top and bottom of the device are reversed relative to the half TLCL of FIG. 3A, according to a prior art example. This rotation and flipping is more clearly shown in the plan views of FIGS. 3B and 3D, which correspond to FIGS. 3A and 3C, respectively.

Figure 4A:
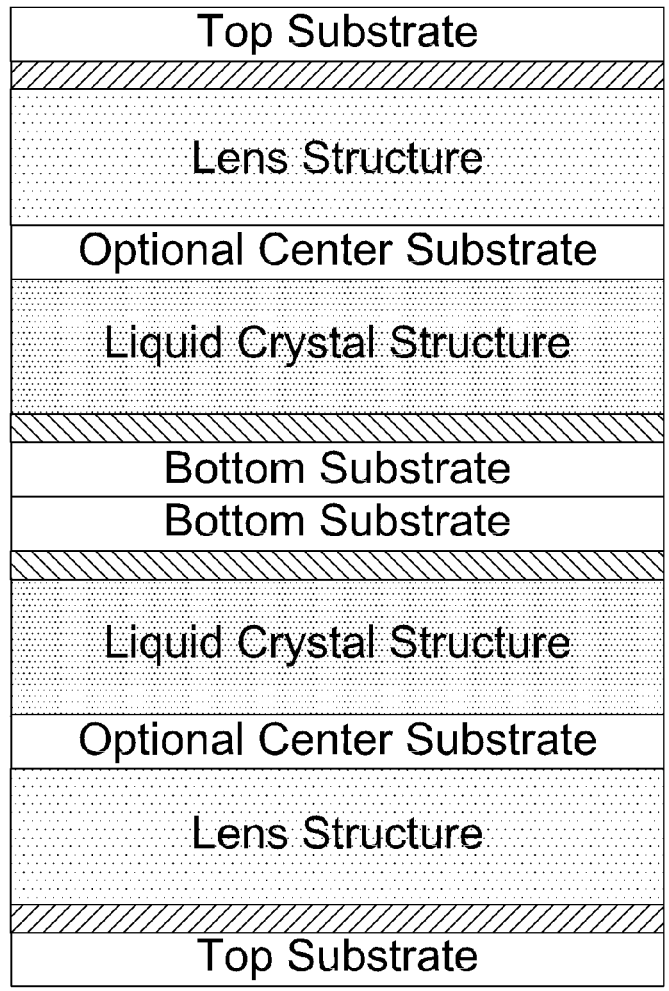
FIGS. 4A and 4B illustrate an exemplary prior art complete TLCL formed by mating together the first and second halves of the TLCL of FIG. 3, in side view and plan view (showing that both polarizations are provided), respectively.
Figure 4B:
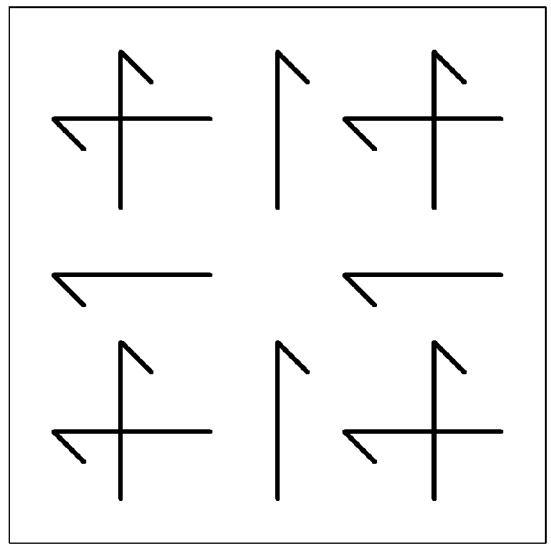

In FIG. 4A, a complete TLCL according to the present invention is illustrated, similar to the embodiment illustrated in FIG. 11 of published International Patent Application Publication WO 2007/098602 A1 [T. Galstian, V. Presniakov, K. Asatryan, *Method and apparatus for spatially modulated electric field generation and electro-optical tuning using liquid crystals*, Sep. 7, 2007]. More specifically, the two half TLCLs of FIGS. 3A and 3C are mated together in accordance with the present invention, connected at their bottom surfaces. The resulting combined polarization of the complete TLCL is shown in FIG. 4B.

In order to optically power the complete TLCL, the conductive layers (e.g. electrodes) adjacent to the lens structure layers in both half TLCLs must be connected together and to an external contact. Similarly, the conductive layers (e.g. electrodes) adjacent to the LC layers in both half TLCLs must be connected together and to a different external contact. Making these electrical connections in such a tunable liquid crystal device is neither simple nor inexpensive. Since the conductive layers are necessarily very thin, making robust and reliable connections to the edges is difficult to do. Furthermore, care must be taken such that, when making the contacts, the opposite electrodes are not also contacted.

A non-limiting example of how to manufacture a complete TLCL will now be described. The process starts with bare glass substrates. The glass used for these substrates is typically a borosilicate glass, which is manufactured in very thin thicknesses, 100 microns or less. The glass is cleaned using processes recommended by the glass manufacturer. These include a combination of detergent soaks, ultrasonic cleaning and de-ionized water rinses.

The clean glass is then coated with a transparent conductive thin film electrode. Typically, this electrode is an indium tin oxide (ITO) that is sputter deposited on the glass; however, other thin film deposition techniques, such as evaporation, may also be used. In order to obtain a patterned electrode, the conductive material is deposited through a shadow mask, where the areas not to be coated are blocked by a metal mask.

The next step is to fabricate the liquid crystal (LC) cell. The glass wafers that form the upper and lower surfaces of the LC cell are first coated with an alignment layer. This layer serves to align the liquid crystal molecules. Typically, this will result in a surface with some microscopic texture. It may be a polyimide layer that is later textured by rubbing with a cloth or it may be an oxide film that is deposited in a manner which results in a highly textured surface.

After the textured surface is formed, the LC cell itself is fabricated. Three materials are deposited on one of the glass wafers that form the LC cell. The first material is any additional conducting material. This is often a conductive adhesive or solder. The second material is a non-conductive adhesive, which is also deposited to define the area to be filled with liquid crystal material. Non-conductive adhesives are typically acrylic, epoxy or silicone materials. The third material is the liquid crystal material itself. In one or more of the deposited materials, spacers are included, typically glass or polymer spheres of a tightly controlled size, which act to set the thickness of the LC cell. Finally, the second glass wafer is placed on top of the deposited materials and the adhesive materials are cured using heat, pressure and/or light.

Next, a lens structure is fabricated on a third glass wafer. The lens structure is typically fabricated from polymer layers with varying electrical and optical properties. Additional conductive materials (such as conductive adhesives and solders) and structural material (such as glass, polymer or metal spacers) may also be incorporated. After fabrication, the lens structure is then bonded to the LC cell using an optical adhesive material. At this point, one half of a TLCL has been fabricated in wafer form.

The next step involves bonding two half TLCL wafers together. The two wafers are placed with their bottom glass substrates back to back. In addition, one wafer is rotated 90 degrees relative to the other, so that the alignment of the LC cells in one half TLCL is at 90 degrees with respect to the other. An optical adhesive is placed between the two wafers and the wafers are aligned such that the optical axes of the individual devices in each wafer are aligned. The optical adhesive is then cured using heat, pressure and/or light.

The next step involves singulating the TLCLs from the wafer. Singulating may be done via a scribe and break process, a mechanical dicing process or an optical dicing process, among other possibilities. In a scribe and break process, a linear defect (the scribe line) is formed in the wafer and then the wafer is stressed until the wafer fractures along the linear defect. For mechanical dicing, an abrasive wheel is used to remove a strip of material that separates a part of the wafer. In an optical dicing process, a laser is used to remove a strip of material to separate the wafer.

The singulated complete TLCL can then be packaged by making contact to wires, lead frames or flexible circuits. A conductive adhesive or solder may be used to make these connections, after which the area around the perimeter of the TLCL is filled with an encapsulating material that protects the TLCL from harsh environments and mechanical abuse.

Figure 5A:
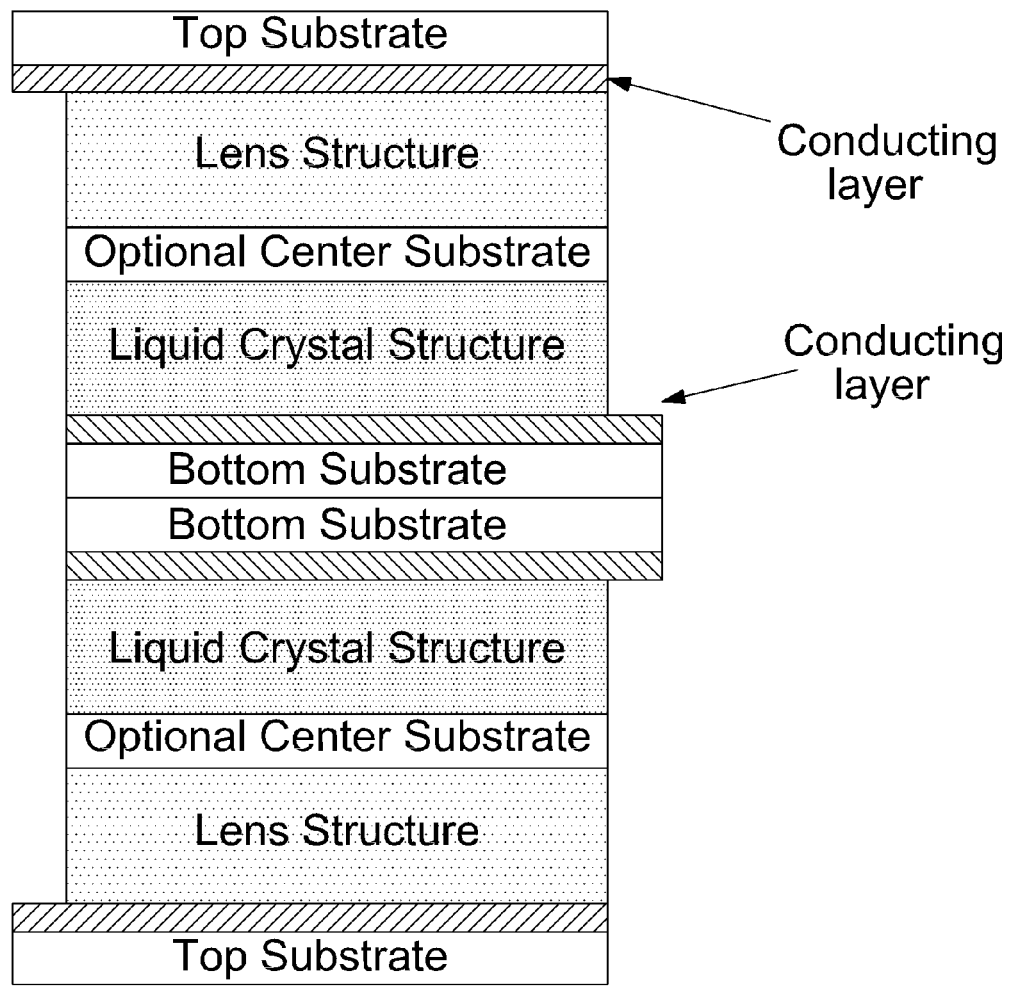
FIGS. 5A and 5B illustrate a side view and a plan view, respectively, of a complete TLCL (first and second halves of a TLCL mated together), where the outer substrates with conducting electrodes are shifted relative to each other, in accordance with an embodiment of the present invention.
Figure 5B:
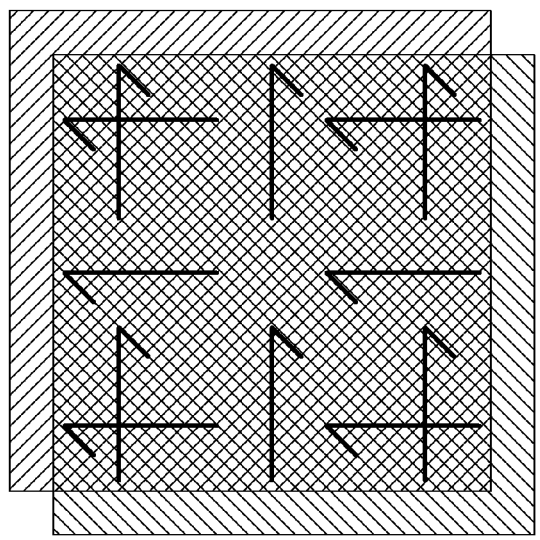
Figure 6A:
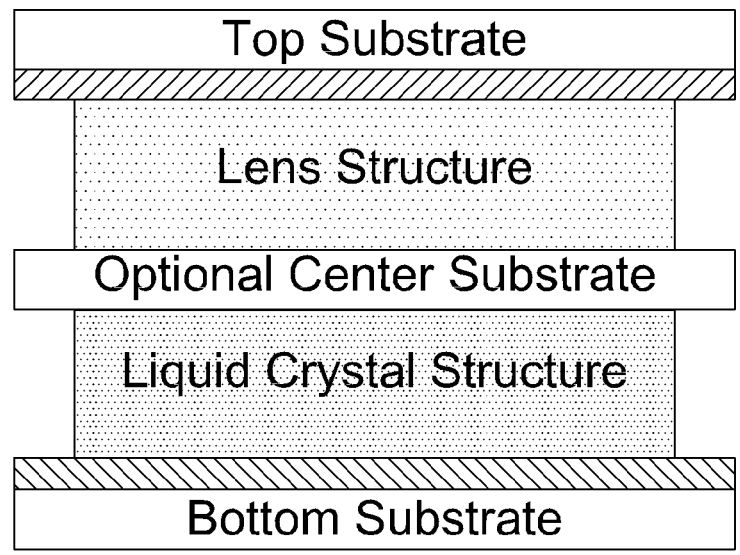
FIGS. 6A and 6B are size and top views, respectively, of one half of a TLCL with voids left along the edges of the cell, in accordance with a variant embodiment of the present invention.
Figure 6B:
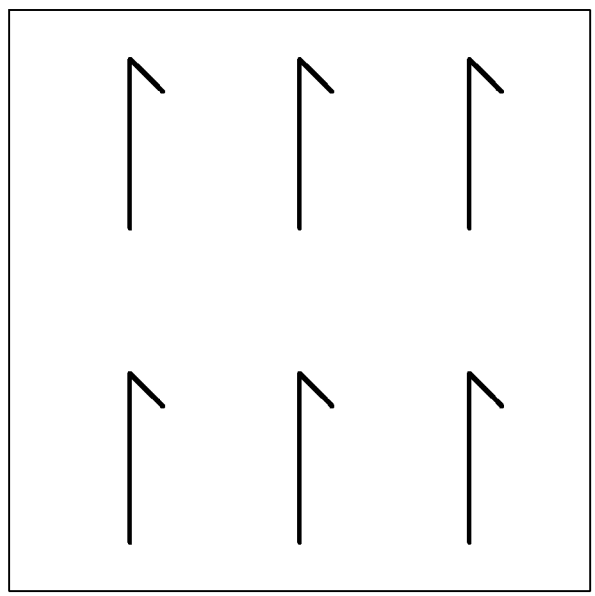
Figure 6C:
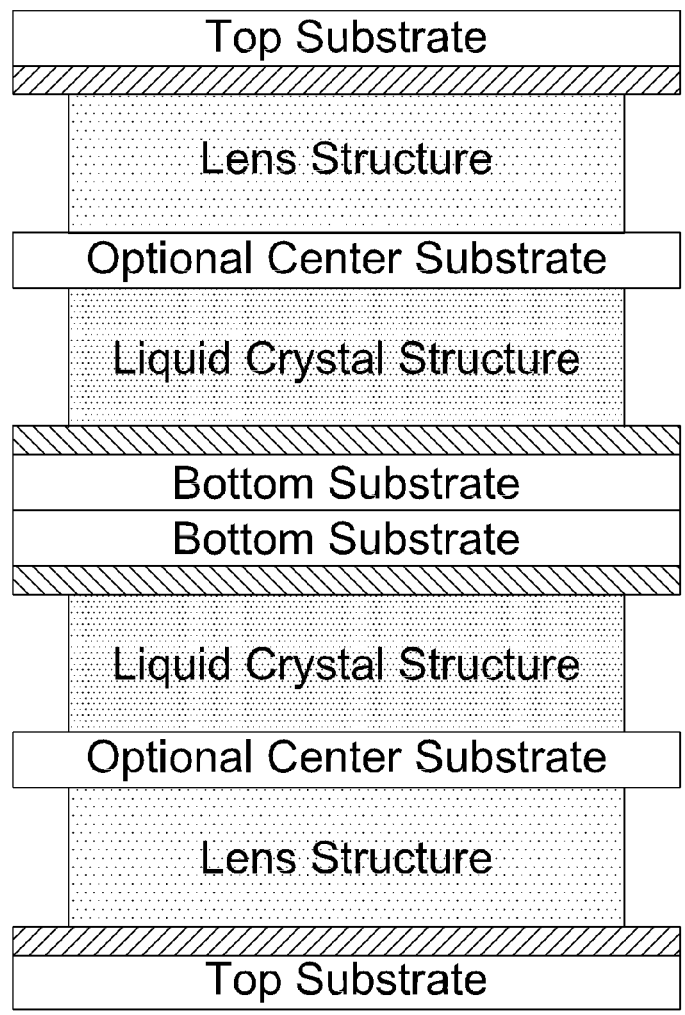
FIGS. 6C and 6D are side and top views, respectively, of a complete TLCL formed by connecting together two half TLCLs of FIG. 6A at their bottom surfaces.
Figure 6D:
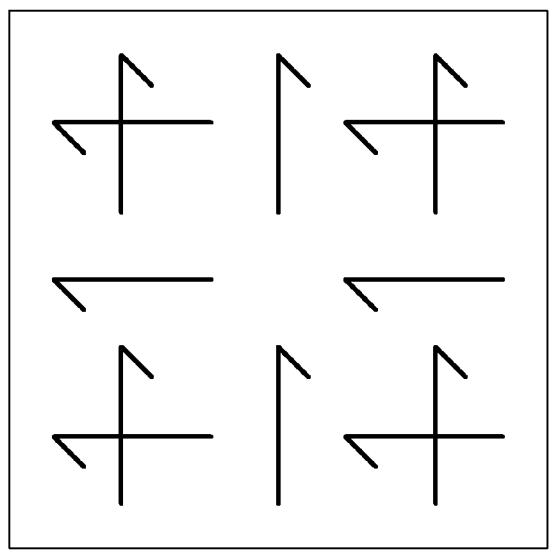
Figure 7A:
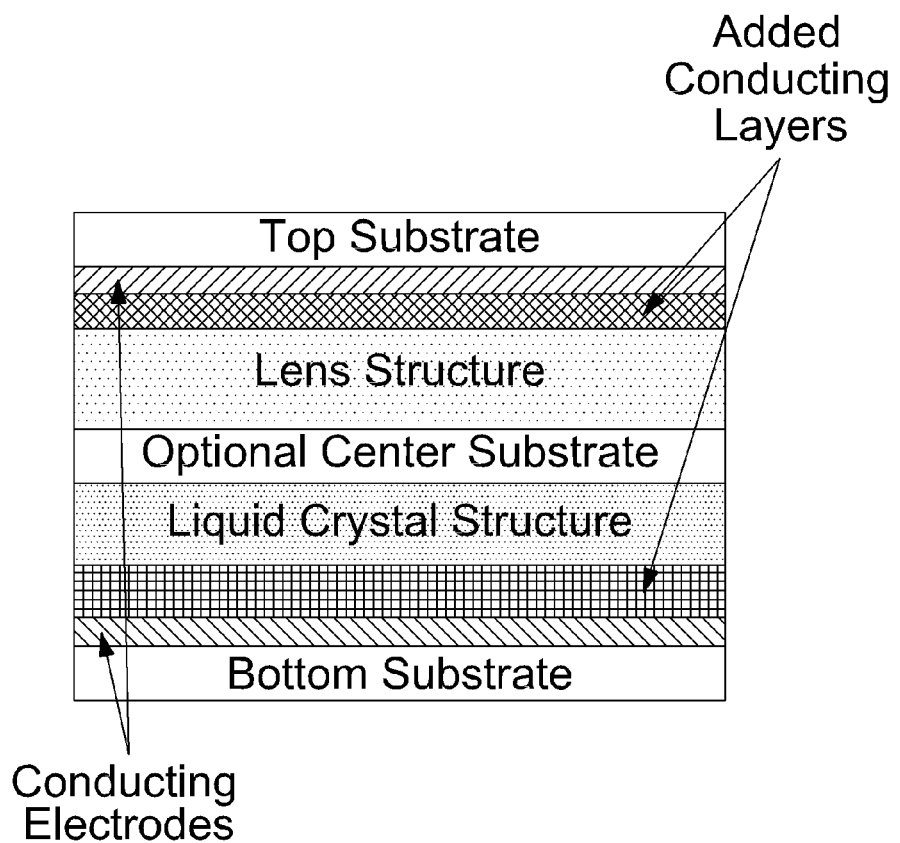
FIGS. 7A and 7B are side and top views, respectively, of one half of a TLCL with a contact structure including an additional, thicker conducting structure formed around the perimeter of each electrode layer, in accordance with another variant embodiment of the present invention.
Figure 7B:
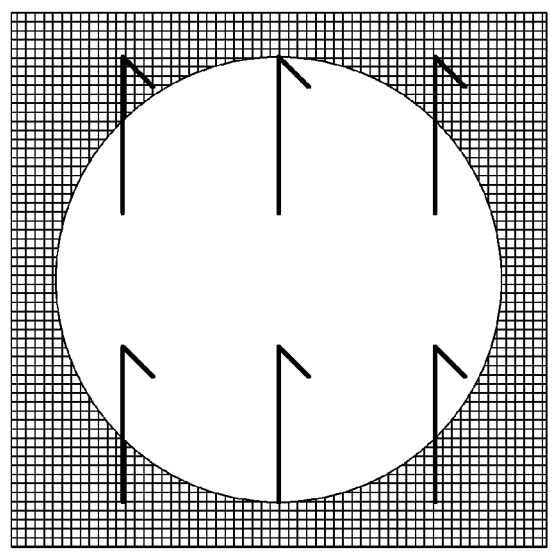
Figure 7C:
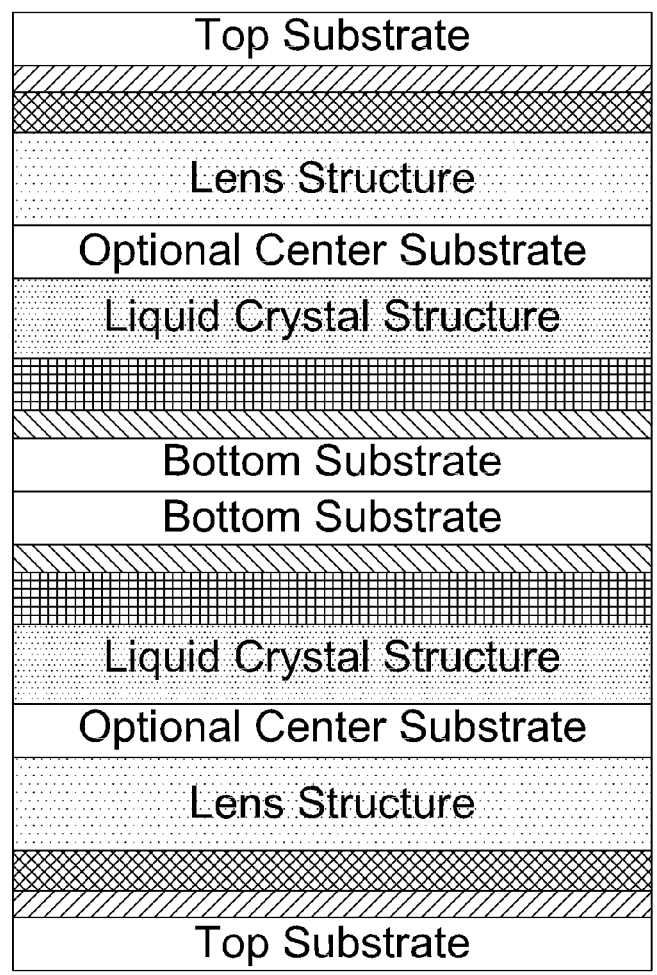
FIGS. 7C and 7D are side and top views, respectively, of a complete TLCL formed by connecting together two half TLCLs of FIG. 7A at their bottom surfaces.
Figure 7D:
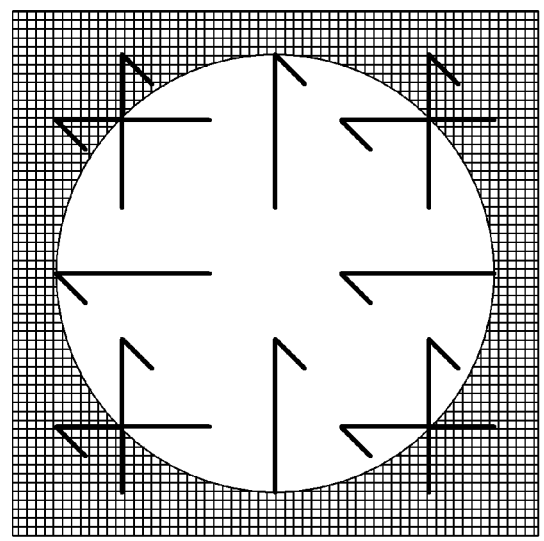

FIG. 5A is a cross-sectional view of a complete TLCL in which each half TLCL has its outer substrates with conducting electrode layers shifted relative to each other, according to an embodiment of the present invention. In the corresponding plan view of FIG. 5B, the shading of the two electrodes is shown differently for clarity. Advantageously, this configuration of a complete TLCL allows for the face of each electrode to be exposed, making reliable contact more likely. However, there are a number of problems with this configuration. First, there is still some possibility of unintentionally shorting the different electrodes together. Second, the substrates with the electrodes tend to be very thin, making the protruding edges very fragile. The biggest disadvantage is the difficulty in fabricating this structure as a wafer (an extended two dimensional array). In a true wafer scale device, after completing the core structure, the parts are cut into individual devices and packaged. In the example of FIG. 5A, it might be possible to imagine how to cut this device from an array of parts, but not without difficulties such as multiple partial cuts at different points in the process.

FIGS. 6A to 6D illustrate the manufacturing of a complete TLCL with exposed contacts, according to a variant embodiment of the present invention. In this example, voids are left along the edges of the cells, allowing good access to the electrodes and simple cutting of the array. However, the exposed substrate structure is fragile and it is difficult to prevent shorting of the different electrodes.

FIGS. 7A to 7D illustrate the manufacturing of a complete TLCL according to yet another variant embodiment of the present invention, wherein electrical contacting is possible after a simple singulation step. In this example, the TLCL has a contact structure that includes an additional, thicker conducting structure formed around the perimeter of each electrode. After cutting, this layer of additional conducting material provides better access to the contacts from the edge and, with some care, shorting of the contacts may be avoided. However, this care to avoid shorting may involve a more complex and expensive packaging process.

A further refinement to this variant embodiment of the present invention is shown in the non-limiting example of implementation of FIGS. 8A to 8D, in which the additional conducting material of the contact structure is deposited only locally on the conducting electrodes of the device. The location at which the additional conducting material is deposited differs for each of the conducting electrodes in the half TLCL, such as on opposite sides or corners, as shown. In order to manufacture the complete TLCL of FIG. 8C, a second identical half TLCL is rotated, flipped and mated to the first half TLCL. The resulting structure has the contact areas added for the lens structure and the contact areas added for the LC layer segregated to opposite sides or corners, as shown. This arrangement makes it possible to use an external contact structure (see the example of FIGS. 10A and 10B) at each corner of the device in order to connect to the respective contact structure areas associated with each thin film electrode for the controlling electric field. At one corner of the device, the top electrodes are connected, and at the other, the bottom electrodes are connected.

In a specific, non-limiting example, the extra conductive material that is added to the TLCL in order to form the contact structure, whether it be in the form of a layer arranged around the perimeter of each electrode or one or more localized areas on each electrode, is deposited onto the electrodes during fabrication of the TLCL. More specifically, after forming the electrode layer of the TLCL, for example by sputter depositing an ITO onto a glass substrate, the additional conductive material of the contact structure is deposited onto the electrode in turn. A shadow mask may be used to ensure that a specific geometric shape, layout and/or position of the additional conductive material is defined on the electrode layer, where this additional conductive material is typically also ITO. Various different deposition techniques may be used to deposit the additional conductive material onto the electrodes of the TLCL in order to form the contact structure, without departing from the scope of the present invention. Furthermore, the conductive structures (also referred to herein as contact areas) of the contact structure may be characterized by various different geometric shapes and sizes, without departing from the scope of the present invention. Once the conductive structures of the contact structure have been formed on the electrodes, fabrication of the TLCL can continue as described above, with the fabrication of the liquid crystal cell, the lens structure, etc.

Figure 8A:
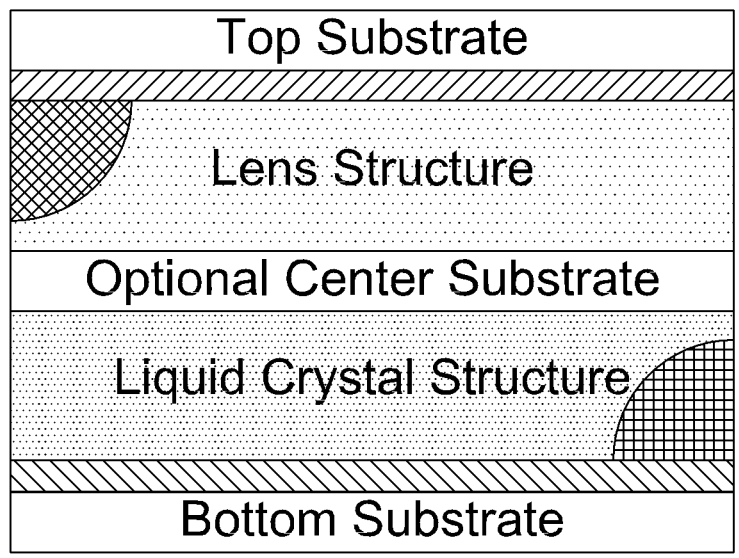
FIGS. 8A and 8B are side and top views, respectively, of one half of a TLCL with a contact structure formed of additional conducting material deposited only locally on the conducting electrode layers, in accordance with a non-limiting example of implementation of the present invention.
Figure 8B:
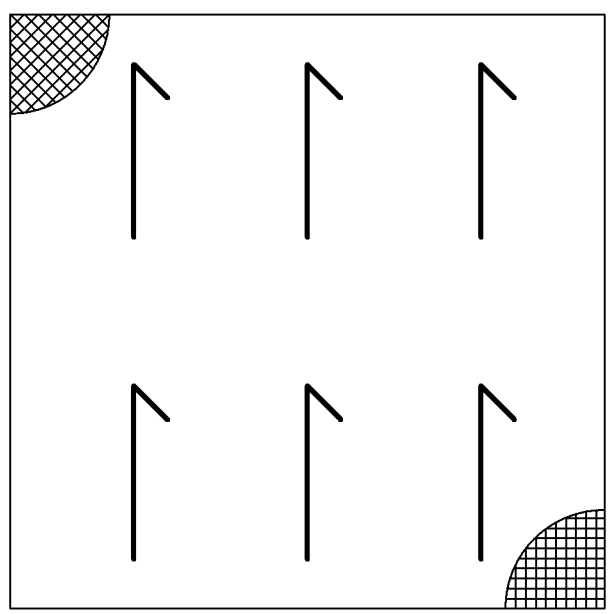
Figure 9B:
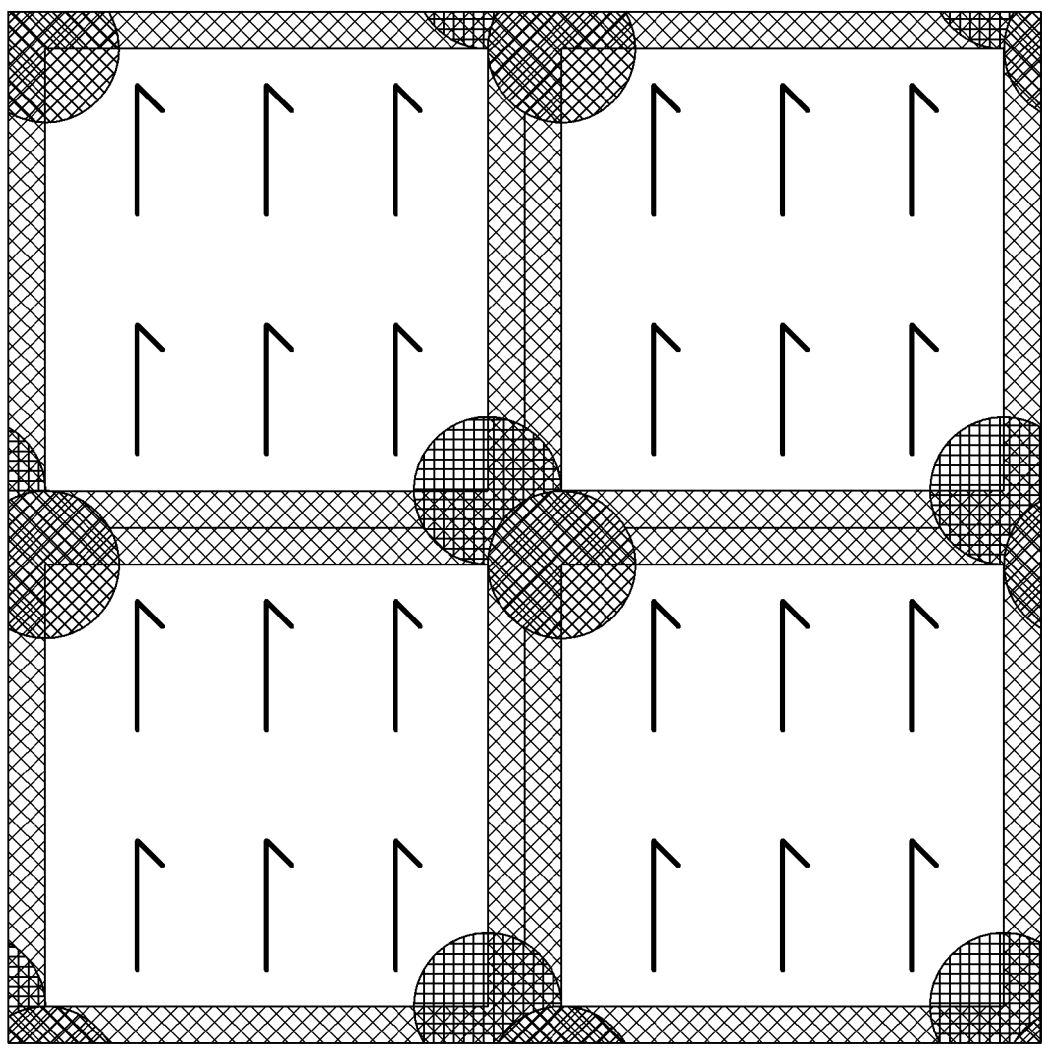
Figure 9C:
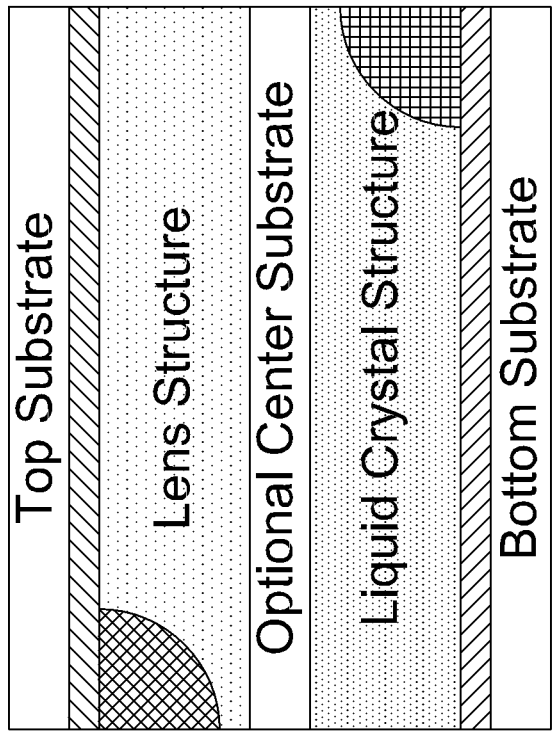
FIGS. 9C and 9D illustrate side and plan views, respectively, of the array of FIGS. 9A and 9B after cutting.
Figure 9C:
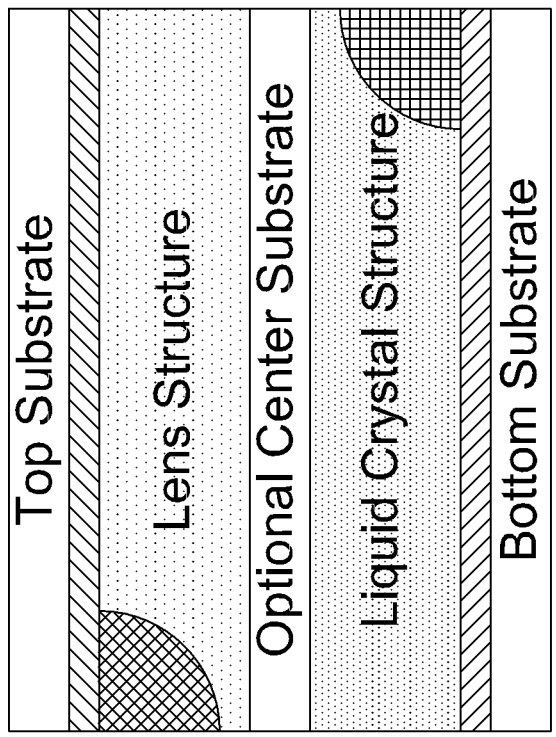
Figure 9D:
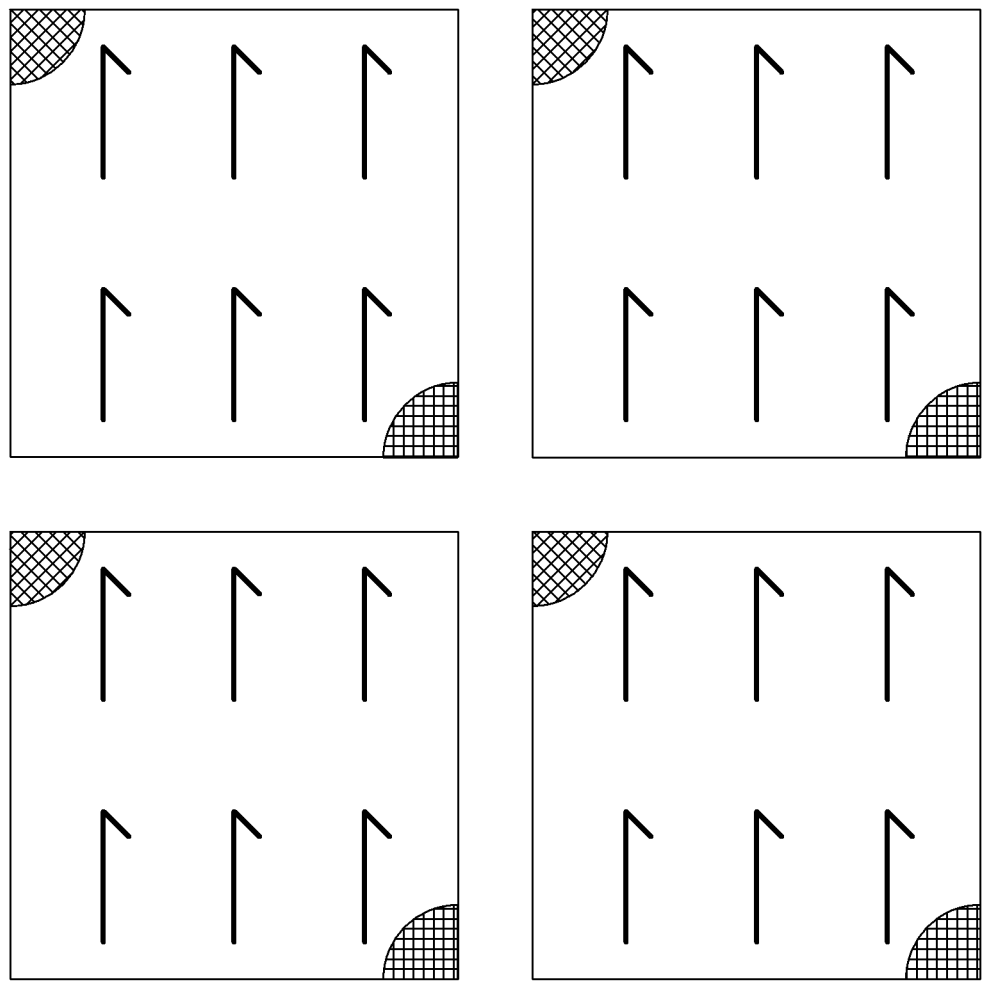

FIGS. 9A and 9B illustrate how a 2×2 region of a larger array of the half TLCL of FIG. 8A might appear, in cross-section and plan view, respectively. The gray areas are regions that will be removed in the cutting process. There may also be cutting processes where no material is removed between adjacent TLCLs. FIGS. 9C and 9D illustrate how the array may look after cutting, resulting in singulated half TLCLs.

Figure 8C:
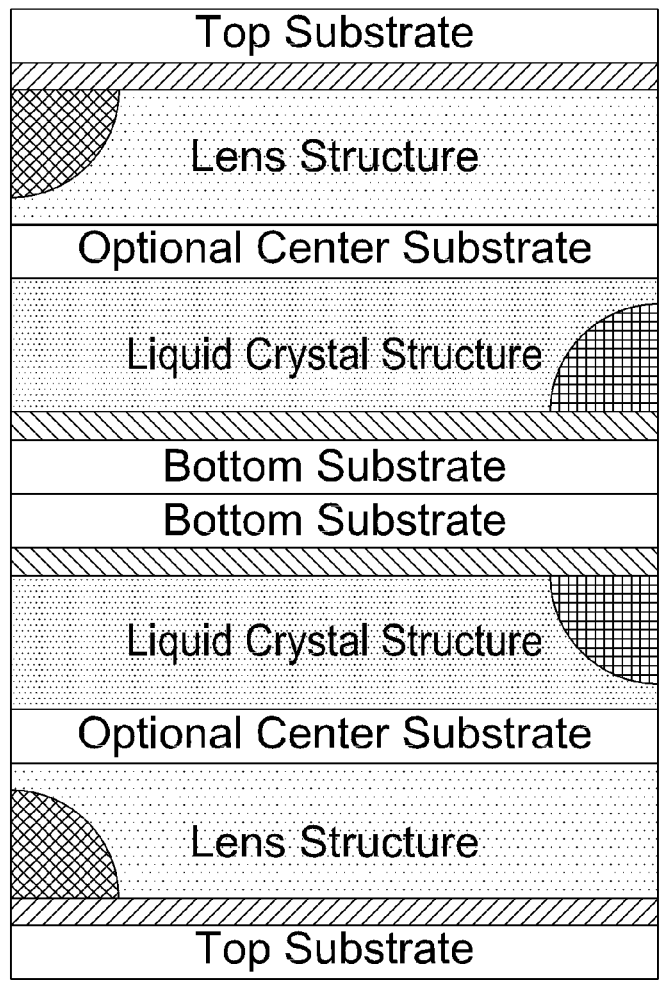
FIGS. 8C and 8D are side and top views, respectively, of a complete TLCL formed by connecting together two half TLCLs of FIG. 8A at their bottom surfaces.
Figure 8D:
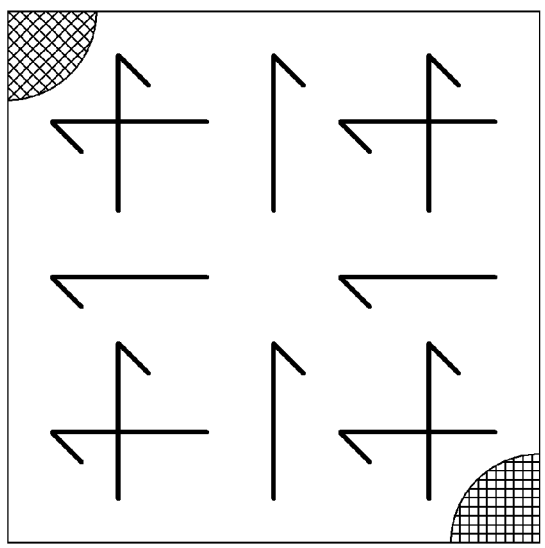
Figure 10A:
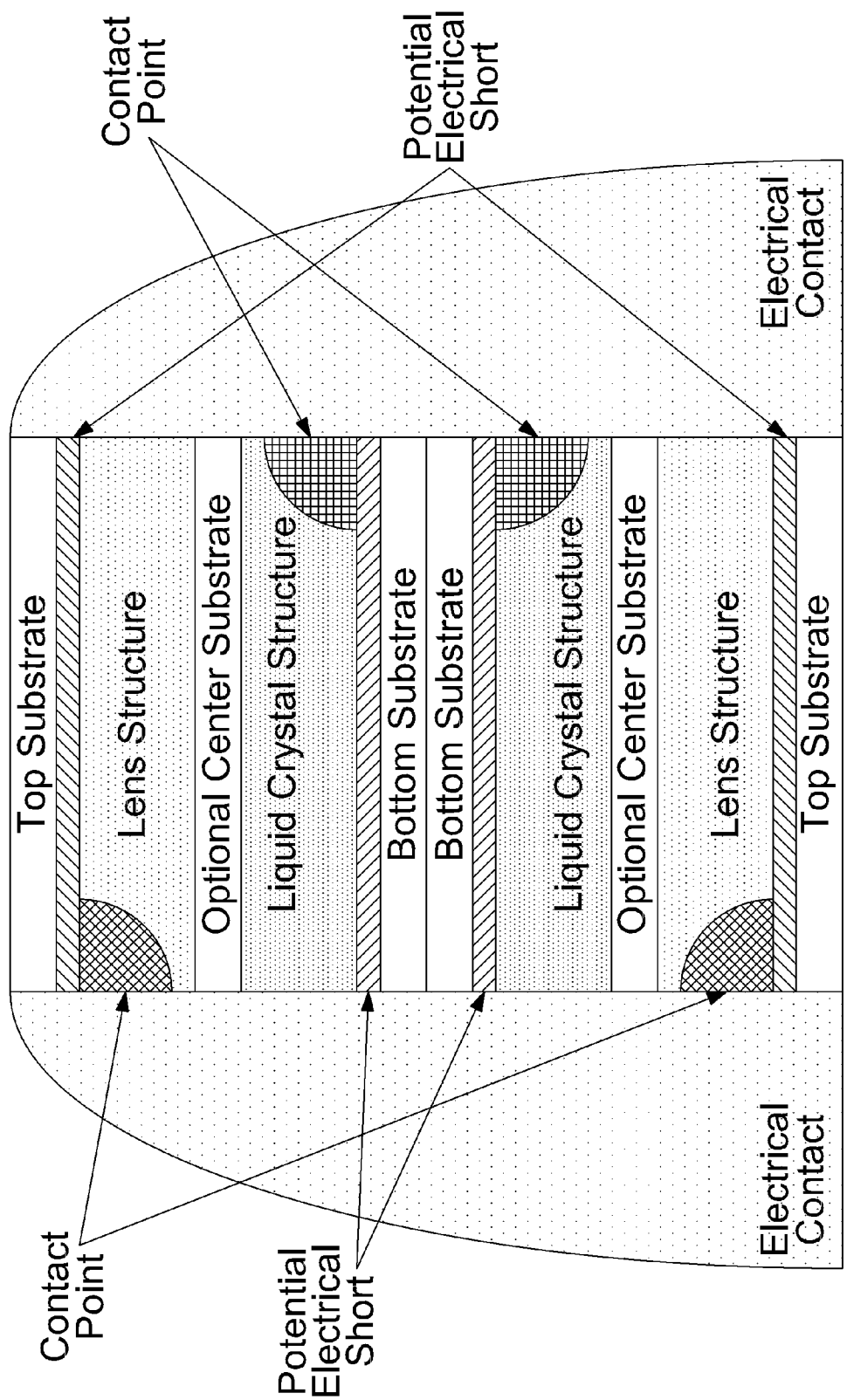

In order to package the complete TLCL of FIG. 8C, a mass of conducting material (i.e. an external contact structure) may be deposited on each side or corner of the device, as shown in FIGS. 10A and 10B, according to a non-limiting example of implementation of the present invention. Advantageously, each mass of conducting material only contacts one set of contacts of the device. However, with this TLCL configuration, it is still possible for the edges of the opposite electrodes to electrically short to the external mass of conducting material, as shown.

Figure 11A:
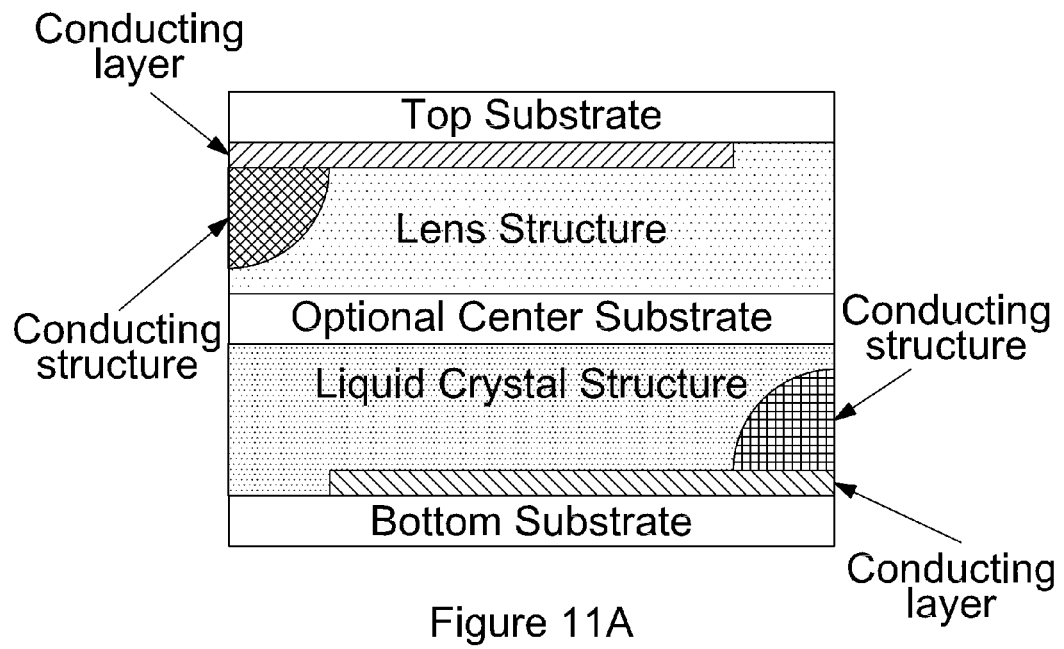
FIGS. 11A and 11B are side and plan views, respectively, of one half of a TLCL in which the top and bottom electrodes are patterned to be square but recessed from two sides so as not to have possible electrical contact on those sides, in accordance with yet another variant embodiment of the present invention.
Figure 11B:
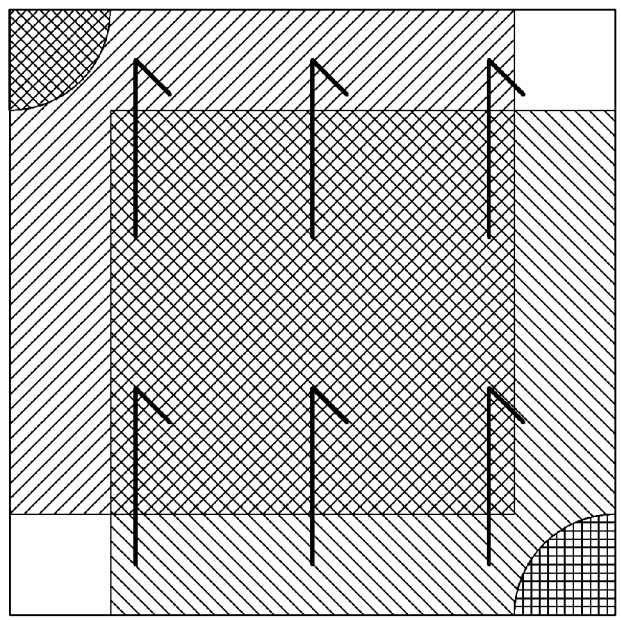
Figure 12A:
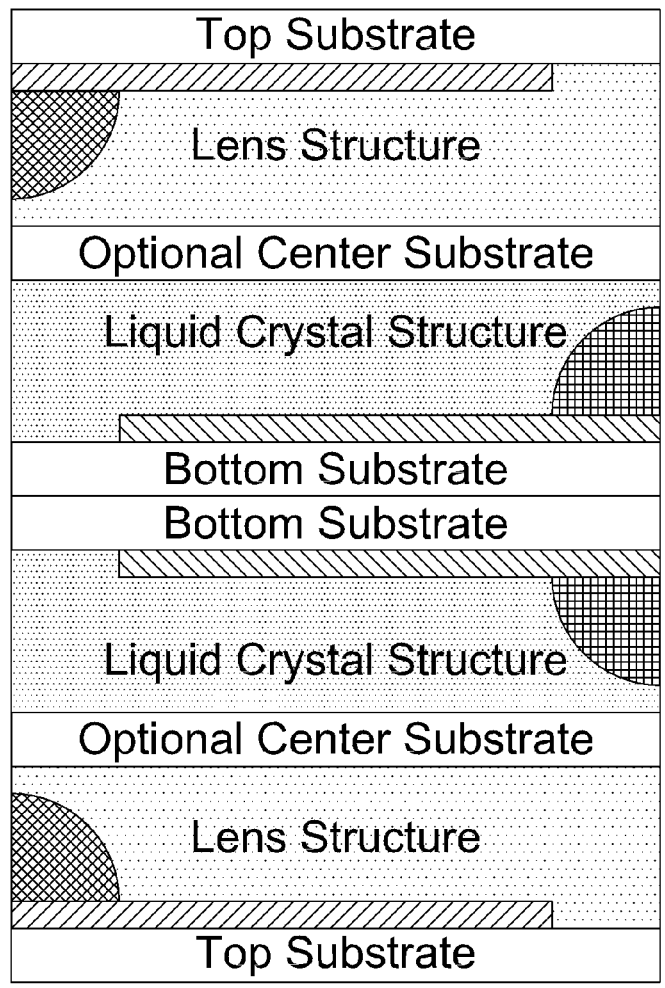
FIGS. 12A and 12B are side and plan views, respectively, of a complete TLCL formed by connecting together two half TLCLs of FIG. 11A at their bottom surfaces.
Figure 12B:
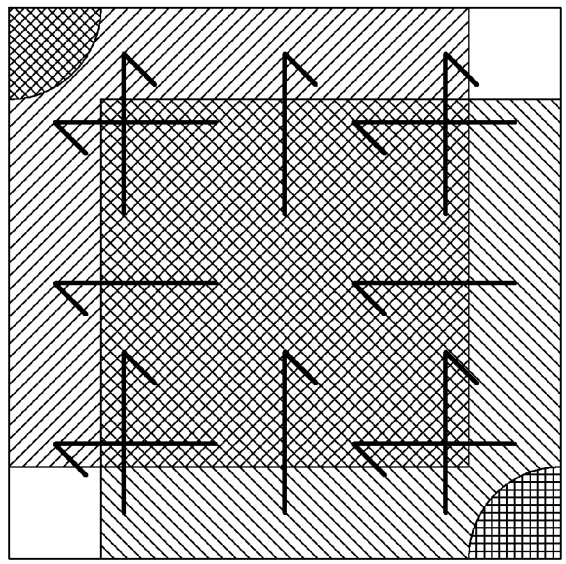
Figure 13A:
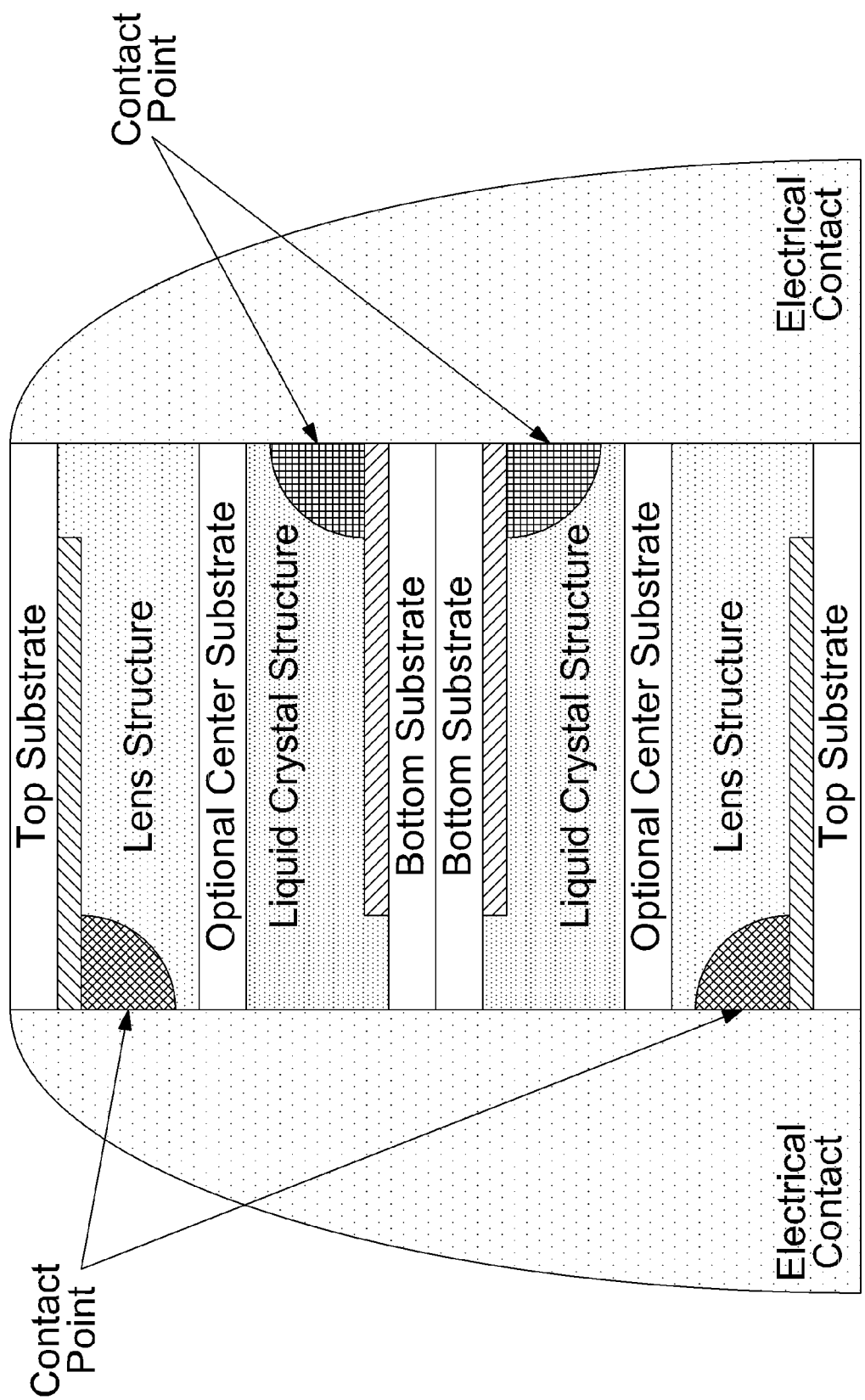
FIGS. 13A and 13B are side and top views, respectively, of the complete TLCL of FIG. 12A with external full side contacts bonded to the device and making electrical contact with the contact areas of the contact structure, in accordance with a non-limiting example of implementation of the present invention.
Figure 13B:
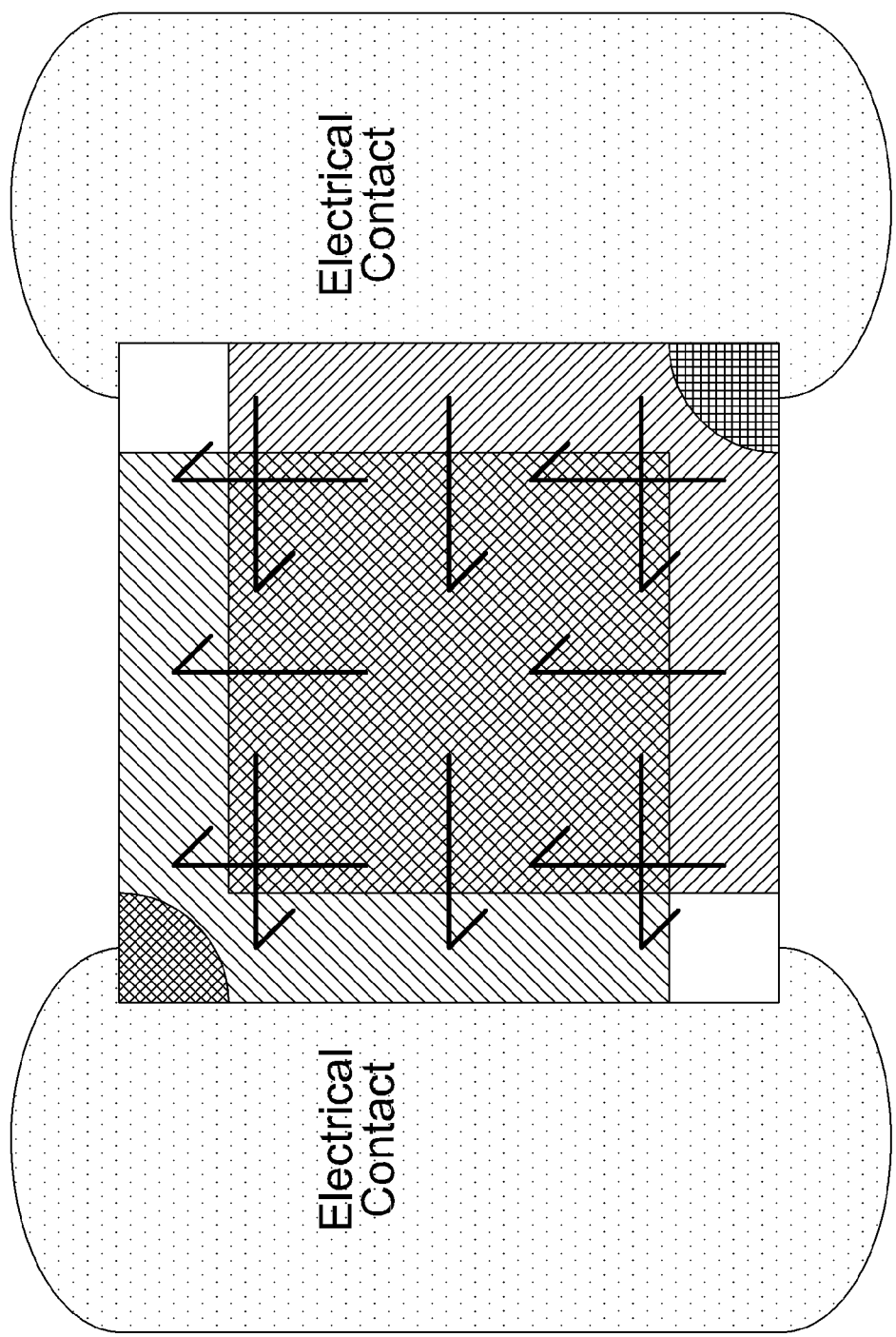

FIGS. 11A and 11B illustrate a configuration of a half TLCL that improves upon the deficiency of the previous example, according to another variant embodiment of the present invention. In this configuration, the conducting electrodes are patterned such that they extend to only some of the edges of the device. A complete TLCL formed of two such half TLCLs is shown in FIGS. 12A and 12B, in cross-section and plan view, respectively. As seen in FIGS. 13A and 13B, when this complete TLCL is packaged by depositing a mass of conducting material on each side or corner of the device, the required electrical contacts are reliably made via the edge contact structure without the possibility of shorting the opposite electrodes, since these opposite electrodes do not extend all the way to the respective edge of the device.

Figure 14:
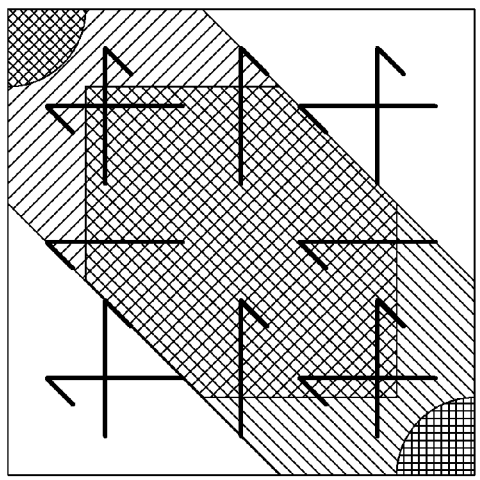
FIGS. 14, 15 and 16 illustrate plan views of possible variations of a half TLCL with patterned electrodes, where at least two of the edges of the device are free of the electrode, in accordance with non-limiting examples of implementation of the present invention.
Figure 15:
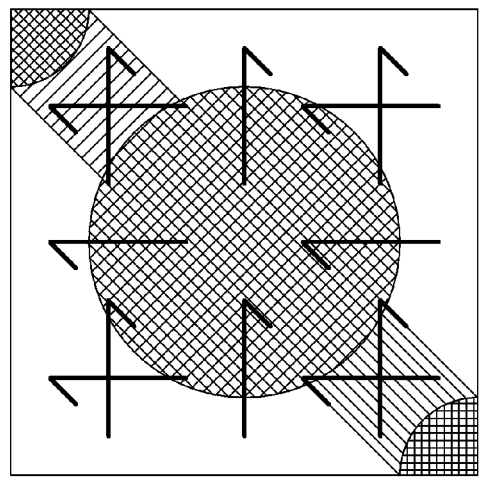
Figure 16:
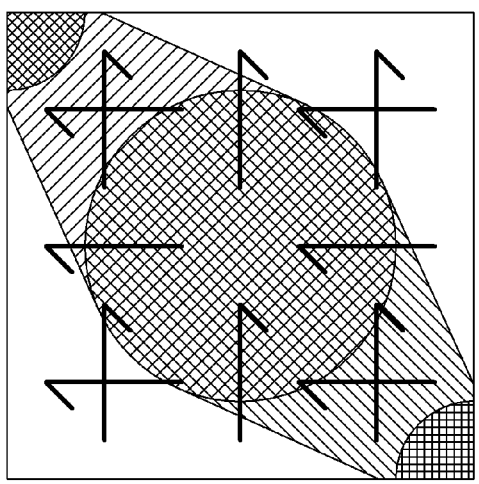
Figure 17C:
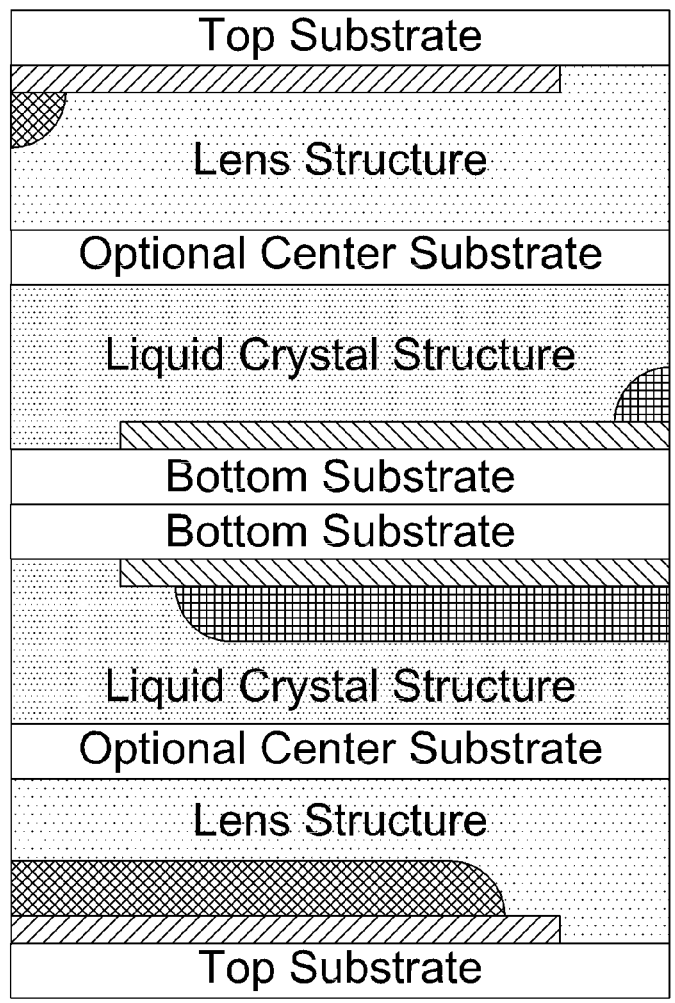
FIGS. 17C and 17D are side and top views, respectively, of a complete TLCL formed by connecting together two half TLCLs of FIG. 17A at their bottom surfaces.
Figure 17D:
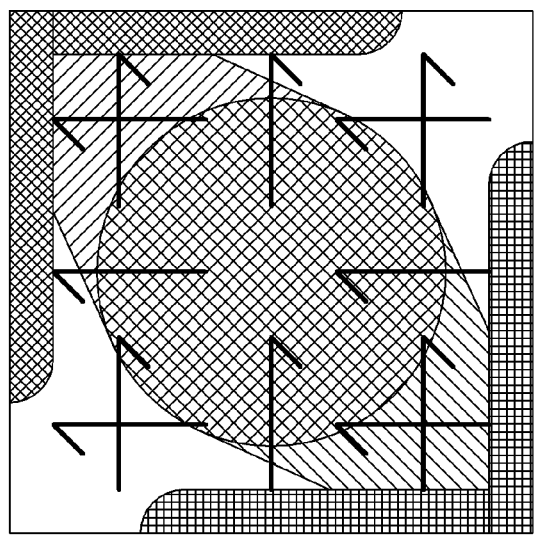
Figure 18A:
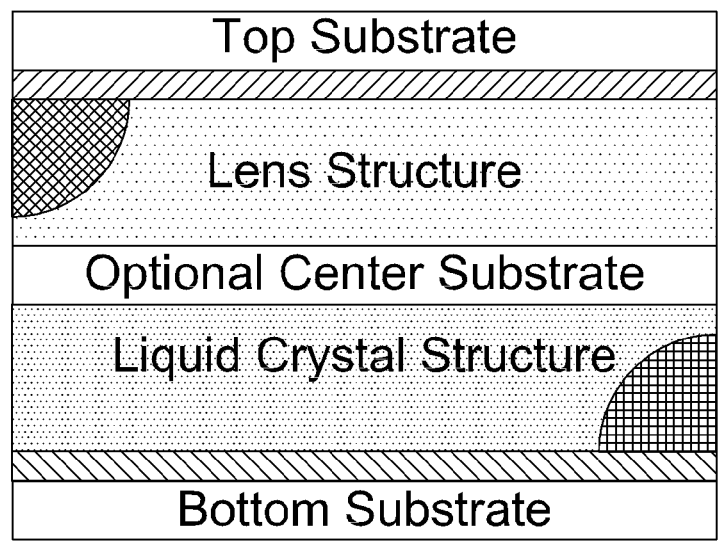
FIGS. 18A and 18B are side and top views, respectively, of one half of a TLCL with a corner bead contact structure and transparent electrodes covering all but the opposite side peripheral area of the device, in accordance with a non-limiting example of implementation of the present invention.
Figure 18B:
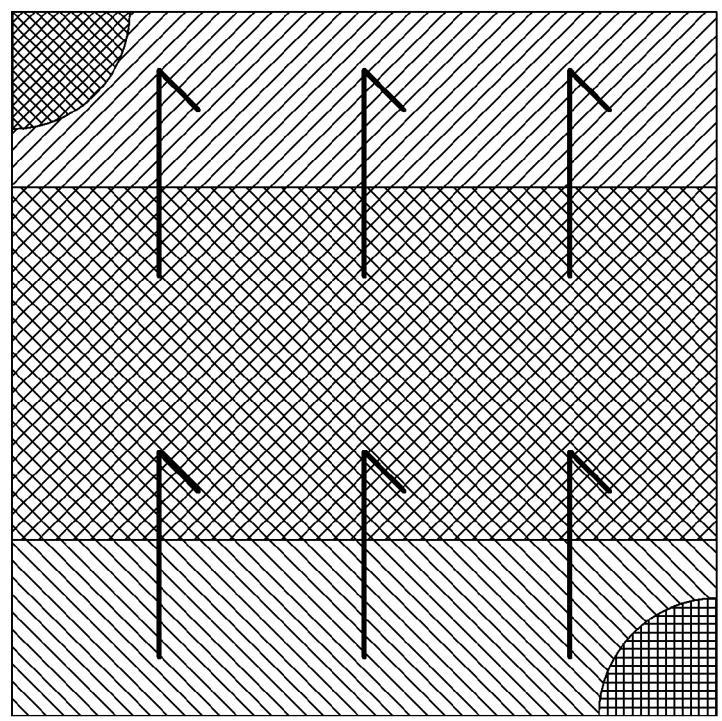
Figure 18C:
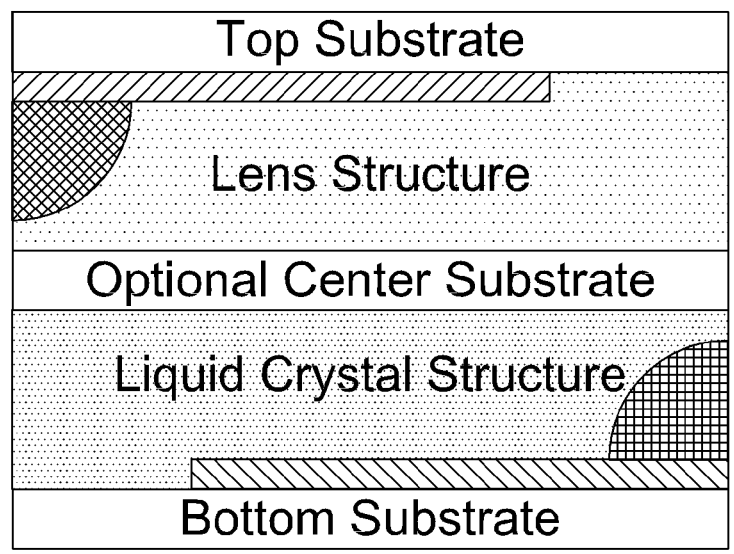
FIGS. 18C and 18D are side and top views, respectively, of the half TLCL of FIGS. 18A and 18D after undergoing a 90 degree rotation.
Figure 18D:
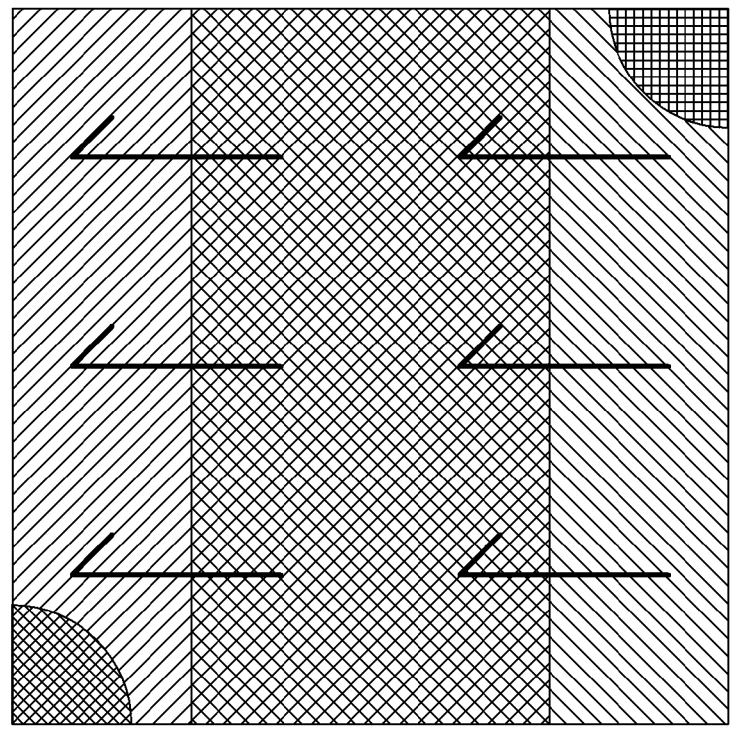
Figure 19A:
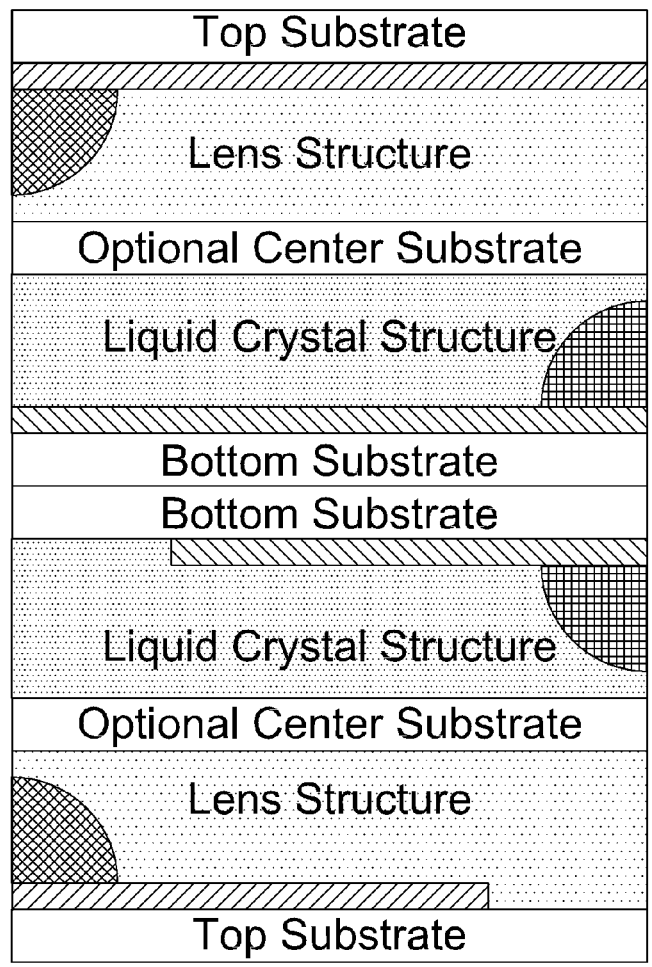
FIGS. 19A and 19B are side and top views, respectively, of a complete TLCL formed by connecting together the half TLCL of FIGS. 18A and the half TLCL of 18C at their bottom surfaces.
Figure 19B:
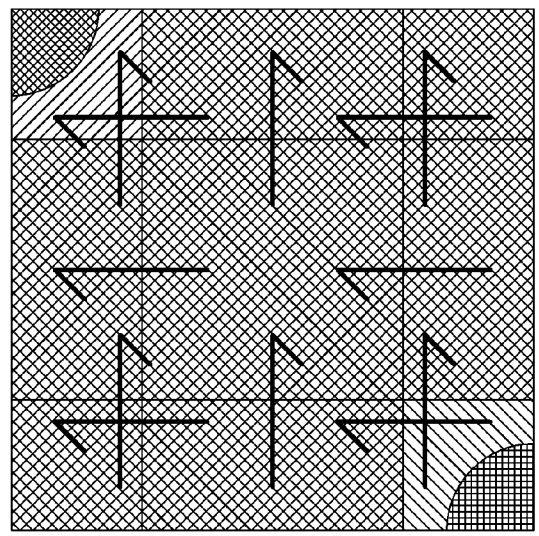
Figure 20A:
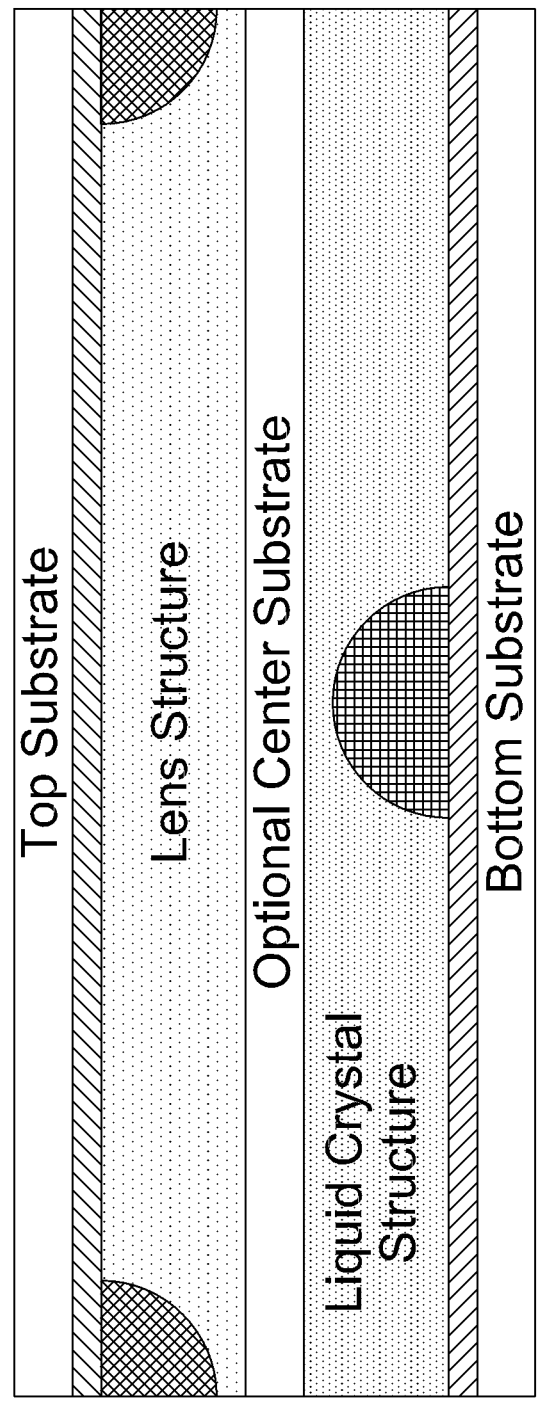
FIGS. 20A and 20B illustrate side and plan views, respectively, of an array of four half TLCLs, where the patterning is done specifically to obtain 4 half TLCLs before singulation, in accordance with a non-limiting example of implementation of the present invention.
Figure 20B:
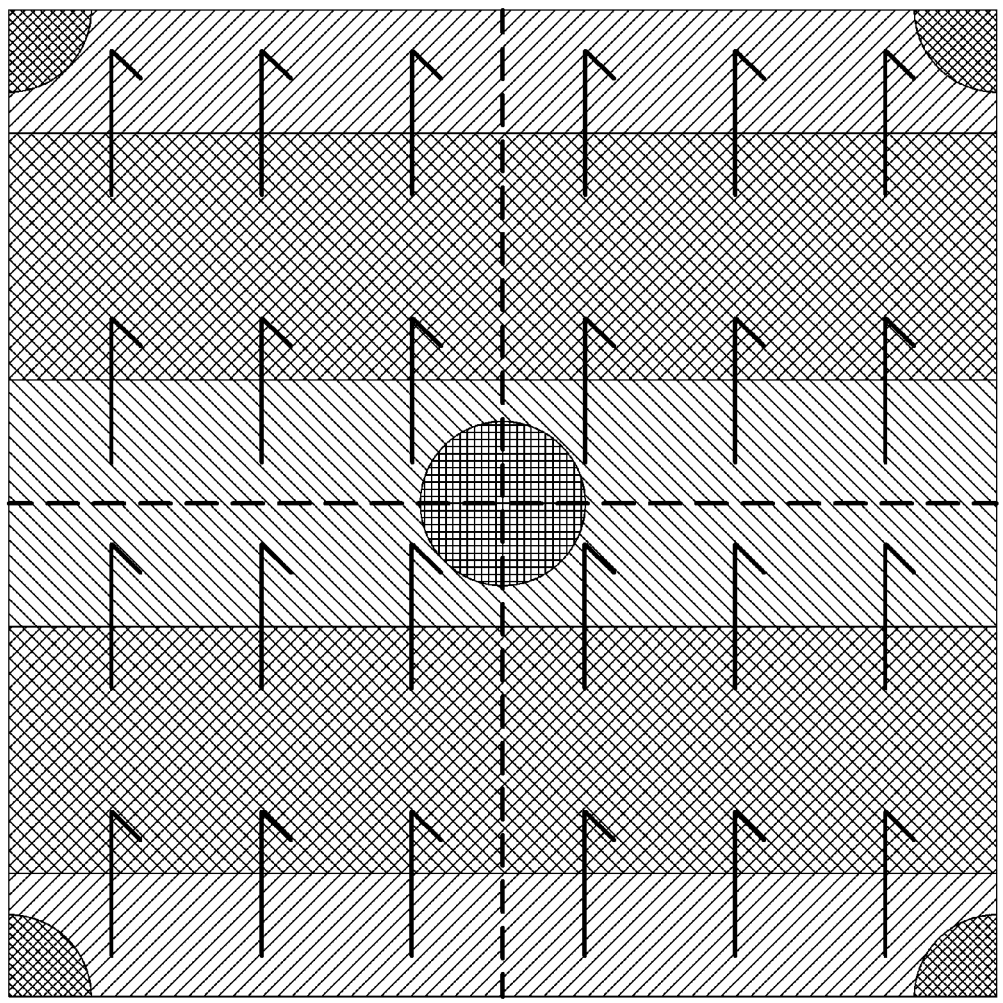
Figure 20C:
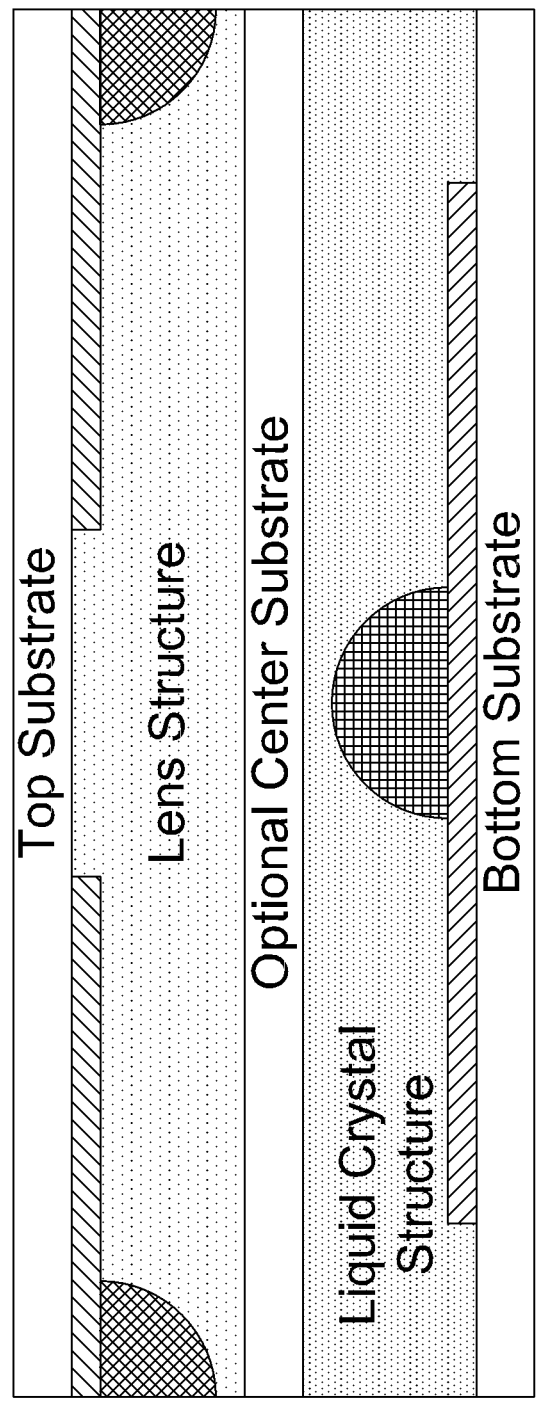
FIGS. 20C and 20D are side and plan views, respectively, illustrating the array of four half TLCLs of FIGS. 20A and 20B after a 90 degree rotation.
Figure 20D:
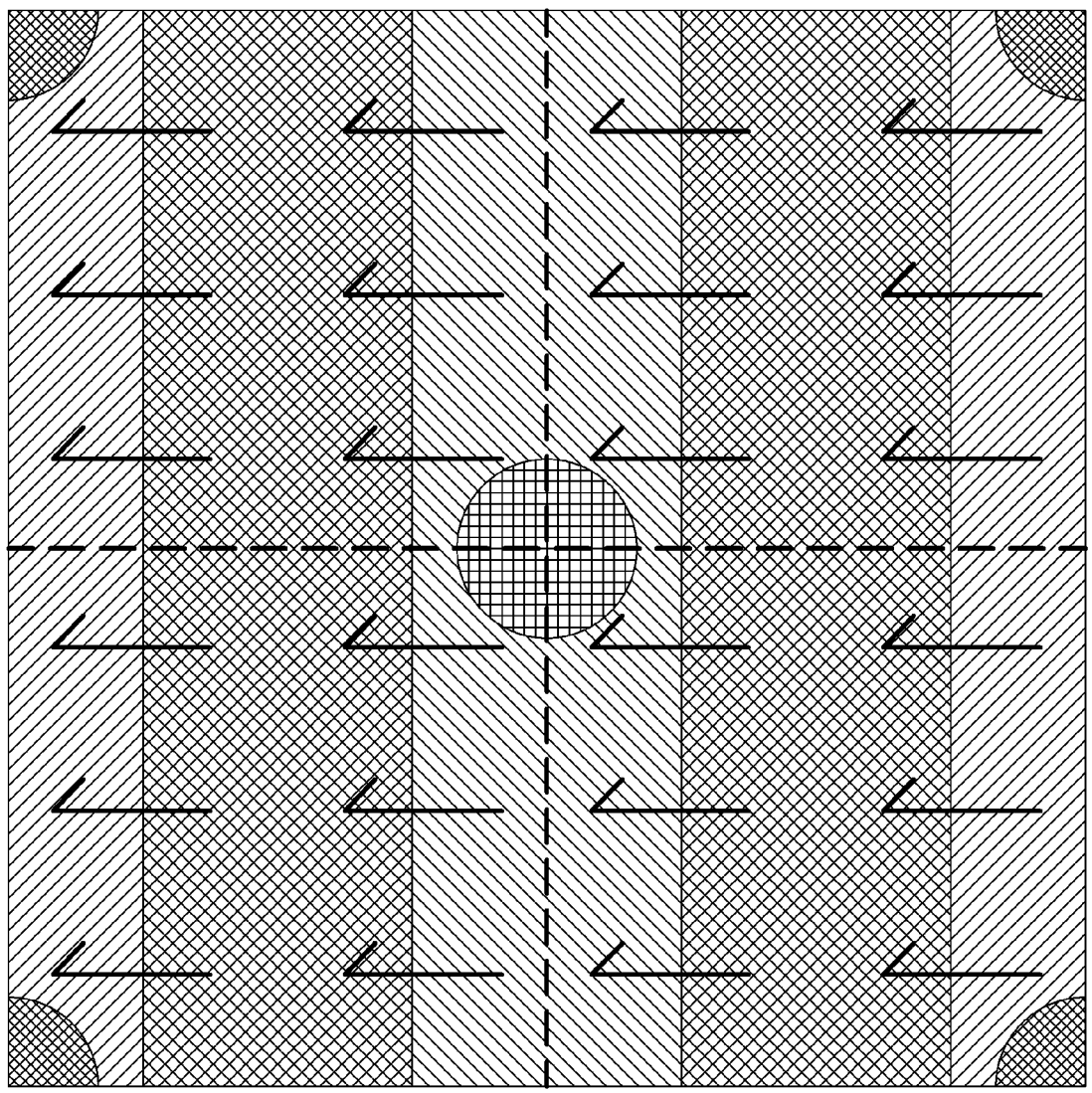
Figure 21A:
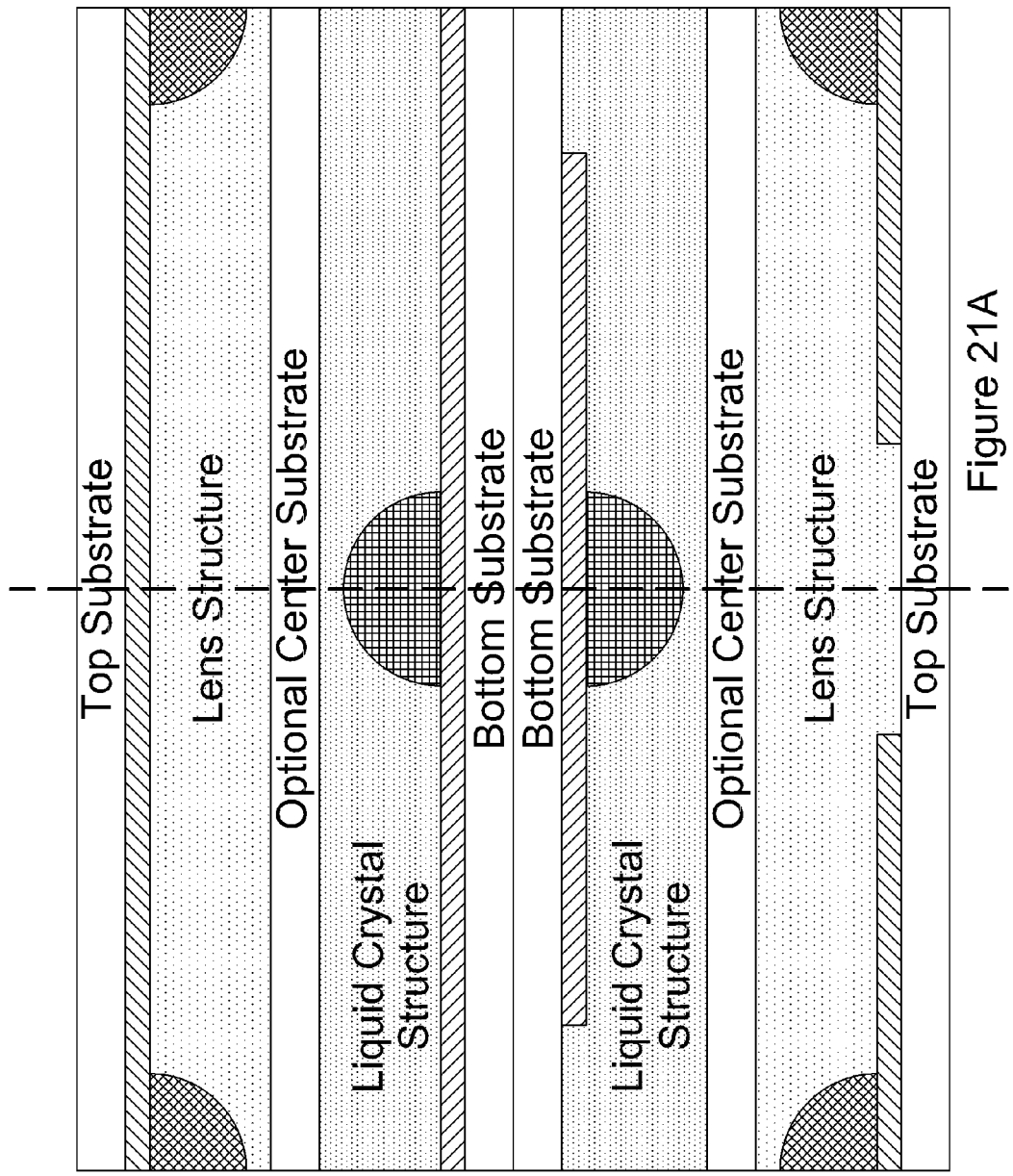
FIGS. 21A and 21B are side and top views, respectively, of a block of four complete TLCL devices, formed by connecting together the array of four half TLCLs of FIG. 20A and the array of four half TLCLs of FIG. 20C at their bottom surfaces, whereby singulated units of four half TLCL devices are first bonded together before further singulation into four complete TLCL devices.
Figure 21B:
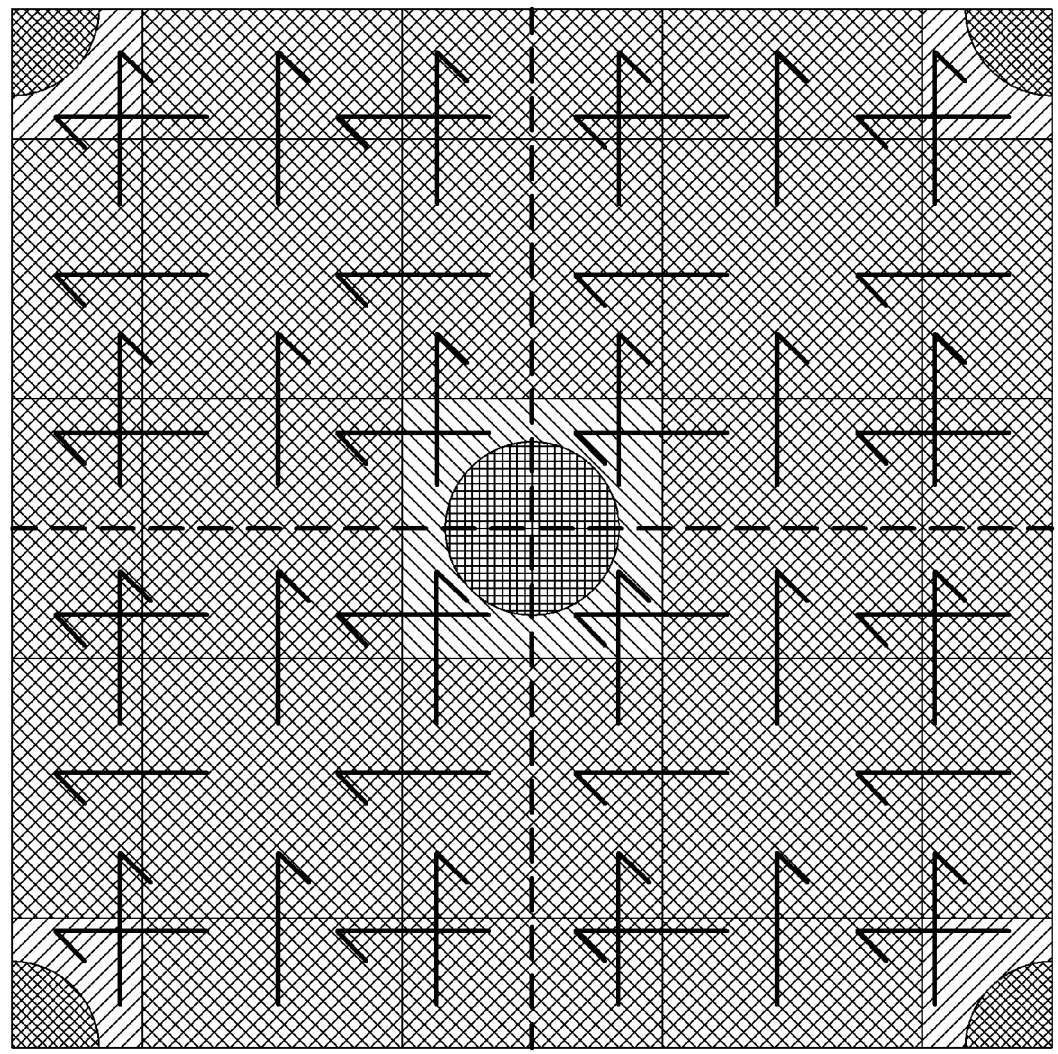
Figure 22A:
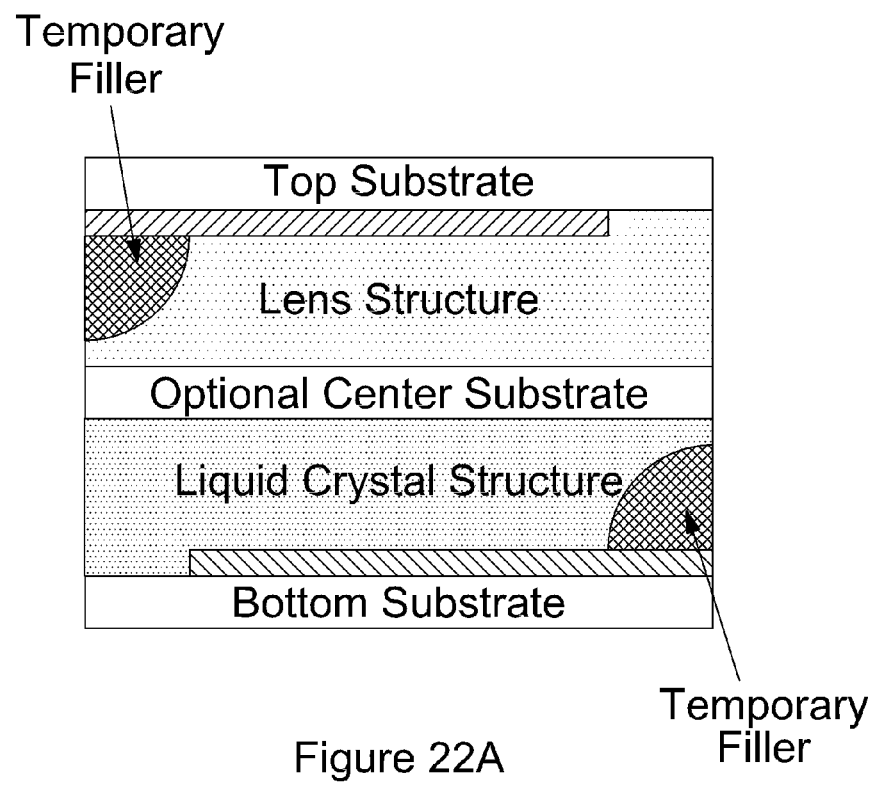
FIGS. 22A and 22B are side and top views, respectively, of one half of a TLCL with a contact structure defined by a void made using a temporary filler bead in a corner of the device, in accordance with a further variant embodiment of the present invention.
Figure 22B:
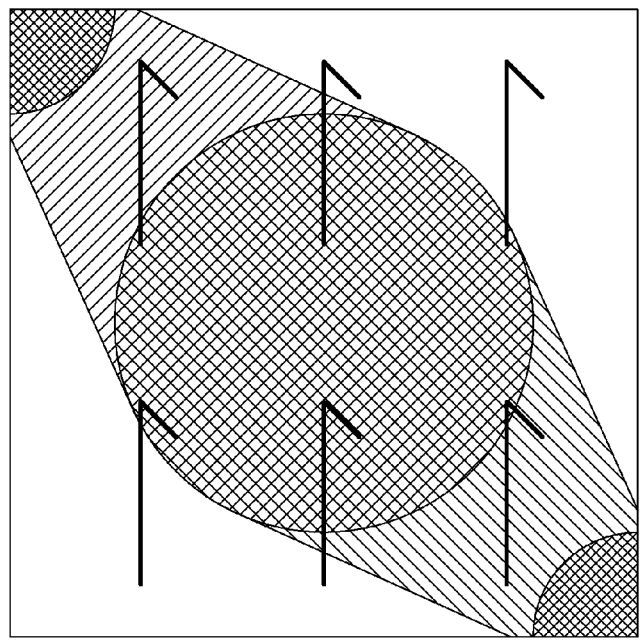
Figure 22C:
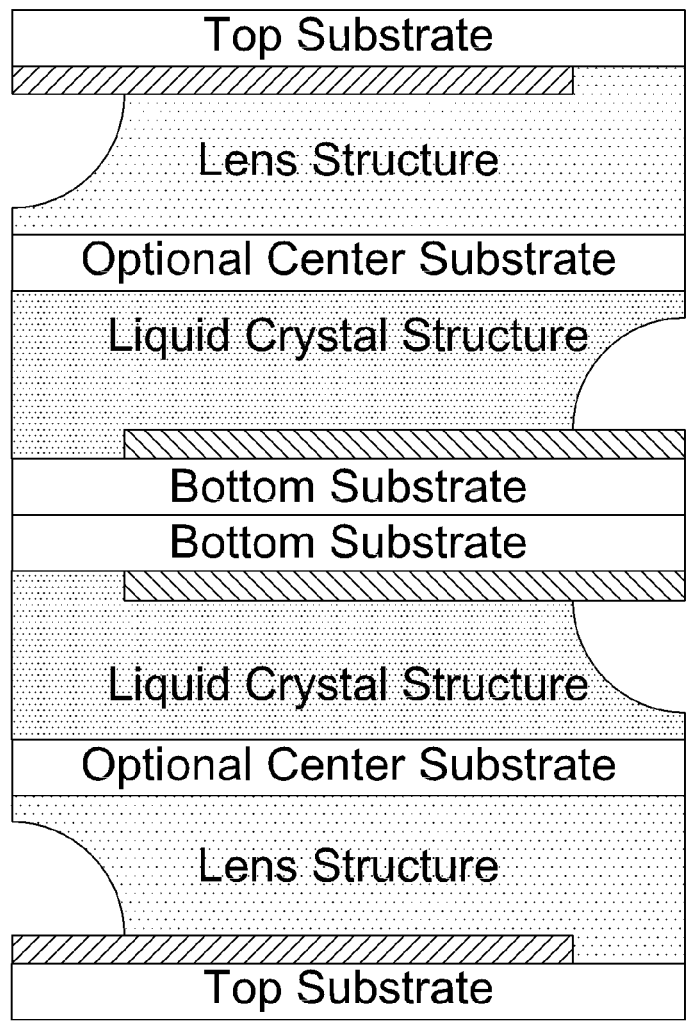
FIGS. 22C and 22D are side and top views, respectively, of a complete TLCL formed by connecting together two half TLCLs of FIG. 22A at their bottom surfaces.
Figure 22D:
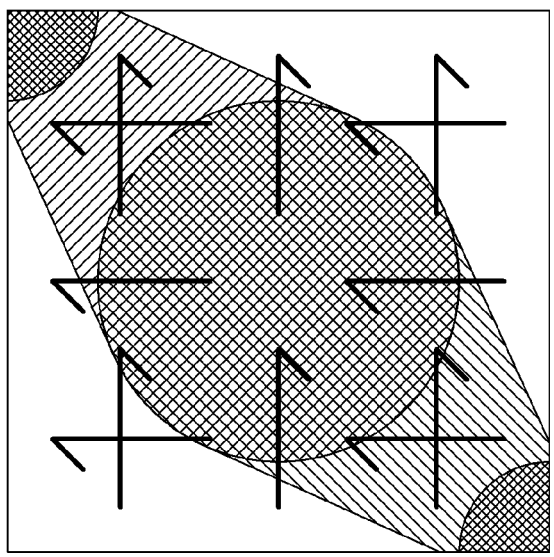

FIGS. 14, 15 and 16 show examples of possible non-limiting variations of the electrode patterns that may be used in a half TLCL. In each case, the electrode pattern ensures that at least two of the edges of the device are free of the respective electrode. It should be noted that, although in each of these examples the electrode pattern is shown to be the same for both the LC layer and the lens structure layer, this need not be the case.

FIGS. 17A to 17D illustrate another non-limiting example of a half TLCL and corresponding full TLCL configuration, in which the contact structure is not limited to a single corner.

As shown, the contact structure of the half TLCL extends down an entire side of the device. Accordingly, in the complete TLCL of FIG. 17C, it can be seen that the conducting material of the contact structure overlaps in one corner of the device. Depending upon the packaging and contact structure layout, the added conducting material need not even overlap.

FIGS. 18A to 18D and 19A and 19B illustrate yet another non-limiting example of a half TLCL and corresponding full TLCL configuration, in which the electrodes are patterned such that, for each electrode layer, only one edge of the TLCL device is entirely free of the respective electrode. This configuration can be further tweaked such that, for each electrode layer, only one corner of the TLCL device is entirely free of the respective electrode.

Although in the foregoing examples the electrode pattern and contact structure would be identical for each TLCL singulated out of a wafer scale array, it is also possible to have different configurations for different TLCLs singulated out of a same array, provided each configuration is characterized by proper symmetry. FIGS. 20A to 20D and 21A to 21B show one non-limiting example where the electrode patterning is done over a group of four TLCLs. Accordingly, each array contains four different variations on the TLCL configuration.

Figure 23A:
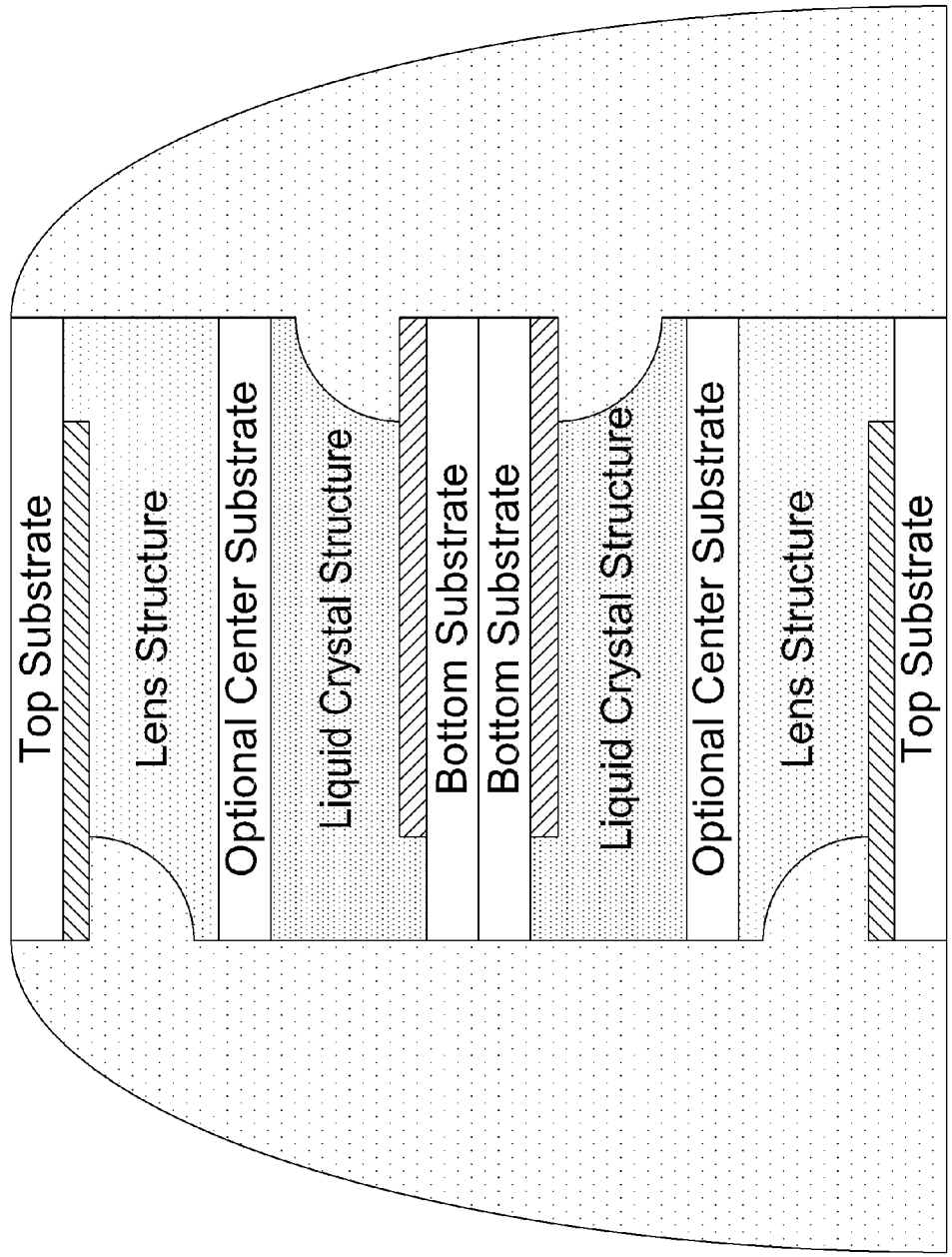
FIGS. 23A and 23B are side and plan views, respectively, of the complete TLCL of FIG. 22C with external full side contacts bonded to the device and making electrical contact with the contact areas of the contact structure, in accordance with a non-limiting example of implementation of the present invention.
Figure 23B:
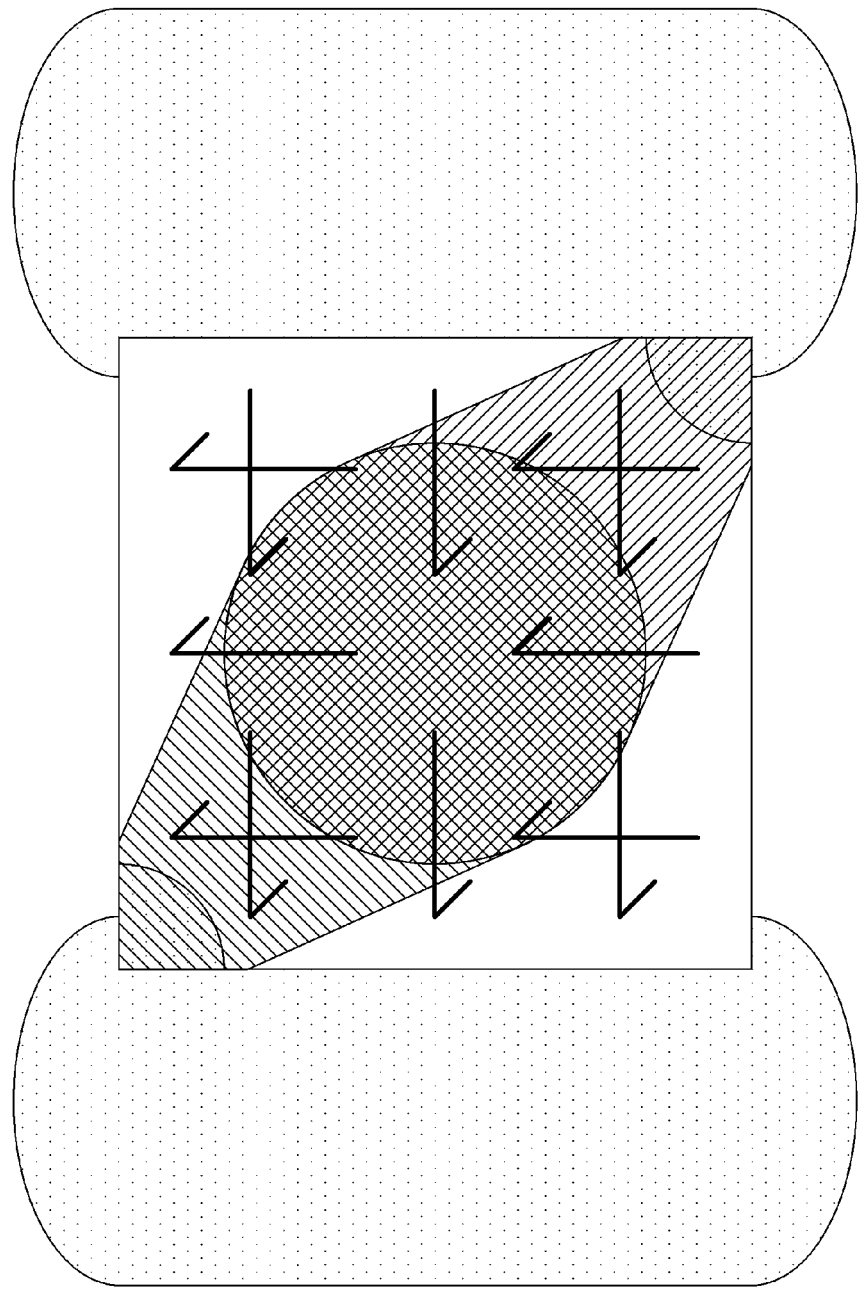

In a further variant embodiment of the present invention, the contact structure of the TLCL is defined by using a temporary filler material during construction of the TLCL, rather than by adding an additional conducting layer on top of each electrode. As illustrated by the non-limiting example of FIGS. 22A to 22D, a temporary filler is deposited in contact with each conducting electrode during fabrication of the half TLCL in wafer form. After cutting of a wafer into individual devices (either half TLCLs or complete TLCLs), the temporary filler is removed to expose the surface of the conducting electrode, thus providing for enhanced electrical contacts to be made to the electrodes at the edges of the device. During packaging of such a complete TLCL, the mass of conductive material deposited on each side of the device fills the voids and securely contacts the electrodes, as shown in the cross-section and plan views of FIGS. 23A and 23B.

In yet a further variant embodiment of the present invention, the contact structure of the TLCL is adapted to the presence of one or more additional electrodes within the TLCL configuration, other than the electrodes that provide the electric field to control the optical power of the TLCL. These additional electrodes are used to provide additional functionality to the TLCL, such as for example a resistive heater, a resistive temperature sensor and an intermediate electrode for shaping the electric field, among other possibilities. Specific to the present invention, the contact structure for such a TLCL is characterized by, for each additional electrode, two additional contact locations, which are interchangeable or equivalent. Note that, when a full TLCL is formed of two such half TLCLs, with the flip and 90 degree rotation of the second half TLCL, the extra contacts for this added function work properly for both half lenses.

Figure 24A:
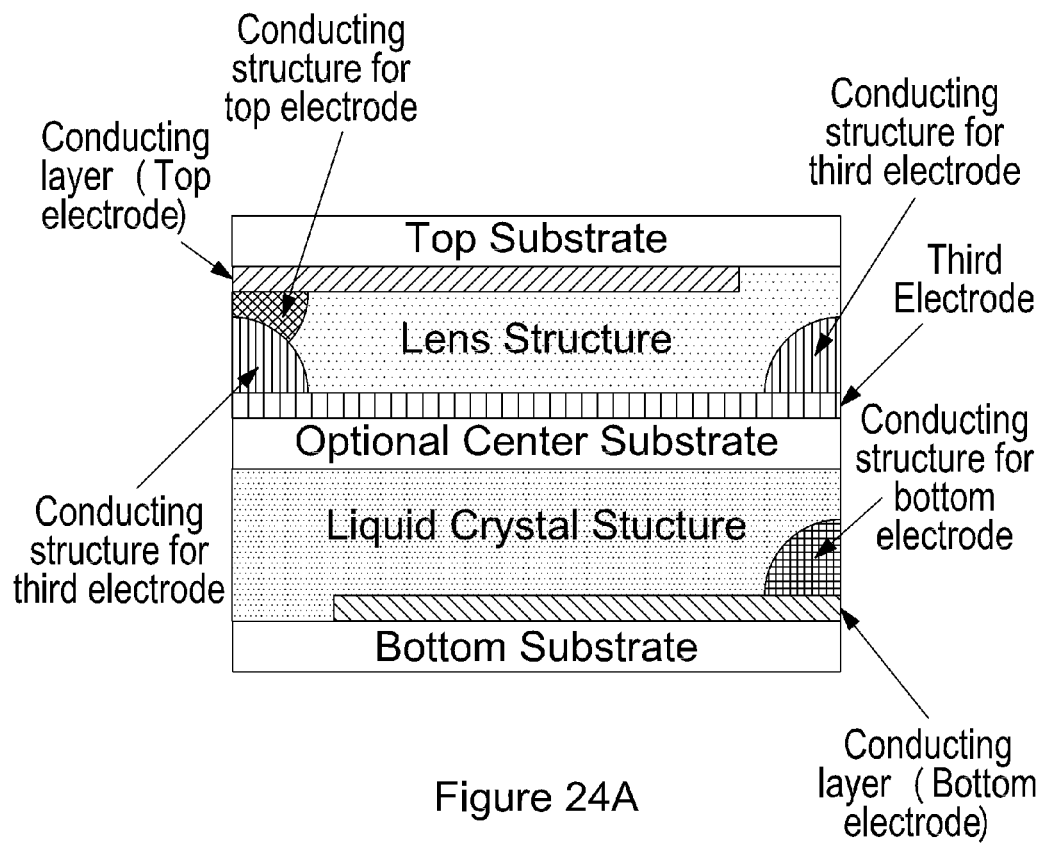
FIGS. 24A and 24B are side and top views, respectively, of one half of a TLCL with a contact structure including additional contact areas interconnected by a third electrode, in accordance with yet a further variant embodiment of the present invention.
Figure 24B:
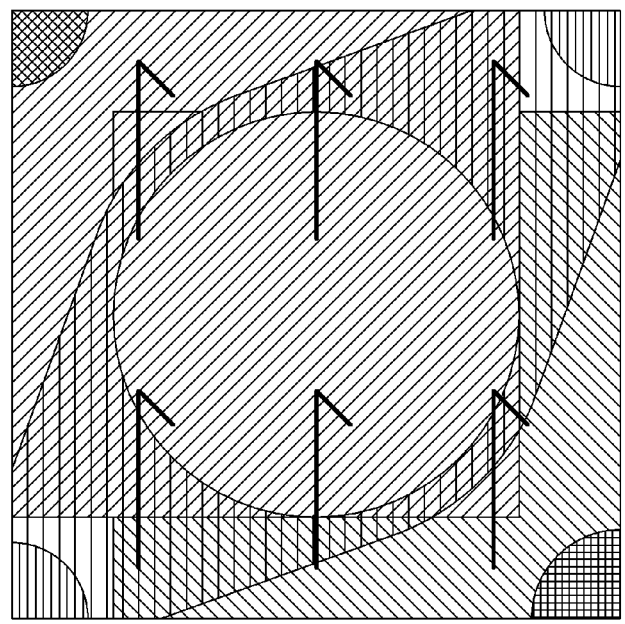

A non-limiting example of implementation of this variant embodiment of the present invention is shown in FIGS. 24A and 24B, in which one additional electrode (the third electrode) and the corresponding additional contact areas of the contact structure are provided within a half TLCL to allow for a heating circuit. In this example, the additional electrode is patterned with a large aperture so as not to adversely affect the control electric field or the optical properties of the TLCL. As a result, the additional electrode need not be transparent. Although in the example of FIGS. 24A and 24B the heating circuit is provided by a third electrode, separate from the control electrodes, it is also possible that the heating circuit be provided by the same electrode used for the liquid crystal controlling electric field, in which case the addition of a single additional contact structure on one electrode may suffice for operation.

Note that the additional electrode may be placed at various locations within the liquid crystal device, without departing from the scope of the present invention. The additional electrode may be positioned on top of the LC layer or, alternatively, may be located above or below the top or bottom electrodes, for example if separated by an insulating layer.

Figure 25A:
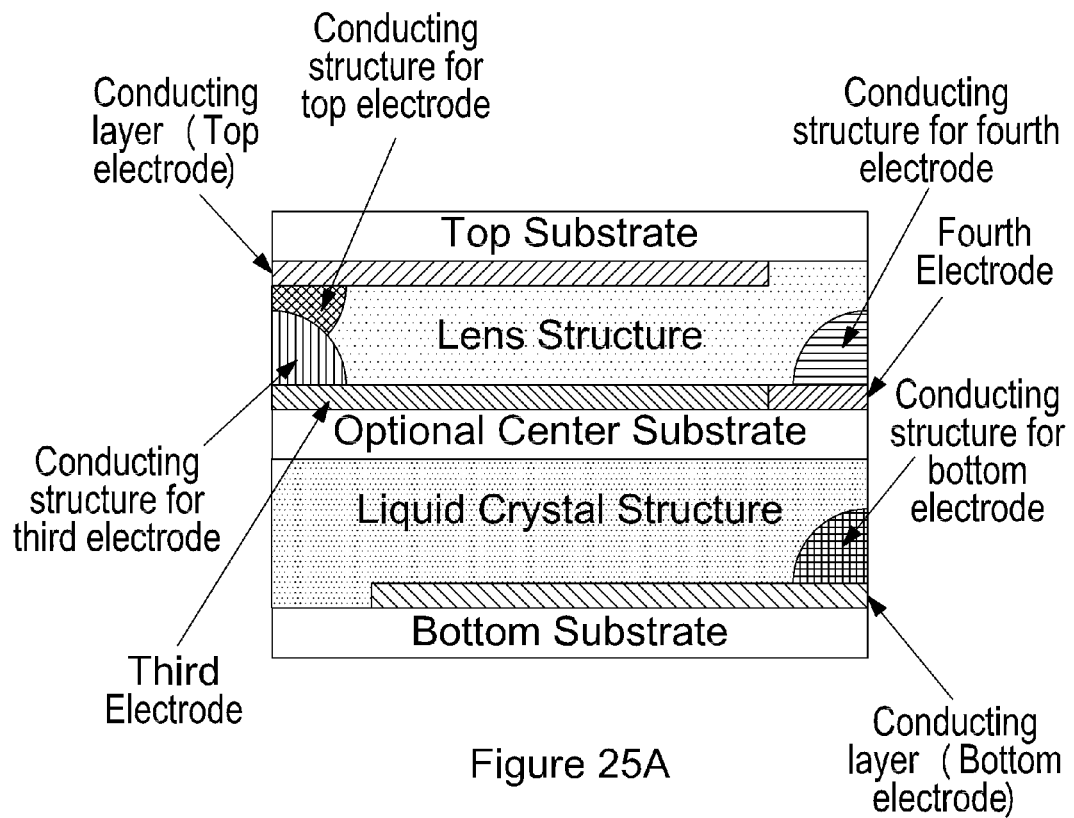
FIGS. 25A and 25B are side and top views, respectively, of one half of a TLCL with a contact structure including additional contact areas that are not interconnected, in accordance with another non-limiting example of implementation of the present invention.
Figure 25B:
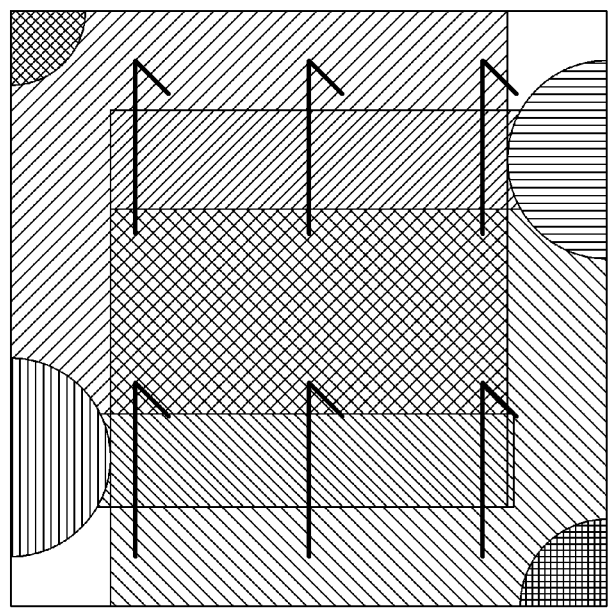
Figure 26A:
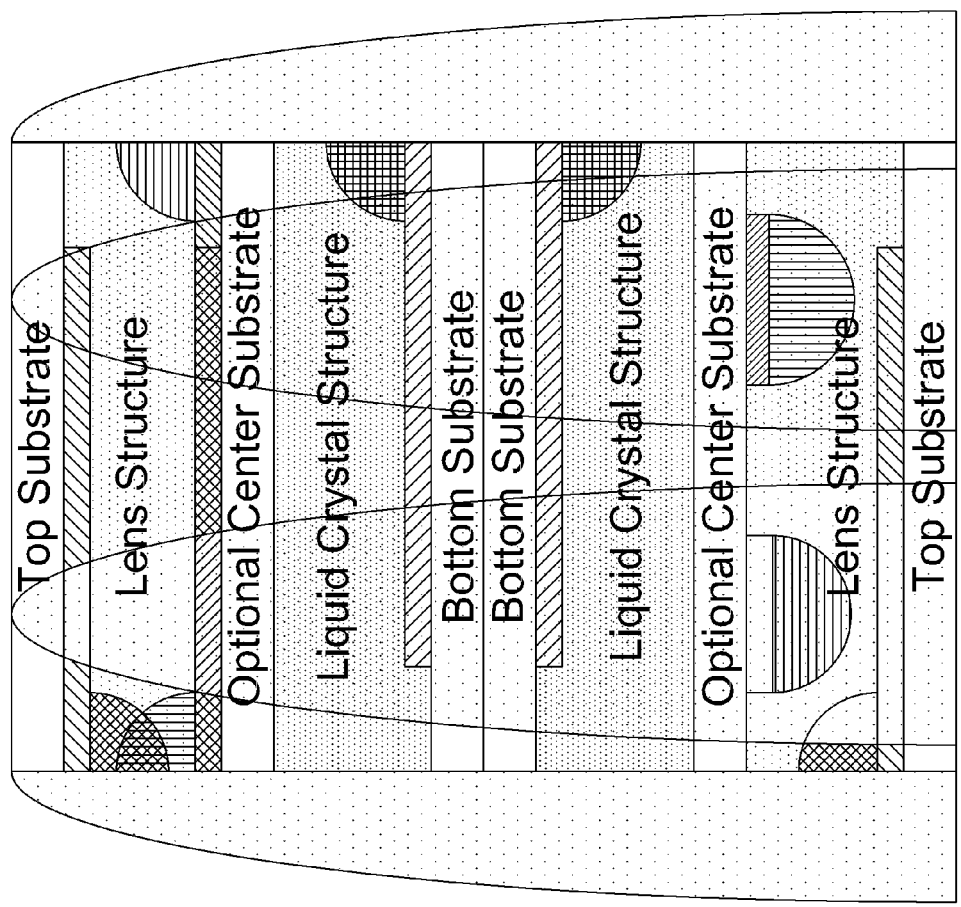
FIGS. 26A and 26B are side and plan views, respectively, of a complete TLCL formed by connecting together two half TLCLs of FIG. 25A at their bottom surfaces, with external contacts bonded to the device and making common electrical contact with the corner contact areas of the contact structure and independent electrical contact with the additional electrodes, in accordance with a non-limiting example of implementation of the present invention.
Figure 26B:
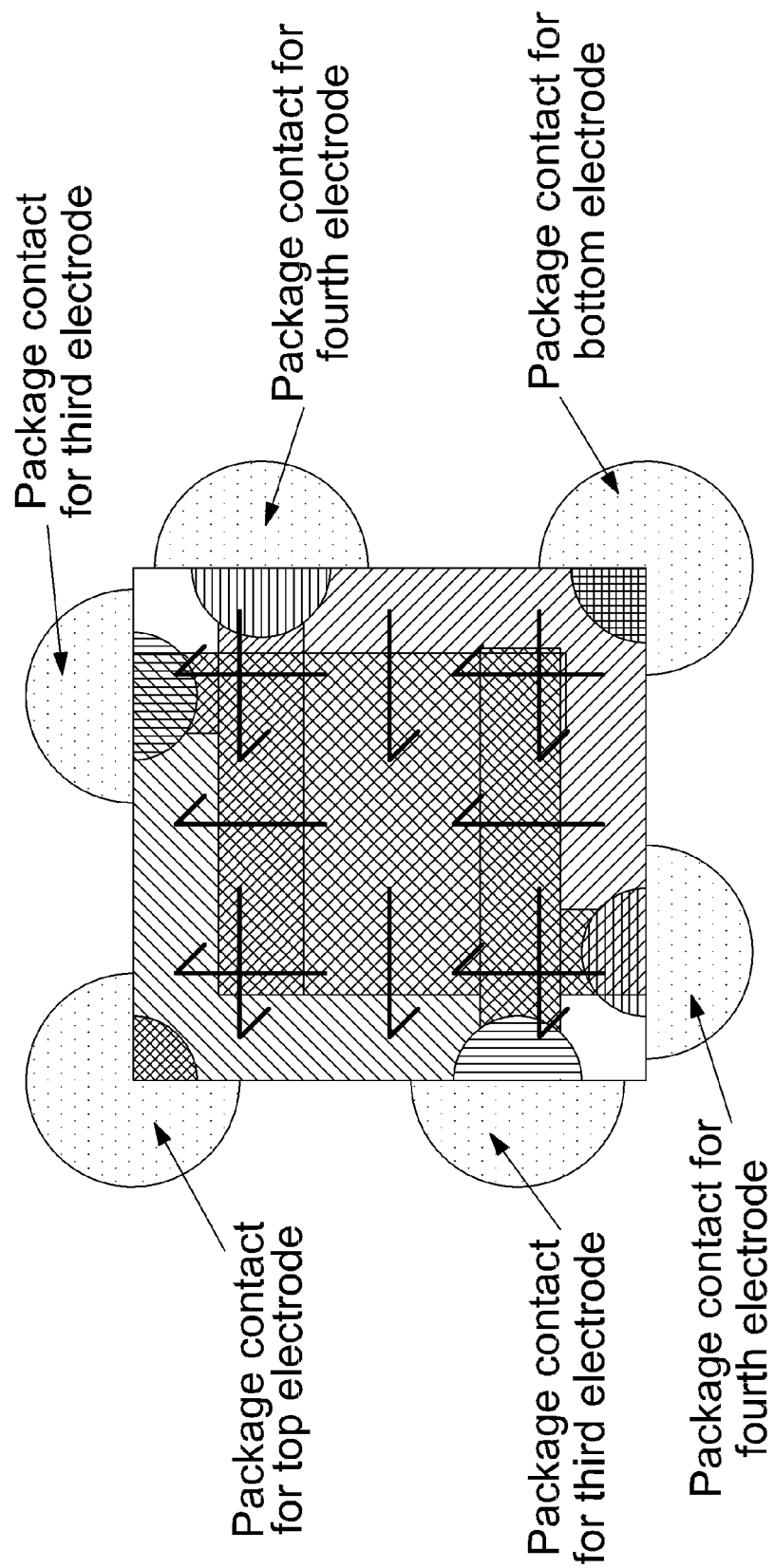
Figure 27A:
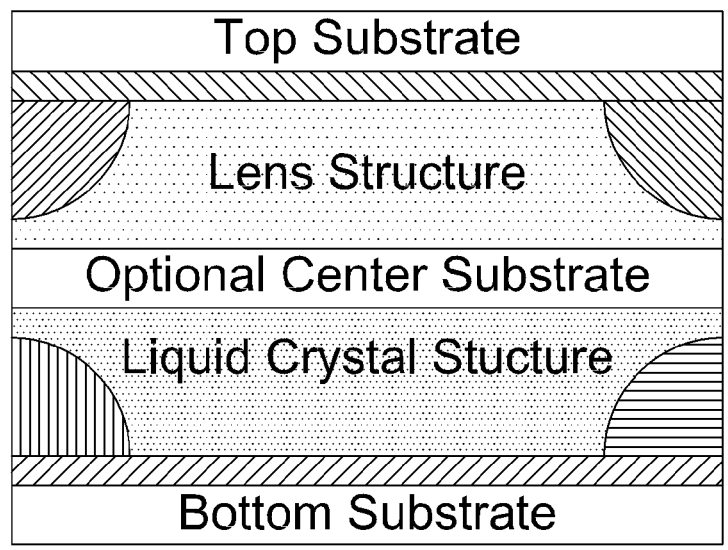
FIGS. 27A and 27B are side and plan views, respectively, of one half of a TLCL in which contact areas of the contact structure are provided at each diagonal corner of the device, such that the contact structure includes two diagonally opposed contact areas for each thin film electrode, in accordance with a variant embodiment of the present invention.
Figure 27B:
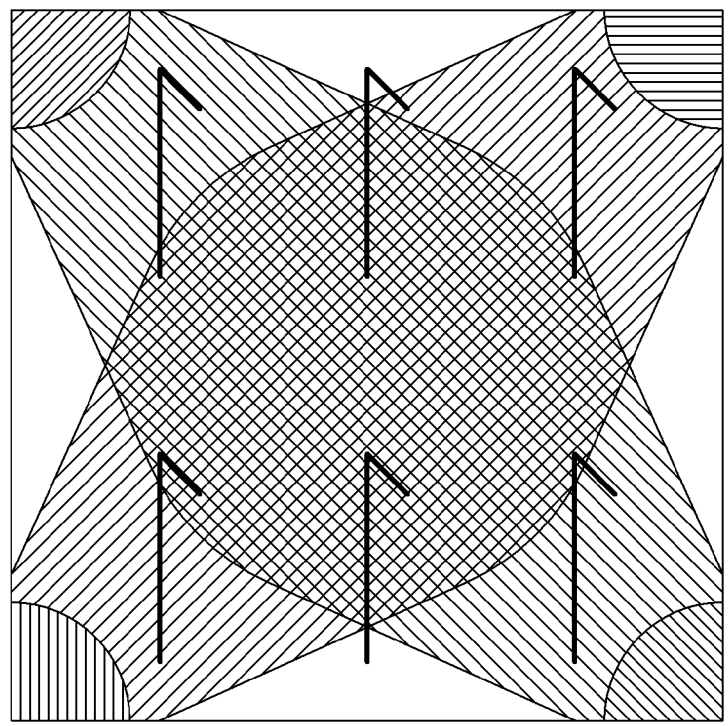
Figure 27C:
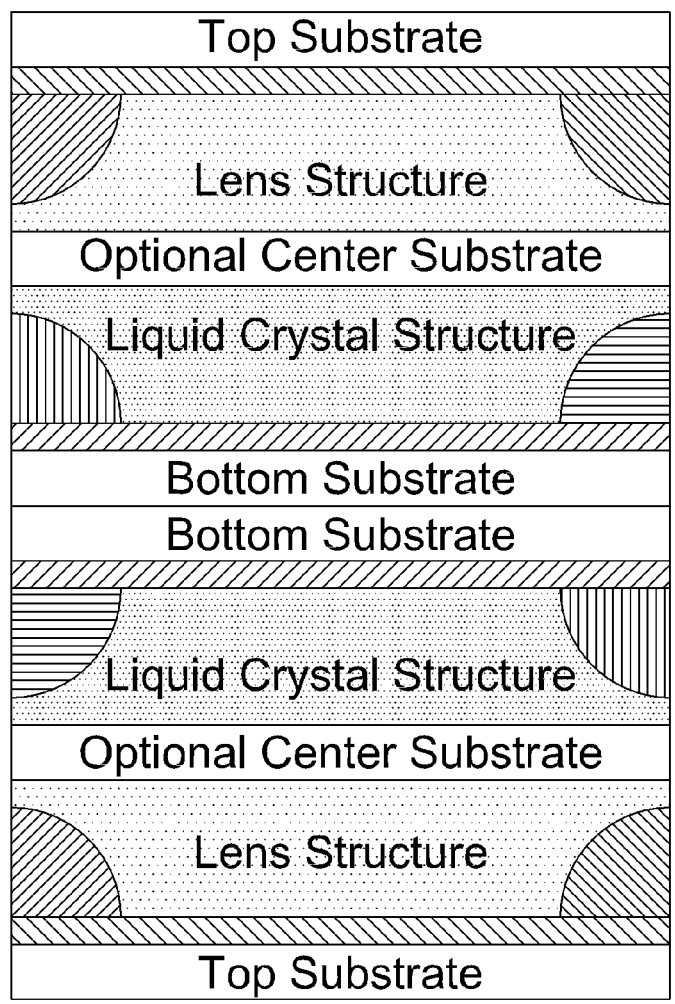
FIGS. 27C and 27D are side and plan views, respectively, of a complete TLCL formed by connecting together two half TLCLs of FIG. 27A at their bottom surfaces.
Figure 27D:
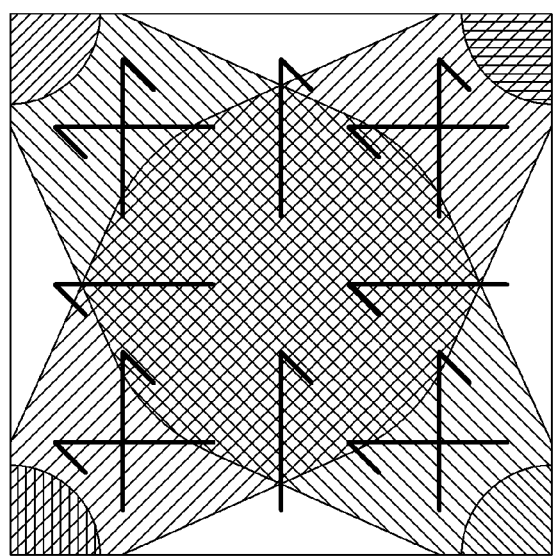
Figure 28A:
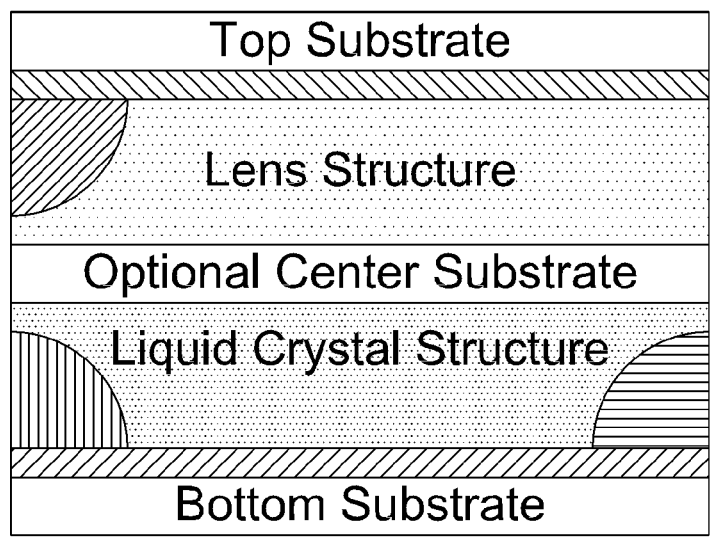
FIGS. 28A and 28B are side and plan views, respectively, of one half of a TLCL with a contact structure in which a single corner contact area is provided for one electrode, while two corner contact areas are provided for the other electrode, in accordance with a non-limiting example of implementation of the present invention.
Figure 28B:
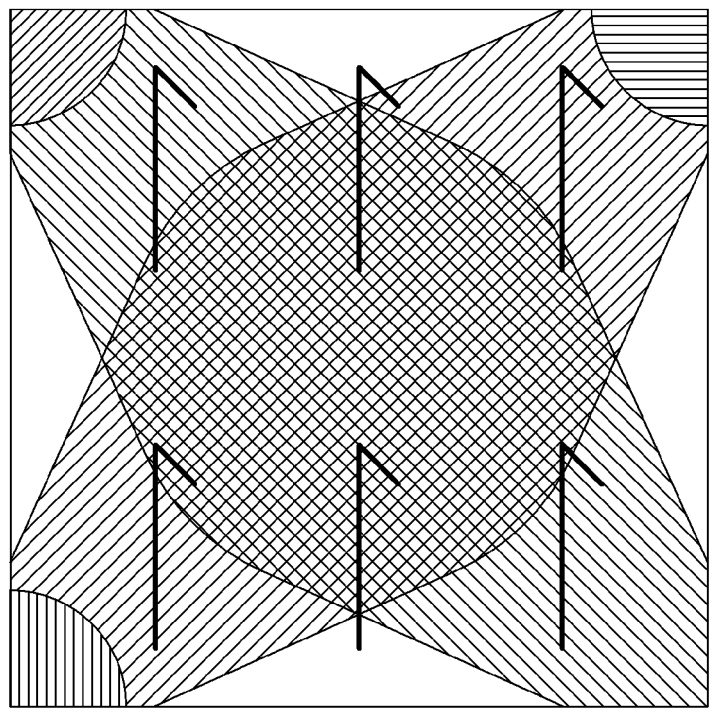
Figure 28C:
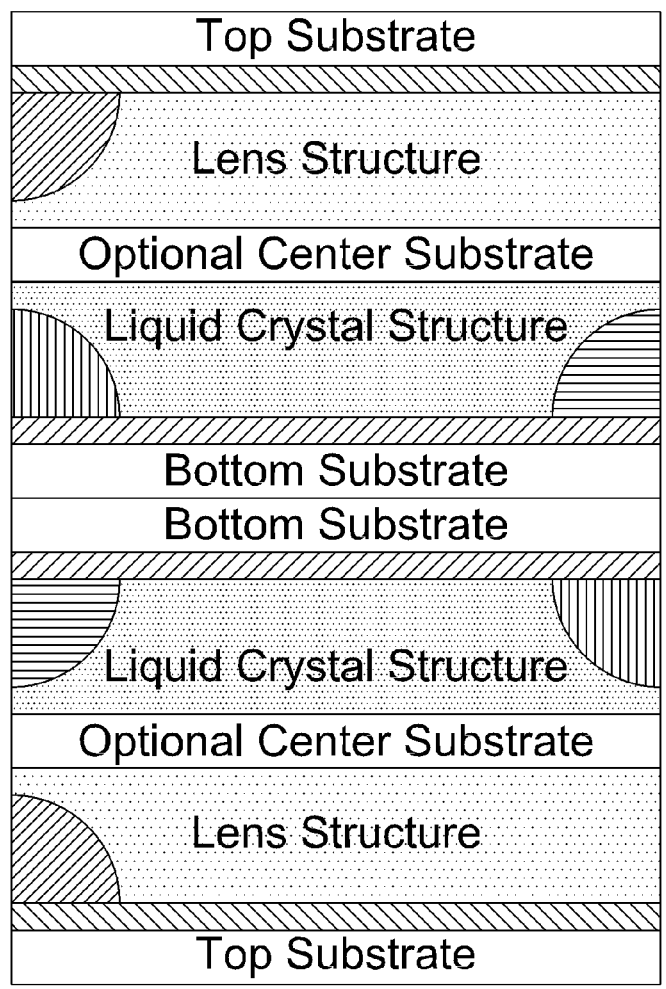
FIGS. 28C and 28D are side and plan views, respectively, of a complete TLCL formed by connecting together two half TLCLs of FIG. 28A at their bottom surfaces.
Figure 28D:
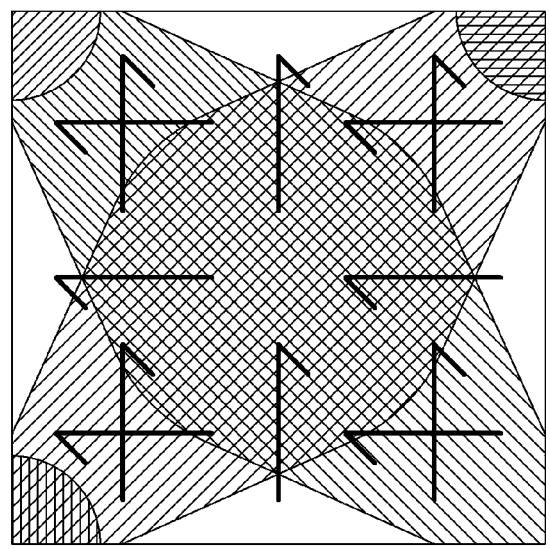

FIGS. 25A and 25B illustrate another example of implementation of this variant embodiment of the present invention, in which the two additional contact areas of the contact structure are not equivalent. This is illustrated by shading the two halves of the additional 'electrode' differently (third electrode vs. fourth electrode). An example of a functional element where the contact areas cannot be interchanged is a diode temperature sensor. In this case, the third and fourth electrodes may not be interchanged. After assembly of a complete TLCL, as shown in FIGS. 26A and 26B, a common external contact is used for the electric field controlling electrodes of the TLCL, while separate contacts are used for the additional electrodes provided within the TLCL.

In FIGS. 27A to 27D, there is shown a non-limiting example of another variant embodiment of a contact structure for a TLCL according to the present invention, in which the contact areas for each of the top and bottom electrodes are provided at each diagonal corner, such that the contact structure includes two diagonally opposed contact areas for each thin film electrode of the half TLCL. This configuration allows flexibility in connecting the control signal to different corners of the device. With contacts at the opposite ends of the electrodes, it is possible to pass a heating current therethrough.

In a different example of implementation of this variant embodiment, FIGS. 28A to 28D illustrate a configuration in which the contact structure provides a single corner contact point for one of the electrodes of each half TLCL and two corner contact areas for the other electrode of each half TLCL. In the example shown, the electrode having two contact areas is the bottom electrode of the half TLCL, such that the heating power may be provided in the middle of the corresponding complete TLCL.

Figure 29A:
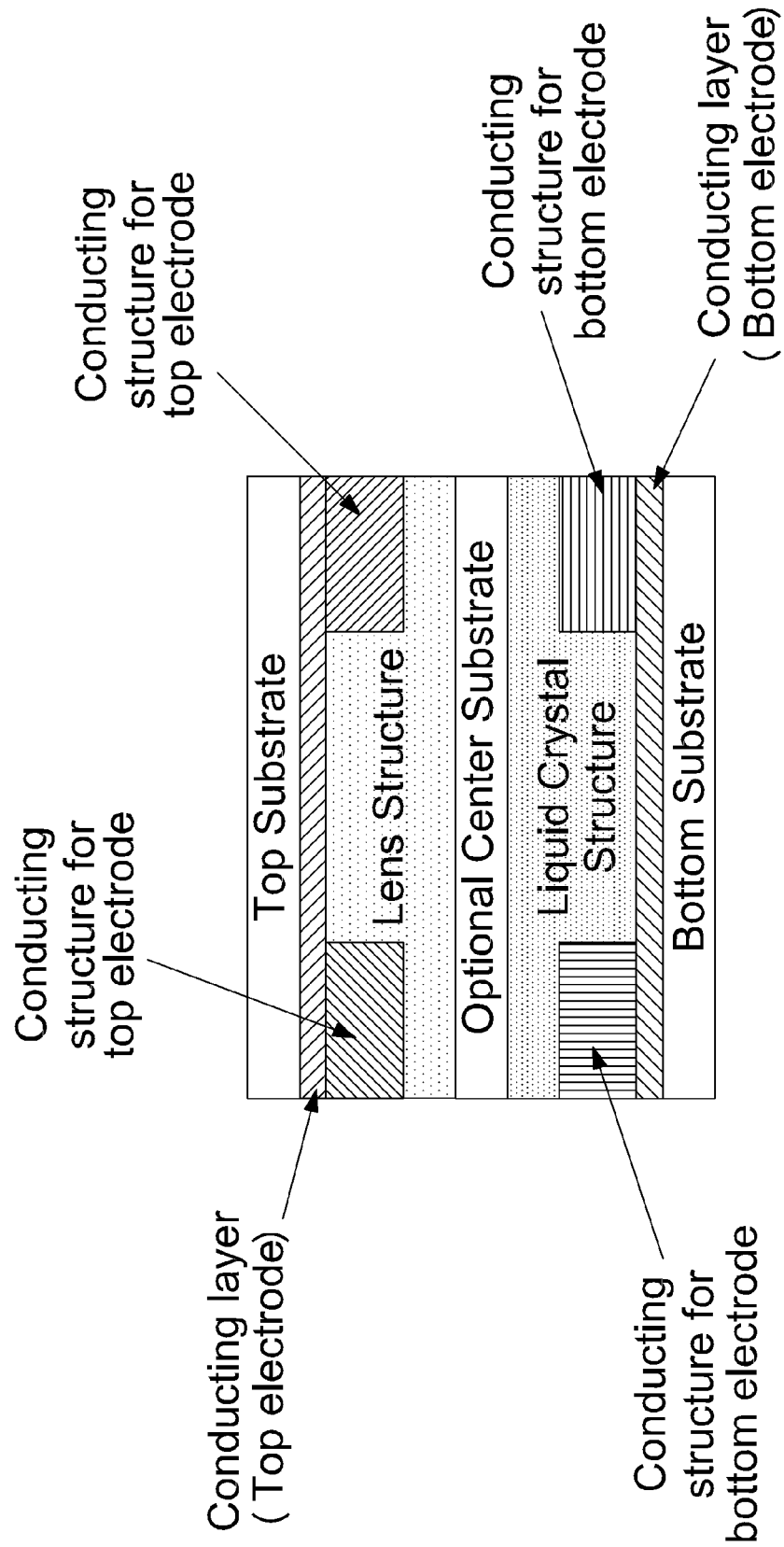
FIGS. 29A and 29B are side and plan views, respectively, of one half of a TLCL in which a contact structure is defined in a non-optical portion of the half TLCL, in accordance with yet another variant embodiment of the present invention.
Figure 29B:
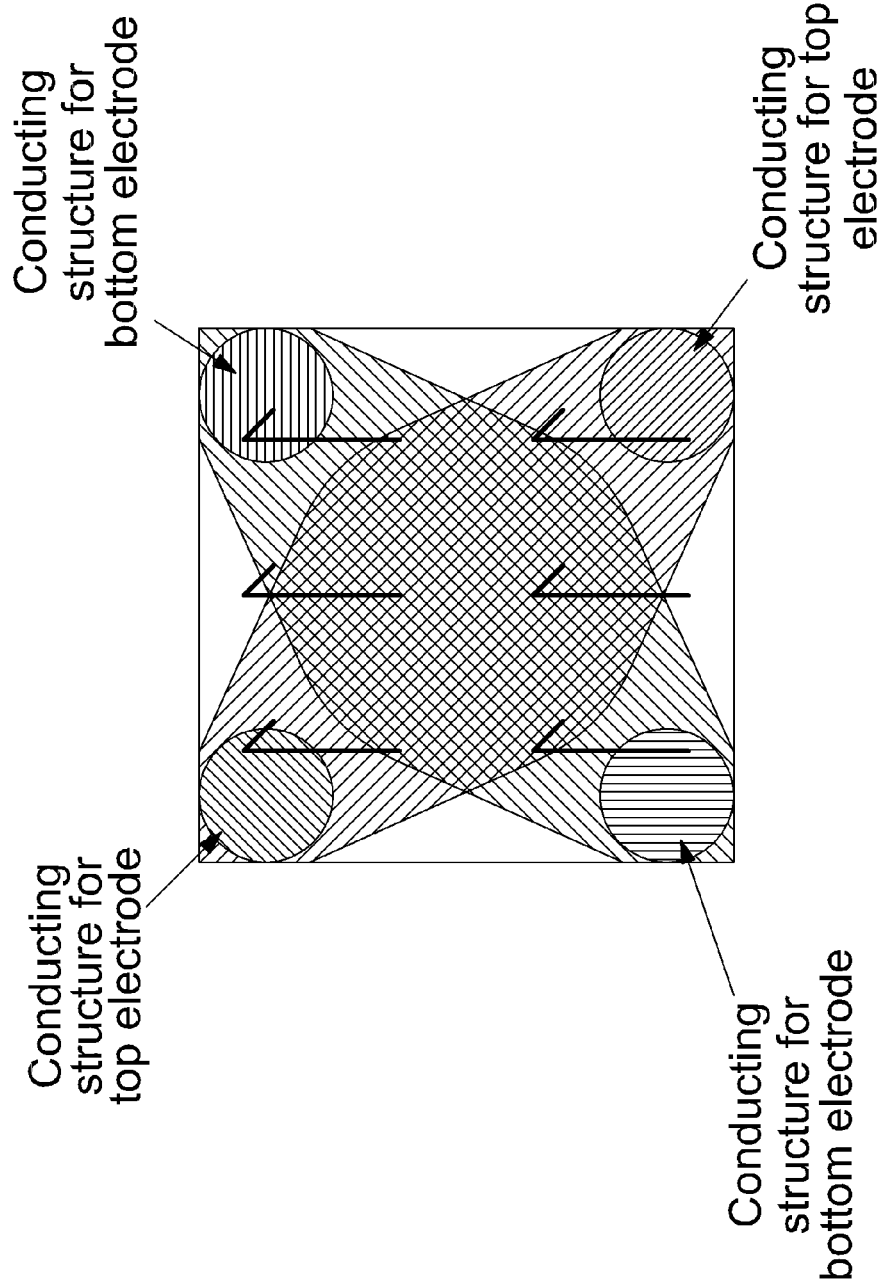
Figure 30A:
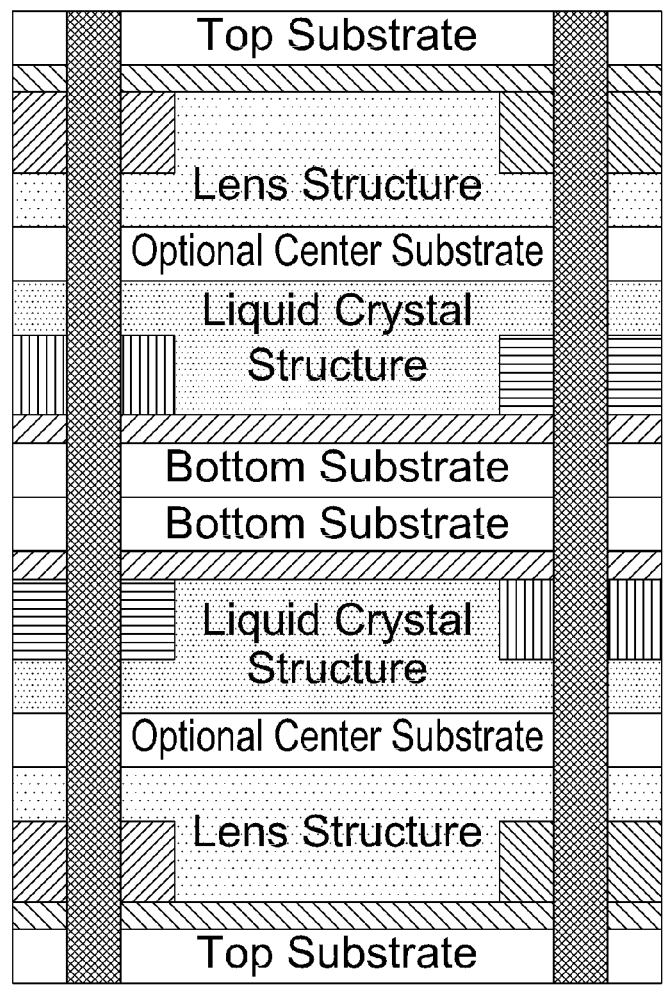
FIGS. 30A and 30B are side and plan views, respectively, of a complete TLCL formed by connecting together two half TLCLs of FIG. 29A at their bottom surfaces, where two through-holes, each passing through the entire TLCL, are used to interconnect the various conducting structures of the contact structure, according to an example of implementation of the present invention.
Figure 30B:
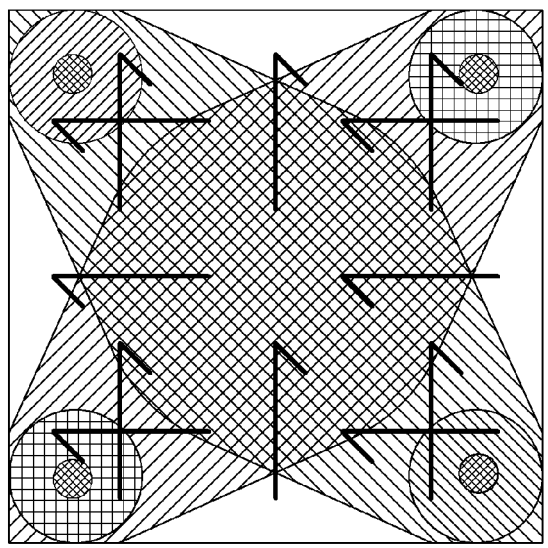

In the foregoing embodiments and examples of implementation of the present invention, the contact structure is defined at an edge of the singulated TLCL. However, in a further variant embodiment of the present invention, the contact structure may be located in a non-optical portion of the TLCL and used to make external contact through the top or bottom surface of the device via a through-hole in the TLCL layered structure. A non-limiting example of implementation of a half TLCL according to this variant is illustrated in FIGS. 29A and 29B. The through-hole may be a blind hole that reaches through the top or bottom surface of the half TLCL to get to the contact structure. Alternatively, the through-hole may be a hole passing through the complete TLCL, as illustrated in the example of FIGS. 30A and 30B, in which the through-holes are used to contact two contact areas of the contact structure, each connected to a respective thin film electrode. The presence of the contact structure within the TLCL makes electrical contact easier and more reliable than in prior art through hole-based TLCL designs without a contact structure.

It is important to note that the contact structure of the present invention is adaptable to different TLCL constructions, without departing from the scope of the present invention. For example, in a particular different construction, a middle electrode structure may be used in a TLCL device to achieve two adjacent LC layers with different orientation layer directions, such that it is not necessary to rotate, flip and bond together two identical half TLCLs to form the complete TLCL. This middle electrode structure is made of two very thin glass substrates bonded together, with an electrode (e.g. ITO) deposited on one side of one of the substrates and sandwiched between the two substrates. Each thin substrate has an alignment layer on its outer side. By placing this middle electrode structure in the stack of the TLCL wafer, it is possible to arrange the stack of layers in order to provide dual polarization and/or a desired angular insensitivity. However, in this type of TLCL construction, it is not desirable to deposit the conductive material of the contact structure onto the electrode that is to be sandwiched between the two thin glass substrates, because this additional conductive material will interfere with the size of the middle electrode structure and may cause grinding of the glass substrates. The contact structure and/or its fabrication must therefore be adapted accordingly.

Figure 31A:
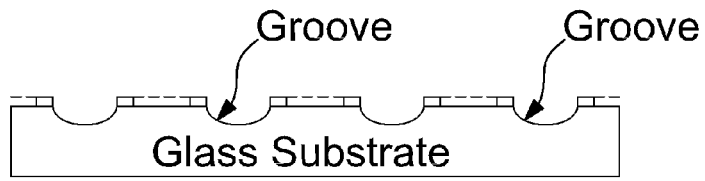
FIGS. 31A, 31B, 31C and 31D illustrate the fabrication of a middle electrode structure for a TLCL, in which a contact structure for the TLCL is defined by etching grooves into a glass substrate of the middle electrode structure, in accordance with another variant embodiment of the present invention.

In a non-limiting example of a variant embodiment of the present invention, fabrication of the contact structure includes an etching process, whereby one or more grooves are etched into the inner side of one of the two glass substrates of the middle electrode structure, notably the glass substrate that does not have the electrode deposited on it, as shown in FIG. 31A. These grooves may be positioned along an edge of the substrate or, alternatively, at a non-optical position within the TLCL, without departing from the scope of the present invention. In the case of a wafer of hole-patterned electrode cells such as that shown in the plan view of FIG. 31C, one possible example is to etch grooves and deposit beads such that each deposited bead follows a respective sectioning edge on the wafer. This would of course result in singulated cells with an edge contact structure for the middle electrode structure.

Figure 31B:
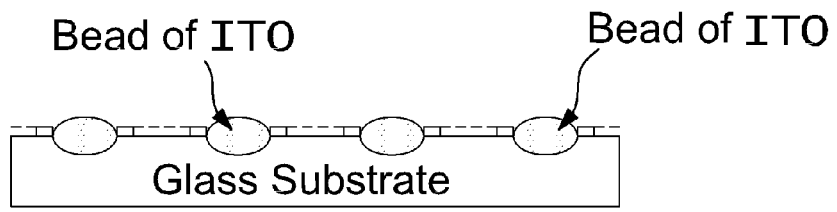
Figure 31C:
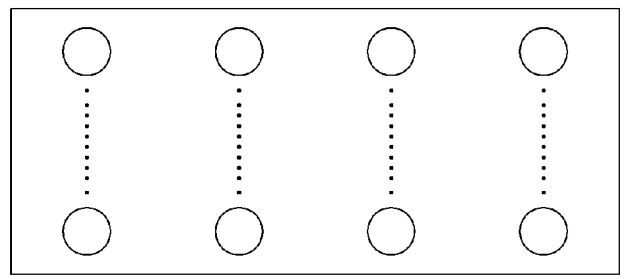
Figure 31D:
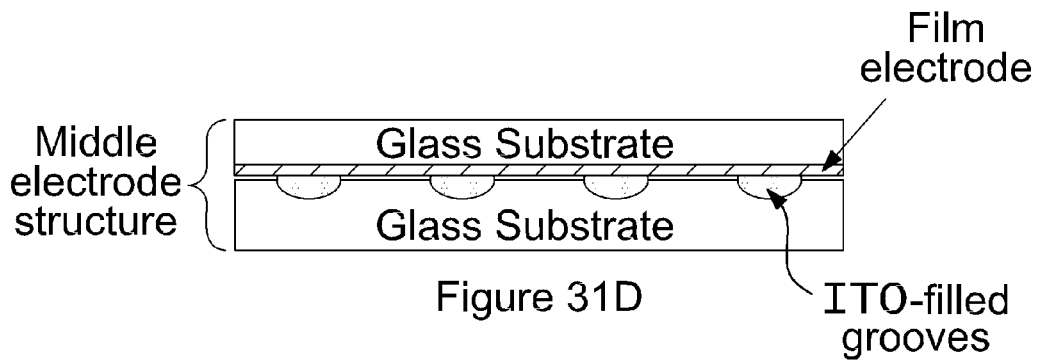

After grooving of the respective substrate, each groove is polished and filled with a bead of conductive material (e.g. ITO), as shown in FIG. 31B. Note that the deposited bead may be characterized by any one of various different possible sizes and geometric shapes, including for example circular and rectangular, without departing from the scope of the invention. Once the grooves are etched, polished and filled, the two glass substrates can be sandwiched together to complete fabrication of the middle electrode structure, at which point the conductive material filling the grooves comes into contact with the electrode sandwiched between the two substrates, as shown in FIG. 31D. Each filled groove thus forms a contact area of the contact structure of the TLCL, allowing for reliable electrical contact to be made to the electrode of the middle electrode structure.

Obviously, a tunable liquid crystal device with a contact structure as described hereinabove has many different possible applications in the field of intelligent (self-adjustable) optical imaging systems, such as high quality cell phone cameras, storage/reading systems and vision systems. In one non-limiting example, a wafer level camera module consists of a CMOS sensor, normally packaged in a chip scale package, and a wafer level lens structure, which consists of multiple replicated lenses on glass substrates. In this prior art configuration, no electrical connection is required between the parts of the camera module. However, in the case of a wafer level camera with an active optics element, such as a TLCL, one or more electrical connections are required to electrically connect the TLCL to the camera substrate, where this camera is most likely a chip scale package or a sensor on a printed circuit board (PCB). If the TLCL includes a contact structure as described in any of the foregoing embodiments and examples, reliable electrical connections can be made between the TLCL and the camera at wafer level.

Figure 32A:
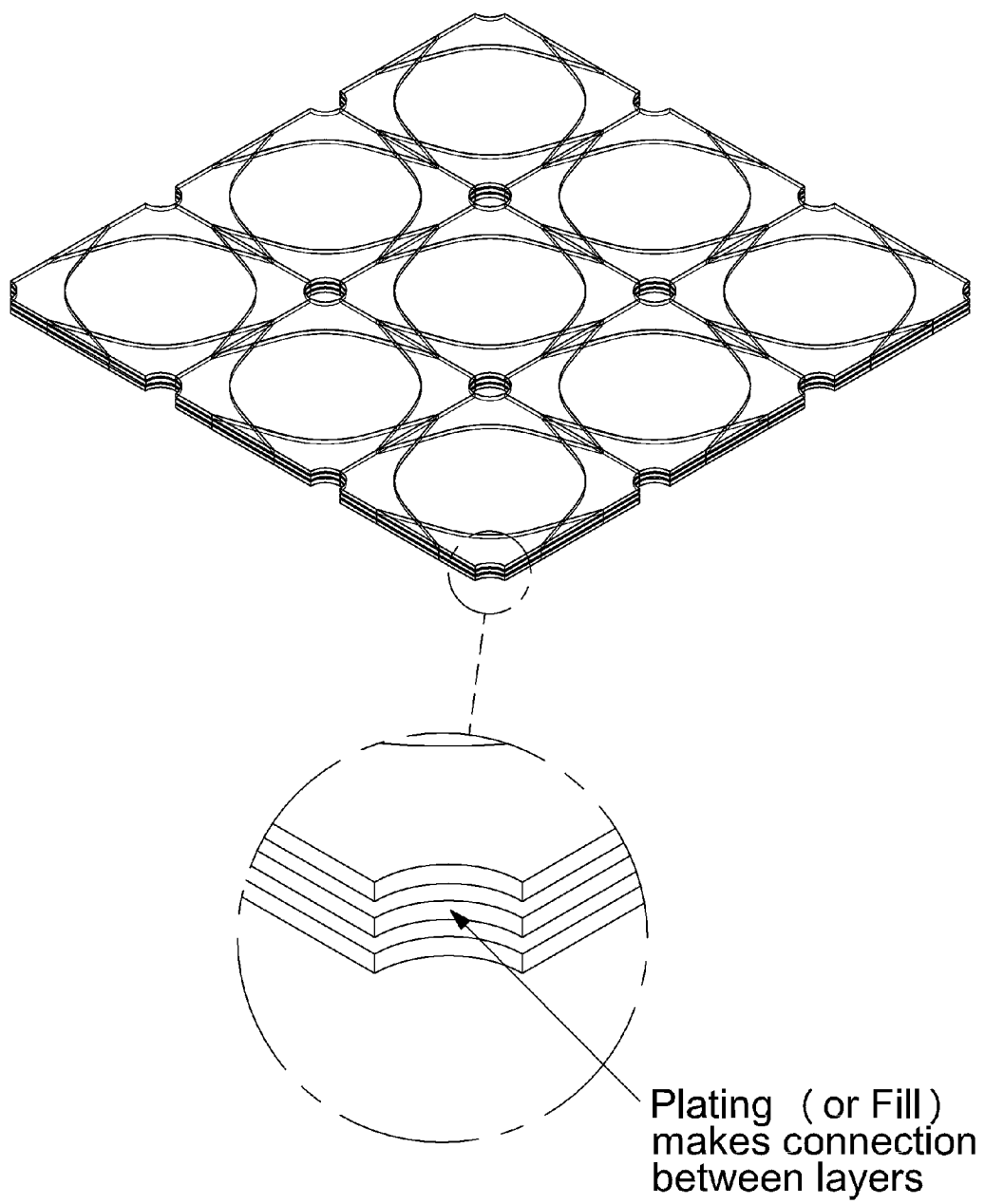
FIGS. 32A and 32B illustrate the fabrication of a wafer level camera with a TLCL, using a drilled via structure to make the electrical connections, where the TLCL has an edge contact structure, according to a non-limiting example of implementation of the present invention.
Figure 32B:
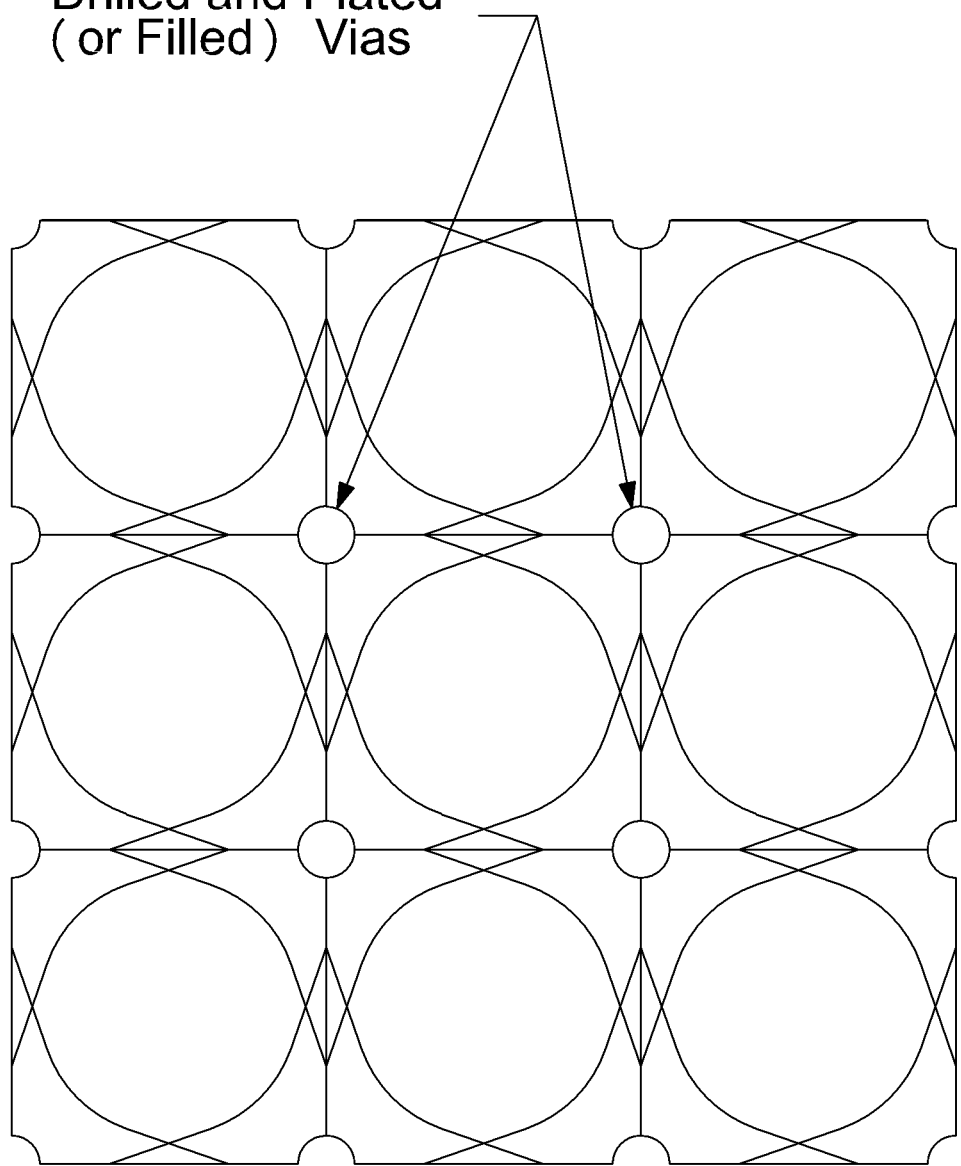

Assume that a TLCL including an edge contact structure according to any one of the relevant embodiments described above is to be connected to a system PCB of a wafer level camera. In one specific non-limiting example of implementation, a drilled via structure may be constructed after assembly of the TLCL to the lens structure of the camera, in order to make the necessary electrical connections. Thus, a wafer of TLCLs (in wafer form before dicing) is assembled onto a wafer of replicated lens stacks (lens structure of camera), as shown in FIG. 32A. A single large hole is drilled through the assembled wafers, in such a way to cut through four adjacent TLCLs and expose the inner metallic layers of the edge contact structure of each TLCL, as seen in FIG. 32B. After this drilling operation, the holes are either filled with a conductive epoxy or plated with a conductive metal, where the epoxy or plated metal forms an electrical via that creates an electrical connection from the bottom of the lens structure up to the TLCL.

Figure 33A:
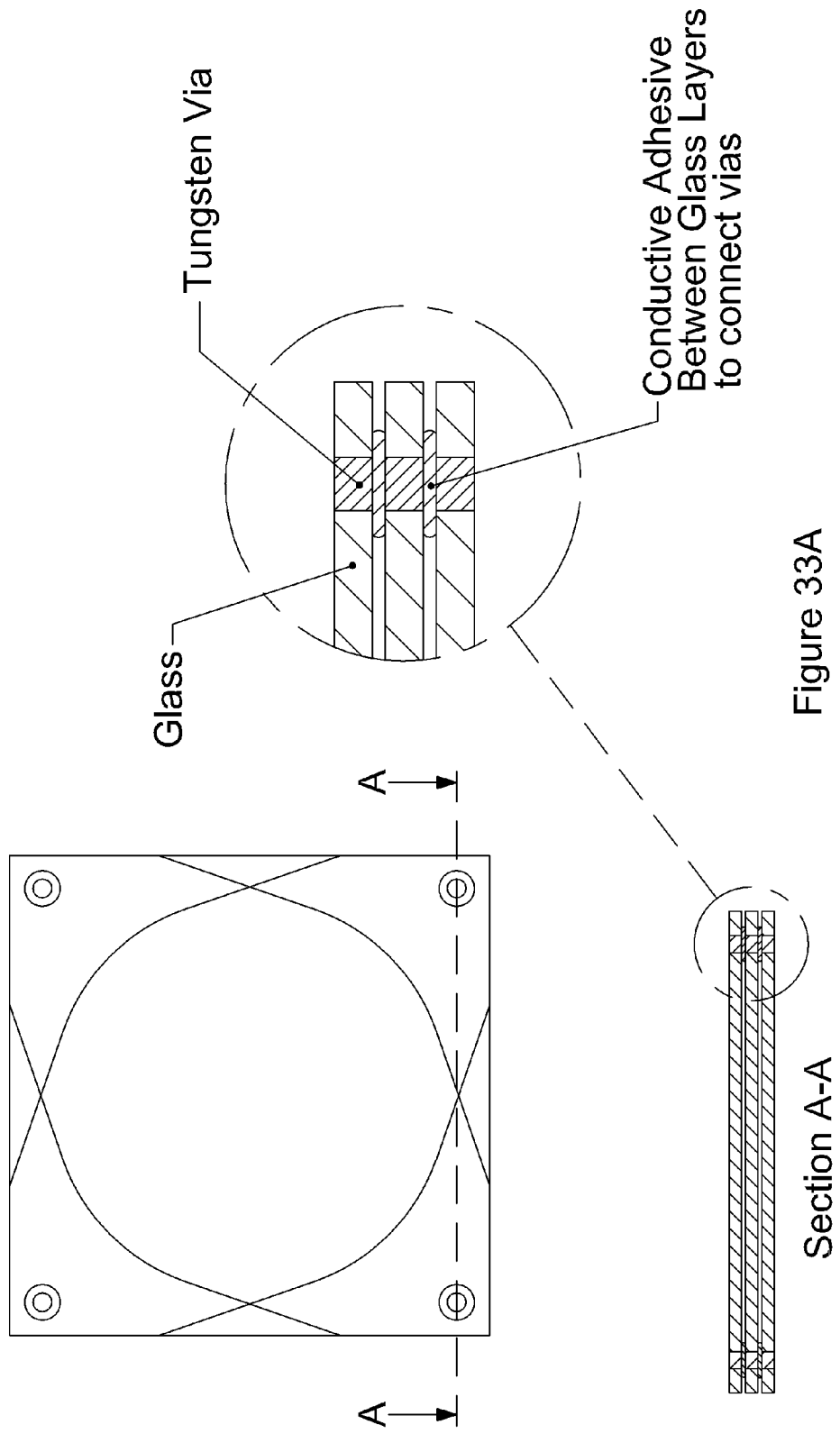
FIG. 33A illustrates an exemplary prior art generic multi-layered glass structure with embedded tungsten vias.

In another specific non-limiting example of implementation, an embedded via structure may be used to make the necessary electrical connections, where this embedded via structure is constructed during assembly of both the TLCL and the lens structure of the camera. More specifically, the glass plates (substrates) that are used in the construction of the TLCL and the replicated lens structure are plates with embedded tungsten vias, such as the HermeS™ glass substrates manufactured by Schott Corporation. For illustration purposes, FIG. 33A shows an example of a generic multi-layered glass structure with embedded tungsten vias, where a conductive epoxy is utilized between the glass plates during the stacking operation in order to complete the desired electrical connection.

Note that, in the case of a TLCL having a contact structure according to the present invention, the configuration of the TLCL must be such that the contact areas of the contact structure are aligned with the vias of the glass substrates, such that electrical contact is made therebetween. Thus, the contact structure of the TLCL may be defined at either the edge of the device or at a non-optical position of the device, as long as the contact structure is compatible with the vias in the glass substrates.

Figure 33B:
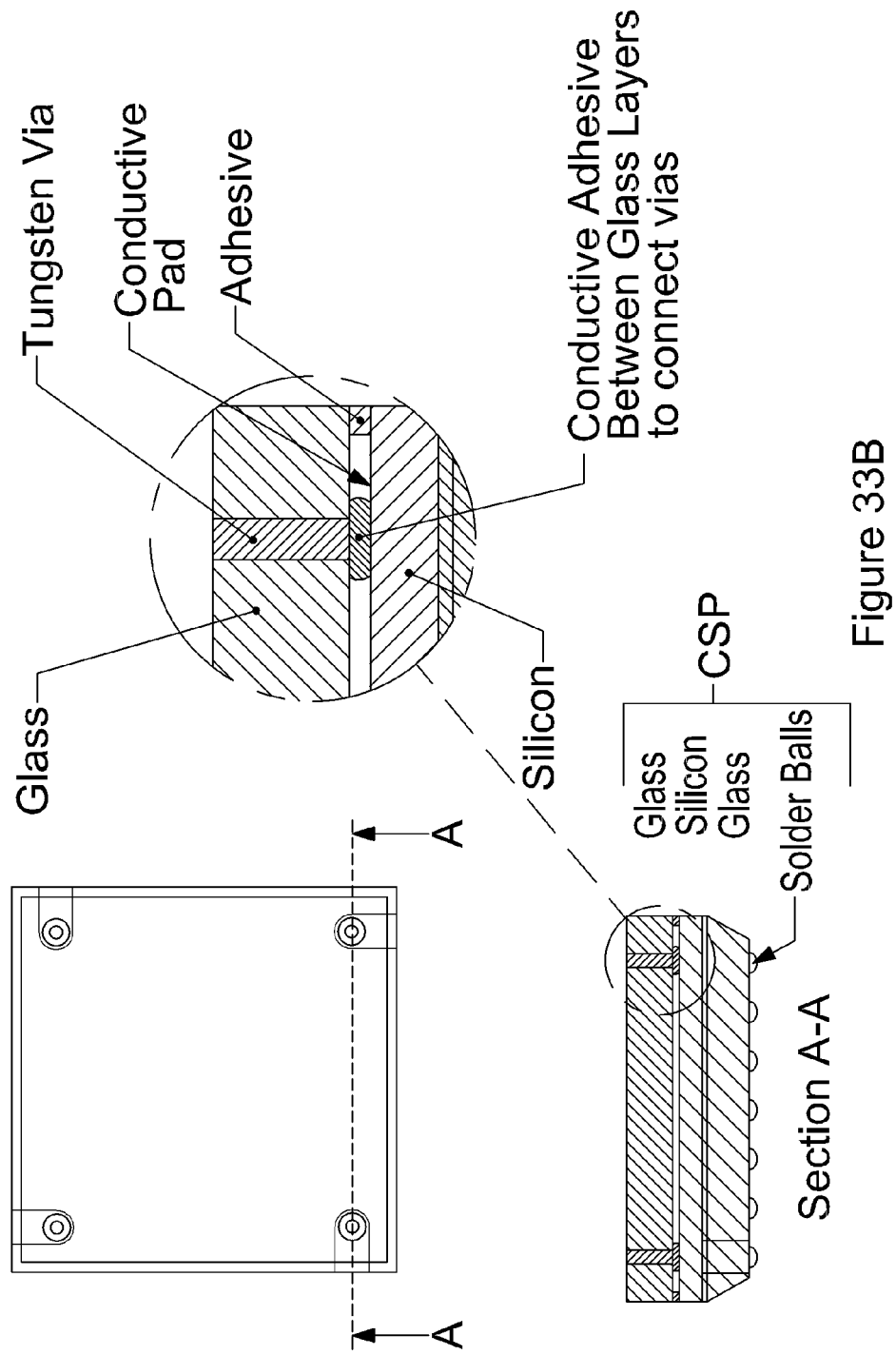
FIG. 33B illustrates the fabrication of a wafer level camera with a TLCL, using an embedded via structure to make the electrical connections, where the TLCL has a compatible contact structure, according to a non-limiting example of implementation of the present invention.

In order to be able to complete the electrical connection between the TLCL and the PCB of the camera, the chip scale package used in the camera module construction must be fabricated in such a way to allow electrical connection from the top of the glass in the package to the connections in the package substrate. As shown in FIG. 33B, a glass substrate with embedded tungsten vias may be used as part of the chip scale package, where the vias in the glass are connected to pads on the CMOS sensor with a conductive adhesive, such as epoxy. Connection to the camera PCB is made through any appropriate package connection structure, which may be similar to connections used for other electrical connections in the package.

Although various embodiments have been illustrated, this was for the purpose of describing, but not limiting, the present invention. Various possible modifications and different configurations will become apparent to those skilled in the art and are within the scope of the present invention, which is defined more particularly by the attached claims.

What is claimed is:

1. A tunable liquid crystal optical device defining an optical aperture and having a layered structure, said device comprising:
   a film electrode formed on a surface of a first substrate and covered by a second substrate;
   a contact structure filling a volume within said layered structure and contacting said film electrode, said contact structure being located outside of said optical aperture and providing an electrical connection surface much larger than a thickness of said film electrode; and
   a peripheral edge surface with exposed edges of layers of said layered structure, said contact structure being located at an edge of said device,
   wherein said film electrode is a first film electrode, said device further comprising a second film electrode formed on a substrate other than said first substrate, said contact structure including a first contact area contacting said first film electrode and a second contact area contacting said second film electrode, and
   wherein said device is essentially square and said first and second contact areas of said contact structure are located in diagonally opposed corners of said device.

2. A device as defined in claim 1, wherein said first and second film electrodes are thin film transparent electrodes controlling an electric field for said device, said device comprising a pair of identical single polarization layered liquid crystal optical devices joined together after a 90 degree rotation and flip of one of said pair of devices, said contact structure including two pairs of vertically aligned contact areas.

3. A device as defined in claim 2, wherein said contact structure is located at said peripheral edge surface of said device and said electrical connection surface provided by each contact area of said contact structure is at one of said exposed edges.

4. A device as defined in claim 3, further comprising a pair of external side contacts bonded to said peripheral edge surface, each side contact connecting together a respective pair of said vertically aligned contact areas.

5. A device as defined in claim 3, wherein each contact area of said contact structure is formed by a bead of conductive material.

6. A device as defined in claim 4, wherein each contact area of said contact structure is formed by a bead of conductive material.

7. A tunable liquid crystal optical device defining an optical aperture and having a layered structure, said device comprising:
   a film electrode formed on a surface of a first substrate and covered by a second substrate;
   a contact structure filling a volume within said layered structure and contacting said film electrode, said contact structure being located outside of said optical aperture and providing an electrical connection surface much larger than a thickness of said film electrode;
   wherein said film electrode is a first film electrode, said device further comprising a second film electrode formed on a substrate other than said first substrate, said first and second film electrodes being thin film transparent electrodes controlling an electric field for said device, said contact structure including a first contact area contacting said first film electrode and a second contact area contacting said second film electrode, and
   wherein said device includes a pair of identical single polarization layered liquid crystal optical devices joined together after a 90 degree rotation and flip of one of said pair of devices, said contact structure including two pairs of vertically aligned contact areas.

8. A method of manufacturing a tunable liquid crystal optical device that defines an optical aperture and has a layered structure including a liquid crystal layer and a lens structure layer, said method comprising:
   forming a film electrode on a surface of a substrate;
   forming a contact structure connected to said film electrode, said contact structure providing an electrical connection surface that is much larger than a thickness of said film electrode; and
   using said substrate with said film electrode and said contact structure formed thereon in the construction of said layered structure of said device, said contact structure filling a volume within said layered structure and being located outside of said optical aperture of said device,
   wherein said forming a contact structure includes etching a groove in a substrate other than said substrate on which is formed said thin film electrode, polishing said groove, filling said groove with a bead of conductive material and sandwiching said thin film electrode between the two substrates.

* * * * *

UNITED STATES PATENT AND TRADEMARK OFFICE
CERTIFICATE OF CORRECTION

PATENT NO.       : 8,558,985 B2                                                     Page 1 of 1
APPLICATION NO. : 12/995866
DATED            : October 15, 2013
INVENTOR(S)      : Nystrom et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 259 days.

Signed and Sealed this

Fifteenth Day of September, 2015

Michelle K. Lee
*Director of the United States Patent and Trademark Office*